(12) United States Patent
Acuff et al.

(10) Patent No.: US 12,441,806 B2
(45) Date of Patent: Oct. 14, 2025

(54) ANTI-TLR9 AGENTS AND COMPOSITIONS AND METHODS FOR MAKING AND USING THE SAME

(71) Applicant: BIOLEGEND, INC., San Diego, CA (US)

(72) Inventors: Nicole Vivienne Acuff, San Diego, CA (US); Anagha Ashok Divekar, San Diego, CA (US); Takatoku Oida, Osaka (JP)

(73) Assignee: BioLegend, Inc., San Diego, CA (US)

( * ) Notice: Subject to any disclaimer, the term of this patent is extended or adjusted under 35 U.S.C. 154(b) by 1242 days.

(21) Appl. No.: 17/209,093

(22) Filed: Mar. 22, 2021

(65) Prior Publication Data
US 2021/0206873 A1   Jul. 8, 2021

Related U.S. Application Data

(63) Continuation of application No. PCT/US2019/051976, filed on Sep. 19, 2019.

(60) Provisional application No. 62/736,208, filed on Sep. 25, 2018.

(51) Int. Cl.
*A61K 39/00*   (2006.01)
*C07K 16/28*   (2006.01)
*G01N 33/68*   (2006.01)

(52) U.S. Cl.
CPC ..... *C07K 16/2896* (2013.01); *G01N 33/6872* (2013.01); *C07K 2317/24* (2013.01); *C07K 2317/56* (2013.01); *C07K 2317/565* (2013.01); *G01N 2333/70596* (2013.01)

(58) Field of Classification Search
CPC ............ C07K 16/2896; C07K 2317/24; C07K 2317/56; C07K 2317/565; C07K 2317/33; C07K 2317/34; C07K 2317/76; G01N 33/6872; G01N 2333/70596; A61P 29/00; A61P 37/06; A61K 2039/505
See application file for complete search history.

(56) References Cited

U.S. PATENT DOCUMENTS

| 2011/0105727 A1* | 5/2011 | Cattaneo | G16B 15/00 530/387.3 |
|---|---|---|---|
| 2016/0002331 A1* | 1/2016 | Geles | A61P 35/00 435/69.6 |
| 2016/0185871 A1 | 6/2016 | Miyake et al. | |

FOREIGN PATENT DOCUMENTS

| CN | 102640001 A | 8/2012 |
|---|---|---|
| CN | 103153346 A | 6/2013 |
| EP | 2990419 | 3/2016 |
| WO | 2011054893 | 5/2011 |
| WO | 2018101425 | 6/2018 |
| WO | 2018106993 | 6/2018 |

OTHER PUBLICATIONS

Gheita et al. ("Toll-like receptor 9 in systemic sclerosis patients: relation to modified Rodnan skin score, disease severity, and functional status", Clin Rheumatol. (2018) vol. 37, pp. 757-763) (Year: 2018).*
Tamaki et al. ("Expression of Toll-like Receptors and Their Signaling Pathways in Rheumatoid Synovitis", The journal of Rheumatology 2011; vol. 38:5, pp. 810-820) (Year: 2011).*
Lloyd et al. ("Modelling the human immune response: performance of a 10e11 human antibody repertoire against a broad panel of therapeutically relevant antigens", Protein Engineering, Design and Selection, vol. 22, Issue 3, Mar. 1, 2009, pp. 159-168) (Year: 2009).*
Brown et al. ("Tolerance of single, but not multiple, amino acid replacements in antibody VH CDR 2: a means of minimizing B cell wastage from somatic hypermutation?", J Immunol. May 1996;156(9):3285-91) (Year: 1996).*
Chen et al., TLR9 and NF-κB Levels in Peripheral Blood Mononuclear Cells of Patients with Systemic Lupus Erythematosus and Their Clinical Significance, China Journal of Modern Medicine, vol. 26, No. 11, Jun. 2016, pp. 63-67.
Chinese Application No. 201980077120.2, Office Action mailed on Aug. 17, 2023, 14 pages (8 pages of Original Document and 6 pages of English Translation).
Chinese Application No. 201980077120.2, Office Action mailed on Jan. 30, 2024, 10 pages (5 pages of Original Document and 5 pages of English Translation).
Duan et al., Expression and Functional Analysis of Plasmacytoid Dendritic Cell TLR9 in Patients with Acute Leukemia, Chinese Journal of Cellular and Molecular Immunology, vol. 29, No. 7, Dec. 31, 2013, pp. 754-756.
European Application No. 19782826.2, Office Action mailed on Mar. 26, 2024, 4 pages.
International Application No. PCT/US2019/051976, International Preliminary Report on Patentability mailed on Apr. 8, 2021, 14 pages.
International Application No. PCT/US2019/051976, Invitation to Pay Additional Fees and, Where Applicable, Protest Fee, Jan. 21, 2020, 18 pages.
Yuan-Xiu et al., Detection of Toll-Like Receptor 9 in Peripheral Blood Mononuclear Cells and Serum Tumor Necrosis Factor and Fas in Patients with Acute Myeloid Leukemia, Journal of Clinical Rehabilitative Tissue Engineering Research, vol. 15, No. 45, Nov. 5, 2011, pp. 8491-9494.

(Continued)

*Primary Examiner* — Gregory S Emch
*Assistant Examiner* — Nam P Nguyen
(74) *Attorney, Agent, or Firm* — Kilpatrick Townsend & Stockton LLP

(57) ABSTRACT

Compositions and methods for making and using anti-TLR9 agents, for example, monoclonal antibodies, TLR9-binding antibody fragments, and derivatives are described, as are kits, nucleic acids encoding such molecules, diagnostic reagents and kits that include anti-TLR9 agents, and methods of making and using the same.

5 Claims, 8 Drawing Sheets

Specification includes a Sequence Listing.

(56) References Cited

OTHER PUBLICATIONS

Furi et al., Association of Self-DNA Mediated TLR9-Related Gene, DNA Methyltransferase, and Cytokeratin Protein Expression Alterations in HT29-Cells to DNA Fragment Length and Methylation Status, Scientific World Journal, vol. 2013, Jan. 1, 2013, pp. 1-8.
Guerrier et al., TLR9 Expressed on Plasma Membrane Acts as a Negative Regulator of Human B Cell Response, Journal of Autoimmunity, vol. 51, Available online at: https://www.sciencedirect.com/science/article/abs/pii/S0896841114000444?via%3Dihub, Jun. 2014, pp. 23-29.
International Application No. PCT/US2019/051976, International Search Report and Written Opinion, mailed on Mar. 17, 2020, 19 pages.
Rudikoff et al., Single Amino Acid Substitution Altering Antigen-Binding Specificity, Proceedings of the National Academy of Sciences, Immunology, vol. 79, No. 6, Mar. 1982, pp. 1979-1983.
Trune et al., Correlative mRNA and Protein Expression of Middle and Inner Ear Inflammatory Cytokines during Mouse Acute Otitis Media, Hearing Research, vol. 326, Aug. 1, 2015, pp. 49-58.

\* cited by examiner

Fig. 1

Full-length Human TLR9 Precursor Amino Acid Sequence (SEQ ID NO: 72)

```
   1 mgfcrsalhp lslivgaiml amtlalgtlip afipcelqph glvncnwlfl ksvphfsmaa
  61 prgnvtslsl ssnrihhihd sdfahipsir hinikwncpp vgispmhfpc hmtiepstfl
 121 avptleeini synnimtvpa ipksisisl shtnlimlds aslaglhalr flfmdgncyy
 181 knpcrqalev apgallglgn ithisikynn itvvprnlps sleyllisyn rivklapedi
 241 anitalrvld vggncrrcdh apnpcmecpr hfpqlhpdtf shisrleglv lkdsslswln
 301 aswfrglgnl rvldisenfl ykcitktkaf qgitqirkin isfnyqkrvs fahislapsf
 361 gslvalkeld mhgiffrsid ettlrplari pmlqtirlqm nfingaqlgi frafpglryv
 421 disdnrisga seltatmgea dggekvwlqp gdiapapvdt pssedfrpnc stinftidls
 481 rnnlvtvqpe mfaqlshlqc irishncisq avngsqflpl tglqvidish nkldlyhehs
 541 ftelprieal disynsqpfg mqgvqhnnfsf vahirtirhl siahnnihsq vsqqlcstsi
 601 raldfsgnal ghmwaegdly lhffgglsgl iwldisqnrl htlipqtirn lpkslqvlrl
 661 rdnylaffkw wslhflpkle vidiagnqik aitngslpag trlrrldvsc nsisfvapgf
 721 fskakelrel nlsanalktv dhswfgplas aiqildvsan pihcacgaaf mdfllevqaa
 781 vpglpsrvkc gspgqlqgls ifaqdirlci dealswdcfa lsliavalgl gvpmlhhlcg
 841 wdlwycfhlc lawlpwrgrq sgrdedalpy dafvvfdktq savadwvyne lrgqleecrg
 901 rwalriclee rdwlpgktlf eniwasvygs rktlfvlaht drvsgllras fllaqrlle
 961 drkdvvvlvi lspdgrrsry vrirqrlcrq svllwphqps gqrsfwaqlg maltrdnhhf
1021 ynrnfcqgpt ae
```

Fig. 2

Anti-TLR9 Antibody Heavy and Light Chain Variable Region and CDR Amino Acid Sequences and Alignments

Fig. 3
Clone Information

| ID | Source | Clone | Isotype | Format | ug/T |
|---|---|---|---|---|---|
| AB1 | BioLegend | 1 | Rat IgG2a, k | PE | 0.5 |
| AB2 | BioLegend | 2 | Rat IgG2a, k | PE | 0.5 |
| AB3 | BioLegend | 3 | Rat IgG2a, k | PE | 0.5 |
| AB4 | BioLegend | 4 | Rat IgG2a, k | PE | 0.5 |
| Commercial ABI | commercially available | n/a | Mouse IgG1, k | PE | 0.5 |
| Commercial ABII | commercially available | n/a | Rat IgG2a, k | APC | 0.5 |

Gating Strategy

ANTI-TLR9 AGENTS AND COMPOSITIONS AND METHODS FOR MAKING AND USING THE SAME

CROSS-REFERENCES TO RELATED APPLICATIONS

This patent application is a continuation of PCT/US2019/051976, filed Sep. 19, 2019, which application claims the benefit of U.S. provisional patent application No. 62/736,208 filed on Sep. 25, 2018. The entire contents of the foregoing applications are incorporated herein by reference, including all text, tables and drawings, for all purposes.

REFERENCE TO A SEQUENCE LISTING

The instant application contains a Sequence Listing which has been submitted electronically in ASCII format and is hereby incorporated by reference in its entirety. Said ASCII copy, created on Oct. 31, 2019, is named BLD-0105-PC_SL.txt and is 61,916 bytes in size.

BACKGROUND

The following description includes information that may be useful in understanding the present technology. It is not an admission that any of the information provided herein, or any publication specifically or implicitly referenced herein, is prior art, or even particularly relevant, to the presently claimed technology.

Toll-like receptors (TLRs) are present as membrane spanning proteins on many cells, and inside certain cells, of the immune system, and are generally involved in the innate immune response by recognizing pathogen-associated molecular patterns derived from various bacteria, fungi, parasites, and viruses. The innate immune system promptly responds to the invasion of microbes and acts as the first line of defense, whereby innate immune cells such as macrophages or dendritic cells (DCs) play a central role in the production of proinflammatory cytokines or nitric oxide. TLRs also are involved in the efficient establishment of acquired immunity against pathogens by directly detecting molecules from microbes. The adaptive immune system exerts highly specific responses to microbes by producing antibodies from B cells or through the generation of killer or helper T lymphocytes, resulting in life-long immunological memory. This process may take weeks, or even months, to establish sufficient levels of immunity. Some TLR types are located on the cell surface (e.g., to detect and initiate a response to extracellular pathogens), while other TLR types are located inside the cell (e.g., to detect and initiate a response to intracellular pathogens).

Pattern recognition receptors (PRRs), which recognize pathogen-associated molecular patterns (PAMPs) specific to each pathogen, generally are expressed on innate immune cells and discriminate self or non-self structures. More than 10 members of the TLR family are present in mammals and function as PRRs, recognizing a variety of PAMPs, such as lipopolysaccharide, lipoprotein, nucleic acids, and the like. In humans, 10 different TLR types have been identified, designated TLR1-10, while in mice, 13 TLR types have been identified. TLR1-TLR10 are conserved between humans and mice, although TLR10 is not functional in mice because of a retroviral insertion. TLR11-13 are not present in humans.

TLRs are type I transmembrane proteins that consist of three major domains: (1) a leucine rich binding domain; (2) a transmembrane domain; and (3) a cytoplasmic TIR (i.e., Toll-IL-1R) domain. The TIR domain is a highly conserved intracellular domain found in IL-1R and various TLRs. For certain TLRs (e.g., TLR1, TLR2, TLR4, TLR5, TLR6, TLR10), ligand recognition by TLRs is mediated by the binding domain that harbors a leucine rich repeat (LRR) composed of 19-25 tandem copies of the "xLxxLxLxx" motif.

TLRs can be divided into extracellular and intracellular varieties. TLR1, TLR2, TLR4, TLR5, TLR6, and TLR11 recognize their ligands on the cell surface. In contrast, TLR3, TLR7, TLR8, and TLR9 are intracellularly localized on the endoplasmic reticulum (ER) membrane in resting cells but upon activation, TLR9 traffics to the Golgi apparatus and then to lysosomal compartments. Intracellular localization of TLR9 may be regulated by the ER membrane protein UNC93B, which directly interacts with the intracellular TLR species. Mice having a missense mutation in the UNC93B gene are defective in TLR3, TLR7, and TLR9 trafficking and fail to activate cellular signaling. Processing of the ectodomain of TLR9 by cathepsins in endolysosomal compartments generally is necessary for compartment-specific activation.

Ligand binding typically causes dimerization of the cytoplasmic TIR domains, culminating in activation of downstream intracellular signaling mediated by TLR domain-containing adaptor proteins. Similar to mammalian IL-1R signaling, TLR signaling also activates NF-κB as well as mitogen-activated protein kinases (MAPKs) to stimulate gene expression, including pro-inflammatory cytokines and co-stimulatory molecules. In addition, the mammalian TLR system establishes antiviral immune responses predominantly through the production of type I interferon (IFN), although TLR9 also promotes expression of IL-6, IL-8, TNF, and IL-12.

Genomic nucleic acids from bacteria and viruses, or their analogs, stimulate the production of proinflammatory cytokines and type I IFN. Among them, immunostimulatory bacterial DNA was first identified in Calmette-Guerin bacilli, which are capable of promoting antitumor activity and inducing type I IFN (IFN-α/0) and type II IFN (IFN-γ) in human peripheral blood leukocytes.

TLR9 (also sometimes referred to in the literature as CD289) is a receptor expressed in immune system cells including a subset of dendritic cells (i.e., plasmacytoid dendritic cells (pDCs)) and B cells, and in certain instances, TLR9 is expressed on epithelial cells (e.g., keratinocytes). Plasmacytoid dendritic cells (pDCs) are immune cells that secrete type 1 interferon (IFNs) in response to a viral infection. They circulate in blood and may be found in peripheral lymphoid organs. Plasmacytoid dendritic cells (pDCs) develop from bone marrow hematopoietic stem cells and constitute a small portion of peripheral blood mononuclear cells (PBMC). pDCs conduct antiviral mechanisms, and can link innate and adaptive immune systems. In certain instances, pDCs can participate in and/or exacerbate autoimmune diseases (e.g., lupus). B cells, also referred to as B lymphocytes, are a type of white blood cell of the lymphocyte subtype. They generally function in the adaptive immune system (i.e., humoral immunity component) by secreting antibodies. B cells can present antigen and secrete cytokines. In mammals, B cells mature in the bone marrow. B cells typically express B cell receptors (BCRs) on their cell membrane. BCRs allow the B cell to bind to a specific antigen and initiate an antibody response.

TLR9 preferentially binds DNA present in bacteria and viruses, and triggers signaling cascades that lead to a pro-inflammatory cytokine response. Cancer, infection, and tissue damage, for example, can modulate TLR9 expression and activation. TLR9 also is a factor in autoimmune diseases and associated inflammation.

TLR9 can recognize unmethylated CpG motifs in bacterial DNA and in synthetic oligonucleotides (see, e.g., Hemmi et al., Nature (2000), vol. 408:740-745). Other modifications of CpG-containing phosphorothioate oligonucleotides also can affect their ability to act as modulators of immune response through TLR9 (see, e.g., Zhao et al., Biochem. Pharmacol. (1996), vol. 51:173-182). TLR9 also recognizes genomic DNA from DNA viruses such as HSV-1, HSV-2, EBV, human papillomavirus type 16 (HPV16), CMV, or MCMV. In addition to nucleic acids, hemozoin, a malaria-derived insoluble crystal, is a ligand for TLR9, as are DNA:RNA hybrids.

TLR9 ligand binding in mice leads to the production of high levels of IFNα, mainly from plasmacytoid dendritic cells (pDCs), which requires MyD88 and IRF7 (see, e.g., Akira et al., Cell (2006), vol. 124, no. 4:783-801). MyD88 (myeloid differentiation factor 88) is an adaptor molecule that increases the expression of NF-κB. CD14 may be necessary for induction of pro-inflammatory cytokines by interacting with TLR9 (Baumann et al., J. Exp. Med. (2010), vol. 207:2689-2701).

Naturally occurring agonists of TLR9 can produce anti-tumor activity (e.g., tumor growth and angiogenesis) resulting in an effective anti-cancer response (e.g. anti-leukemia; Smith and Wickstrom, J. Natl. Cancer Inst. (1998), vol. 90:1146-1154). In addition, TLR9 agonists can work synergistically with other known anti-tumor compounds (e.g. cetuximab, irinotecan; Vincenzo et al., Clin. Cancer Res. (2006), vol. 12(2):577-583).

Described herein are particular monoclonal antibodies to TLR9 that provide superior target specificity, signal-to-noise ratios, and the like as compared to other reported anti-TLR antibodies, as well as antigen-binding fragments of such antibodies that also bind TLR9.

DEFINITIONS

An "acceptor human framework" refers to a framework comprising the amino acid sequence of a heavy chain variable domain (VH) framework or a light chain variable domain (VL) framework derived from a human immunoglobulin framework or a human consensus framework, as defined herein. An acceptor human framework "derived from" a human immunoglobulin framework or a human consensus framework may comprise the same amino acid sequence thereof, or it may contain amino acid sequence changes. In some embodiments, the number of framework amino acid changes are 10 or less, 9 or less, 8 or less, 7 or less, 6 or less, 5 or less, 4 or less, 3 or less, or 2 or less. In some embodiments, the VH and/or VL acceptor human framework(s) is(are) identical in sequence to the VH and/or VL human immunoglobulin framework amino acid sequence or human consensus framework amino acid sequence.

"Framework" or "FR" refers to variable domain residues other than hypervariable region (HVR) residues. The FR of a variable domain generally consists of four FR domains: FR1; FR2; FR3; and FR4. Accordingly, the HVR and FR sequences generally appear in the following sequence in VH (or VL): FR1-H1(L1)-FR2-H2(L2)-FR3-H3(L3)-FR4.

A "human consensus framework" is a framework that represents the most commonly occurring amino acid residues in a selection of human immunoglobulin VL or VH framework sequences. Generally, the selection of human immunoglobulin VL or VH sequences is from a subgroup of variable domain sequences. Generally, the subgroup of sequences is a subgroup as in Kabat et al., Sequences of Proteins of Immunological Interest, Fifth Edition, NIH Publication 91-3242, Bethesda Md. (1991), vols. 1-3. In some embodiments, for the VL, the subgroup is subgroup kappa I as in Kabat et al., supra. In some embodiments, for the VH, the subgroup is subgroup III as in Kabat et al., supra.

The term "hypervariable region" or "HVR", as used herein, refers to each of the regions of an antibody variable domain that are hypervariable in sequence and/or form structurally defined loops ("hypervariable loops"). Generally, native four-chain antibodies comprise six HVRs; three in the VH (H1, H2, H3), and three in the VL (L1, L2, L3). HVRs generally comprise amino acid residues from the hypervariable loops and/or from the "complementarity determining regions" (CDRs), the latter being of highest sequence variability and/or involved in antigen recognition. Certain hypervariable loops occur at amino acid residues 26-32 (L1), 50-52 (L2), 91-96 (L3), 26-32 (H1), 53-55 (H2), and 96-101 (H3). See Chothia and Lesk, J. Mol. Biol. 196:901-917 (1987). In contrast, CDRs (CDR-L1, CDR-L2, CDR-L3, CDR-H1, CDR-H2, and CDR-H3) often occur at amino acid residues 24-34 of L1, 50-56 of L2, 89-97 of L3, 31-35B of H1, 50-65 of H2, and 95-102 of H3 as described by Kabat et al., Sequences of Proteins of Immunological Interest, 5th Ed. Public Health Service, National Institutes of Health, Bethesda, Md. (1991). With the exception of CDR1 in VH, CDRs generally comprise the amino acid residues that form the hypervariable loops. CDRs also comprise "specificity determining residues," or "SDRs," which are residues that contact a particular antigen. Unless otherwise indicated, HVR residues and other residues in the variable domain (e.g., FR residues) are numbered herein according to Kabat et al., supra.

The term "variable region" or "variable domain" refers to the domain of an antibody heavy or light chain that is involved in binding the antibody to antigen. The variable domains of the heavy chain and light chain (VH and VL, respectively) of a native antibody generally have similar structures, with each domain comprising four conserved framework regions (FRs) and three hypervariable regions (HVRs). See, e.g., Kindt et al. Kuby Immunology, 6th ed., W.H. Freeman and Co., page 91 (2007). A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively. See, e.g., Portolano et al., J. Immunol. 150:880-887 (1993); Clarkson et al., Nature 352:624-628 (1991).

"Affinity" refers to the strength of the sum total of non-covalent interactions between a single binding site of a molecule (e.g., an antibody) and its binding partner (e.g., an antigen). Unless indicated otherwise, "binding affinity" refers to intrinsic binding affinity, which reflects a 1:1 interaction between members of a binding pair (e.g., antibody and antigen). The affinity of a molecule X for its partner Y can generally be represented by a dissociation constant (Kd). Affinity can be measured by common methods known in the art, including those described herein. Specific illustrative and example embodiments for measuring binding affinity are described elsewhere herein. In some instances, antibodies herein bind to a target (e.g., TLR9) with a high affinity, e.g., a $K_d$ value of no more than about $1\times10^{-7}$ M; preferably no more than about $1\times10^{-8}$ M; and preferably no more than about $5\times10^{-9}$ M.

An "affinity matured" antibody refers to an antibody with one or more alterations in one or more hypervariable regions (HVRs), compared to a parent antibody that does not possess such alterations. Preferably, such alterations result in improved affinity of the antibody for its target antigen.

The term "anti-TLR9 agent" refers to a molecule that is, or comprises, one or more anti-TLR9 antibodies, TLR9-binding antibody fragments, or TLR9-binding antibody derivatives.

The terms "anti-TLR9 antibody" and "an antibody that binds to TLR9" refer to an antibody that is capable of binding TLR9 with sufficient affinity and/or specificity such that the antibody is useful as a research tool, diagnostic agent and/or therapeutic agent in targeting TLR9. In some embodiments, the extent of binding of an anti-TLR9 antibody (or antigen-binding fragment thereof) to an unrelated, non-TLR9 protein is less than about 10% of the binding of the antibody to TLR9 as measured, e.g., by a radioimmunoassay (RIA) or by Scatchard analysis or by surface plasmon resonance, such as, for example, Biacore. In certain embodiments, an antibody that binds to TLR9 has a dissociation constant (Kd) of 0.1 μM, 100 nM, 10 nM, 1 nM, 0.1 nM, 0.01 nM, or 0.001 nM (e.g., $10^{-7}$ M or less, e.g., from $10^{-7}$ M to $10^{-13}$ M). In certain embodiments, an anti-TLR9 antibody binds to an epitope of TLR9 that is conserved among TLR9 from different species.

The term "antibody" herein is used in the broadest sense and encompasses various antibody structures, including, but not limited to, monoclonal antibodies, polyclonal antibodies, multispecific antibodies (e.g., bispecific antibodies), and antibody fragments so long as they exhibit the desired antigen-binding activity.

An "antibody derivative" refers to a molecule other than an intact antibody that comprises a portion derived from an intact antibody (or antigen-binding fragment thereof) and that binds the antigen to which the intact antibody (or antigen-binding fragment thereof) binds. Examples of antibody derivatives include but are not limited to single chain variable fragments (scFv), diabodies, triabodies, and the like, aptamers comprising multiple antigen-binding antibody fragments, single chain variable fragments, diabodies, triabodies, and the like.

An "antibody fragment" or "antigen-binding antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')2 and multispecific antibodies formed from antibody fragments.

The terms "full length antibody," "intact antibody," and "whole antibody" are used herein interchangeably to refer to an antibody having a structure substantially similar to a native antibody structure or having heavy chains that contain an Fc region as defined herein.

The term "Fc region" herein is used to define a C-terminal region of an immunoglobulin heavy chain that contains at least a portion of the constant region. The term includes native sequence Fc regions and variant Fc regions. In one embodiment, a human IgG heavy chain Fc region extends from Cys226, or from Pro230, to the carboxyl-terminus of the heavy chain. However, the C-terminal lysine (Lys447) of the Fc region may or may not be present. Unless otherwise specified herein, numbering of amino acid residues in the Fc region or constant region is according to the EU numbering system, also called the EU index, as described in Kabat et al., Sequences of Proteins of Immunological Interest, 5th Ed. Public Health Service, National Institutes of Health, Bethesda, Md., 1991.

An "antibody that binds to the same epitope" as a reference antibody (e.g., an antibody that binds TLR9) refers to an antibody that blocks binding of the reference antibody to its antigen in a competition assay by 50% or more, and conversely, the reference antibody blocks binding of the antibody to its antigen in a competition assay by 50% or more.

The term "chimeric" antibody refers to an antibody in which a portion of the heavy and/or light chain is derived from a particular source or species, while the remainder of the heavy and/or light chain is derived from a different source or species.

A "human antibody" is one that possesses an amino acid sequence corresponding to that of an antibody produced by a human or a human cell or derived from a non-human source that utilizes human antibody repertoires or other human antibody-encoding sequences. This definition of a human antibody specifically excludes a "humanized" antibody comprising non-human antigen-binding residues.

A "humanized" antibody refers to a chimeric antibody comprising amino acid residues from non-human HVRs and amino acid residues from human FRs. In certain embodiments, a humanized antibody will comprise substantially all of at least one, and typically two, variable domains, in which all or substantially all of the HVRs (e.g., CDRs) correspond to those of a non-human antibody, and all or substantially all of the FRs correspond to those of a human antibody. A humanized antibody optionally may comprise at least a portion of an antibody constant region derived from a human antibody. In some embodiments, a humanized antibody (or antigen-binding fragment or derivative thereof), when aligned with the antibody from which the acceptor framework regions were derived, includes one or more amino acid substitutions (or deletions or insertions) at desired locations. In some such embodiments, the amino acid residue(s) substituted (or inserted or deleted) at a particular position in the human (or other) or other FR corresponds to the amino acid residue(s) at the corresponding location(s) in the parent antibody (i.e., the non-human antibody from which the CDRs or HVRs were derived). A "humanized form" of an antibody, e.g., a non-human antibody, refers to an antibody that has undergone humanization.

The term "antibody drug conjugate" (ADC) as used herein is equivalent to the term "immunoconjugate," and represents a particular class of agent-drug conjugates. Here, "agent-drug conjugate" is an anti-TLR9 agent (e.g., an anti-TLR9 antibody or TLR9-binding fragment or derivative thereof) conjugated to one or more heterologous molecule(s), including, but not limited to, a cytotoxic agent.

The term "cytotoxic agent" as used herein refers to a substance that inhibits or prevents a cellular function and/or causes cell death or destruction. Cytotoxic agents include, but are not limited to, radioactive isotopes (e.g., $At^{211}$, $I^{131}$, $I^{125}$, $Y^{90}$, $Re^{186}$, $Re^{188}$, $Sm^{153}$, $Bi^{212}$, $P^{32}$, $Pb^{212}$, and radioactive isotopes of Lu); chemotherapeutic agents or drugs (e.g., methotrexate, adriamycin, vinca alkaloids (vincristine, vinblastine, etoposide), doxorubicin, melphalan, mitomycin C, chlorambucil, daunorubicin or other intercalating agents); growth inhibitory agents; enzymes and fragments thereof such as nucleolytic enzymes; antibiotics; toxins such as small molecule toxins or enzymatically active toxins of bacterial, fungal, plant or animal origin, including fragments and/or variants thereof, and the various antitumor or anticancer agents disclosed below.

A "diagnostic reagent" refers to a compound, e.g., a target-specific antibody (or antigen-binding thereof) used to perform a diagnostic assay.

"Effector functions" refer to those biological activities attributable to the Fc region of an antibody, which vary with the antibody isotype. Examples of antibody effector functions include: C1q binding and complement dependent cytotoxicity (CDC); Fc receptor binding; antibody-dependent cell-mediated cytotoxicity (ADCC); phagocytosis; down regulation of cell surface receptors (e.g. B cell receptor); and B cell activation.

An "effective amount" of an agent, e.g., a pharmaceutical formulation, refers to an amount effective, at dosages and for periods of time necessary, to achieve the desired therapeutic or prophylactic result.

The term "epitope" refers to the particular site on an antigen molecule to which an antibody binds.

The terms "host cell", "host cell line", and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

A "rabbit antibody" is one that possesses an amino acid sequence that corresponds to that of an antibody produced by a rabbit or a rabbit cell or derived from a non-rabbit source that utilizes rabbit antibody repertoires or other rabbit antibody-encoding sequences.

An "immunoconjugate" is an antibody (or antigen-binding fragment or derivative thereof) conjugated to one or more heterologous molecule(s), including, but not limited to, a cytotoxic agent. An immunoconjugate is equivalent to the term "antibody drug conjugate" (ADC).

An "individual" or "patient" or "subject" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

An "isolated" molecule (e.g., nucleic acid, antibody) is one that has been separated from a component of its original environment (e.g., the natural environment if it is naturally occurring, or a host cell if expressed exogenously), and thus is altered by human intervention (e.g., "by the hand of man") from its original environment. In some embodiments, for example, an antibody is purified to greater than 95% or 99% purity as determined by, for example, electrophoretic (e.g., SDS-PAGE, isoelectric focusing (IEF), capillary electrophoresis) or chromatographic (e.g., ion exchange or reverse phase HPLC). An isolated nucleic acid may refer to a nucleic acid molecule contained in cells that ordinarily contain the nucleic acid molecule, but the nucleic acid molecule is present extrachromosomally or at a chromosomal location that is different from its natural chromosomal location. In some embodiments, an isolated nucleic acid can be provided with fewer non-nucleic acid components (e.g., protein, lipid) than the amount of components present in a source sample. A composition comprising isolated nucleic acid can be about 50% to greater than 99% free of non-nucleic acid components. A composition comprising isolated nucleic acid can be about 90%, 91%, 92%, 93%, 94%, 95%, 96%, 97%, 98%, 99% or greater than 99% free of non-nucleic acid components.

"Isolated nucleic acid encoding an anti-TLR9 antibody" refers to one or more nucleic acid molecules encoding antibody heavy and light chains (or fragments thereof), including such nucleic acid molecule(s) in a single vector or separate vectors, and such nucleic acid molecule(s) present at one or more locations in a recombinant host cell.

The term "TLR9," as used herein, refers to any native, mature TLR9 that results from processing of a TLR9 precursor protein in a cell. The term includes TLR9 from any vertebrate source, including mammals such as primates (e.g. humans and cynomolgus or rhesus monkeys) and rodents (e.g., mice and rats), unless otherwise indicated. The term also includes naturally occurring variants of TLR9, e.g., splice variants or allelic variants. The amino acid sequence of an example full-length human TLR9 precursor protein is shown in FIG. 1 (SEQ ID NO: 72; of the 1032 amino residues, the first 25 are a signal peptide and residues 26-1032 constitute the mature, processed protein).

The term "TLR9-positive cell" refers to any cell that expresses TLR9 on its surface or on an intracellular membrane or organelle (e.g., endosome, ER, Golgi apparatus, lysosome, and the like). Some cells, including those infected by a microbe or associated with some cancer types and tumors, exhibit up-regulation of TLR9 expression.

The term "monoclonal antibody" refers to an antibody obtained from a population of substantially homogeneous antibodies, i.e., the individual antibodies comprising the population are identical (as assessed at the level of Ig heavy and/or light chain amino acid sequence) and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method. For example, the monoclonal antibodies to be used in accordance with the present technology may be made by a variety of techniques, including, but not limited to, the hybridoma method, recombinant DNA methods, phage-display methods, and methods utilizing transgenic animals containing all or part of the human immunoglobulin loci, such methods and other example methods for making monoclonal antibodies being described herein.

The term "package insert" is used to refer to instructions customarily included in commercial packages of therapeutic products, that contain information about the indications, usage, dosage, administration, combination therapy, contraindications and/or warnings concerning the use of such therapeutic products.

"Percent (%) amino acid sequence identity" with respect to a reference polypeptide sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared.

The term "pharmaceutical composition" refers to a preparation that is in such form as to permit the biological activity of an active ingredient contained therein to be effective, and which contains no additional components which are unacceptably toxic to a subject to which the formulation would be administered.

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

As used herein, "treatment" (and grammatical variations thereof such as "treat" or "treating") refers to clinical intervention in an attempt to alter the natural course of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. In some embodiments, antibodies herein are used to delay development of a disease or to slow the progression of a disease.

The term "vector" refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors."

BRIEF SUMMARY

Provided herein, in some aspects, are anti-TLR9 agents that bind Toll-like Receptor 9 (TLR9), including anti-TLR9 antibodies, TLR9-binding antibody fragments, derivatives, and variants of such antibodies and antibody fragments (including immunoconjugates, labeled antibodies and antigen-binding antibody fragments, and the like), diagnostic reagents that comprise such agents, containers and kits that include an anti-TLR9 agent provided herein, and methods of making and using the same.

Provided herein, in certain aspects, is an anti-TLR9 agents that binds TLR9 under laboratory or physiological conditions, where the agent comprises at least one immunoglobulin heavy chain variable domain and at least one immunoglobulin light chain variable domain, where a) each immunoglobulin heavy chain variable domain of the anti-TLR9 agent comprises first, second, and third heavy chain complementarity determining regions (CDRs), where the first heavy chain CDR (CDRH1) comprises an amino acid sequence that is at least 80 percent identical to the amino acid sequence $NX_1X_2MX_3$ (SEQ ID NO: 76), where $X_1$ is Y or F, $X_2$ is G or E, and $X_3$ is N, H or T; the second heavy chain CDR (CDRH2) comprises an amino acid sequence that is at least 80 percent identical to the amino acid sequence $SISSX_1X_2SYIX_3YX_4X_5X_6VKG$ (SEQ ID NO: 77), where $X_1$ is S or T, $X_2$ is S or R, $X_3$ is Y or S, $X_4$ is A or V, $X_5$ is D or E, and $X_6$ is T or S; and the third heavy chain CDR (CDRH3) comprises an amino acid sequence that is at least 80 percent identical to the amino acid sequence $X_1X_2X_3X_4X_5X_6X_7X_8X_9X_{10}$ (SEQ ID NO: 78), where $X_1$ is Y, A, Q, F, S, H or R, $X_2$ is T, D, P, W, G or S, $X_3$ is L, I, M, V or T, $X_4$ is G, T, A, D or Y, $X_5$ is I, T, G or V, $X_6$ is T, A, P, Y, G or D, $X_7$ is no amino acid, A, G or P, $X_8$ is I, P, F or L, $X_9$ is D, H, E or A, and $X_{10}$ is Y or H; and b) each immunoglobulin light chain variable domain of the anti-TLR9 agent comprises first, second, and third light chain CDRs, where the first light chain CDR (CDRL1) comprises an amino acid sequence that is at least 80 percent identical to the amino acid sequence $X_1ASEDIYNX_2LA$ (SEQ ID NO: 79), where $X_1$ is L or R; and $X_2$ is N or G; the second light chain CDR (CDRL2) comprises an amino acid sequence that is at least 80 percent identical to the amino acid sequence $X_1X_2X_3X_4LX_5X_6$ (SEQ ID NO: 80), where $X_1$ is Y, N or H; $X_2$ is A or T; $X_3$ is S or N; $X_4$ is T, S, N or R; $X_5$ is Q or H; and $X_6$ is D, Y, T or I; and the third light chain CDR (CDRL3) comprises an amino acid sequence that is at least 80 percent identical to the amino acid sequence $X_1QX_2X_3X_4X_5X_6X_7T$ (SEQ ID NO: 81), where $X_1$ is L or Q, $X_2$ is D, Y or E, $X_3$ is S or Y, $X_4$ is E or D, $X_5$ is Y or F, $X_6$ is P or L, and $X_7$ is F, Y, N, W, L or P.

Also provided in certain aspects is a first anti-TLR9 agent that binds TLR9 under laboratory or physiological conditions, where the first agent competitively binds with a second anti-TLR9 agent, which second agent comprises at least one immunoglobulin heavy chain variable domain and at least one immunoglobulin light chain variable domain, where a) each immunoglobulin heavy chain variable domain of the second agent comprises first, second, and third heavy chain complementarity determining regions (CDRs), where the first heavy chain CDR (CDRH1) comprises an amino acid sequence that is at least 80 percent identical to the amino acid sequence $NX_1X_2MX_3$ (SEQ ID NO: 76), where $X_1$ is Y or F, $X_2$ is G or E, and $X_3$ is N, H or T; the second heavy chain CDR (CDRH2) comprises an amino acid sequence that is at least 80 percent identical to the amino acid sequence $SISSX_1X_2SYIX_3YX_4X_5X_6VKG$ (SEQ ID NO: 77), where $X_1$ is S or T, $X_2$ is S or R, $X_3$ is Y or S, $X_4$ is A or V, $X_5$ is D or E, and $X_6$ is T or S; and the third heavy chain CDR (CDRH3) comprises an amino acid sequence that is at least 80 percent identical to the amino acid sequence $X_1X_2X_3X_4X_5X_6X_7X_8X_9X_{10}$ (SEQ ID NO: 78), where $X_1$ is Y, A, Q, F, S, H or R, $X_2$ is T, D, P, W, G or S, $X_3$ is L, I, M, V or T, $X_4$ is G, T, A, D or Y, $X_5$ is I, T, G or V, $X_6$ is T, A, P, Y, G or D, $X_7$ is no amino acid, A, G or P, $X_8$ is I, P, F or L, $X_9$ is D, H, E or A, and $X_{10}$ is Y or H; and b) each immunoglobulin light chain variable domain of the second agent comprises first, second, and third light chain CDRs, where the first light chain CDR (CDRL1) comprises an amino acid sequence that is at least 80 percent identical to the amino acid sequence $X_1ASEDIYNX_2LA$ (SEQ ID NO: 79), where $X_1$ is L or R; and $X_2$ is N or G; the second light chain CDR (CDRL2) comprises an amino acid sequence that is at least 80 percent identical to the amino acid sequence $X_1X_2X_3X_4LX_5X_6$ (SEQ ID NO: 80), where $X_1$ is Y, N or H; $X_2$ is A or T; $X_3$ is S or N; $X_4$ is T, S, N or R; $X_5$ is Q or H; and $X_6$ is D, Y, T or I; and the third light chain CDR (CDRL3) comprises an amino acid sequence that is at least 80 percent identical to the amino acid sequence $X_1QX_2X_3X_4X_5X_6X_7T$ (SEQ ID NO: 81), where $X_1$ is L or Q, $X_2$ is D, Y or E, $X_3$ is S or Y, $X_4$ is E or D, $X_5$ is Y or F, $X_6$ is P or L, and $X_7$ is F, Y, N, W, L or P.

Also provided in certain aspects is a first anti-TLR9 agent that binds Toll-like Receptor 9 (TLR9) under laboratory or physiological conditions, where the first agent binds to the same epitope as a second anti-TLR9 agent, which second agent comprises at least one immunoglobulin heavy chain variable domain and at least one immunoglobulin light chain variable domain, where a) each immunoglobulin heavy chain variable domain of the second agent comprises first, second, and third heavy chain complementarity determining regions (CDRs), where the first heavy chain CDR (CDRH1) comprises an amino acid sequence that is at least 80 percent identical to the amino acid sequence $NX_1X_2MX_3$ (SEQ ID NO: 76), where $X_1$ is Y or F, $X_2$ is G or E, and $X_3$ is N, H or T; the second heavy chain CDR (CDRH2) comprises an amino acid sequence that is at least 80 percent identical to the amino acid sequence $SISSX_1X_2SYIX_3YX_4X_5X_6VKG$ (SEQ ID NO: 77), where $X_1$ is S or T, $X_2$ is S or R, $X_3$ is Y or S, $X_4$ is A or V, $X_5$ is D or E, and $X_6$ is T or S; and the third heavy chain CDR (CDRH3) comprises an amino acid sequence that is at least 80 percent identical to the amino acid sequence $X_1X_2X_3X_4X_5X_6X_7X_8X_9X_{10}$ (SEQ ID NO: 78), where $X_1$ is Y, A, Q, F, S, H or R, $X_2$ is T, D, P, W, G or S, $X_3$ is L, I, M, V or T, $X_4$ is G, T, A, D or Y, $X_5$ is I, T, G or V, $X_6$ is T, A, P, Y, G or D, $X_7$ is no amino acid, A, G or P, $X_8$ is I, P, F or L, $X_9$ is D, H, E or A, and $X_{10}$ is Y or H; and b) each immunoglobulin light chain variable domain of the second agent comprises first, second, and third light chain CDRs, where the first light chain CDR (CDRL1) comprises an amino acid sequence that is at least 80 percent identical to the amino acid sequence $X_1ASEDIYNX_2LA$ (SEQ ID NO: 79), where $X_1$ is L or R; and $X_2$ is N or G; the second light chain CDR (CDRL2) comprises an amino acid sequence that is at least 80 percent identical to the amino acid sequence $X_1X_2X_3X_4LX_5X_6$ (SEQ ID NO: 80), where $X_1$ is Y, N or H; $X_2$ is A or T; $X_3$ is S or N; $X_4$ is T, S, N or R; $X_5$ is Q or H; and $X_6$ is D, Y, T or I; and the third light chain CDR (CDRL3) comprises an amino acid sequence that is at least 80 percent identical to the amino acid sequence $X_1QX_2X_3X_4X_5X_6X_7T$ (SEQ ID NO: 81), where $X_1$ is L or Q, $X_2$ is D, Y or E, $X_3$ is S or Y, $X_4$ is E or D, $X_5$ is Y or F, $X_6$ is P or L, and $X_7$ is F, Y, N, W, L or P.

Also provided in certain aspects are anti-TLR9 agents for detecting TLR9 in a heterogeneous population of immune cells, where TLR9 is detected at a significant level in plasmacytoid dendritic cells (pDCs) and/or B cells in the population, and TLR9 is not significantly detected in other immune cells in the population.

Also provided in certain aspects are methods of detecting TLR9 in a heterogeneous population of immune cells, comprising contacting the population with an anti-TLR9 agent provided herein, where TLR9 is not significantly detected in other immune cells in the population.

In one aspect, provided herein are isolated, non-naturally occurring anti-TLR9 agents, particularly antibodies, or antigen-binding fragments or derivatives thereof, that bind Toll-like receptor 9 (TLR9) under physiological conditions. In the context of anti-TLR9 antibodies or antigen-binding fragments, such molecules generally comprise two immunoglobulin heavy chain variable domains and two immunoglobulin light chain variable domains. In such molecules, each of the immunoglobulin heavy and light chain variable domains comprise first, second, and third chain complementarity determining regions (CDRs) arrayed as follows: FR1-CDR1-FR2-CDR2-FR3-CDR3-FR4.

In the heavy chain variable domain portions, the first heavy chain CDR (CDRH1) comprises an amino acid sequence that has a sequence identity of at least 65 percent, optionally a sequence identity of at least 80 percent, at least 90 percent, at least 95 percent, and 100 percent identity with the amino acid sequence NYGMN or NFGMN (SEQ ID NOS:1 and 2, respectively), the second heavy chain CDR (CDRH2) comprises an amino acid sequence that has a sequence identity of at least 65 percent, optionally a sequence identity of at least 80 percent, at least 90 percent, at least 95 percent, and 100 percent identity with the amino acid sequence SISSSSSYIYYADTVKG, SISSTSSYIYY-ADTVKG, SISSTSSYISYADTVKG, SISST-SSYIYYVDTVKG, SISSTSSYIYYADSVKG, or SIS-STRSYIYYAETVKG (SEQ ID NOS:3-8, respectively), and the third heavy chain CDR (CDRH3) comprises an amino acid sequence that has a sequence identity of at least 65 percent, optionally a sequence identity of at least 80 percent, at least 90 percent, at least 95 percent, and 100 percent identity with the amino acid sequence YTLGIT-IDY, ADI-TIAAPHY, QDITTP-FDY, FTLGIT-LDY, SPMGITGFEY, HWVGGY-FDY, HTIGIT-FDY, YTLGIT-LDY, RGLAVGPFDY, QSITVP-FDY, QSTYGD-FDY, HTVDTP-FAH, or xTIGIT-FDY (SEQ ID NO:9-21, respectively).

In the light chain variable domain portions, the first light chain CDR (CDRL1) comprises an amino acid sequence that has a sequence identity of at least 65 percent, optionally a sequence identity of at least 80 percent, at least 90 percent, at least 95 percent, and 100 percent identity with the amino acid sequence LASEDIYNNLA or RASEDIYNGLA (SEQ ID NOS:22 and 23, respectively), the second light chain CDR (CDRL2) comprises an amino acid sequence that has a sequence identity of at least 65 percent, optionally a sequence identity of 100 percent identity with the amino acid sequence YASTLQD, YASSLQD, YASTLQY, NANSLHT, YTSNLQD, NANTLHI, or HASRLQD (SEQ ID NOS:24-30, respectively), and the third light chain CDR (CDRL3) comprises an amino acid sequence that has a sequence identity of at least 65 percent, optionally a sequence identity of at least 80 percent, at least 90 percent, at least 95 percent, and 100 percent identity with the amino acid sequence LQDSEYPFT, LQDSEFPYT, LQDSEFPNT, LQDSEYPWT, LQDSEYPYT, QQYYDYLPT, LQESEY-PWT, LQDSEYPLT, or QQYSDYPWT (SEQ ID NOS:31-39, respectively).

In some embodiments, the isolated, non-naturally occurring anti-TLR9 antibodies, or TLR9-binding fragments thereof, include a first heavy chain CDR having the amino acid sequence DYYMT (SEQ ID NO:1), the second heavy chain CDR has the amino acid sequence FIRNK-ANGYTTEYSASVKG (SEQ ID NO:2), the third heavy chain CDR has the amino acid sequence YLQTGNFDY (SEQ ID NO:3), the first light chain CDR has the amino acid sequence RASQDISNFLN (SEQ ID NO:5), the second light chain CDR has the amino acid sequence FTSRLHS (SEQ ID NO:6), and the third light chain CDR has the amino acid sequence QQGYTVPPT (SEQ TD NO:7).

In some embodiments, the isolated anti-TLR9 agent comprises a non-naturally occurring anti-TLR9 antibody (mAb) comprising two immunoglobulin heavy chain variable domains comprising first, second, and third heavy chain complementarity determining regions (CDRH1-3, respectively) and two immunoglobulin light chain variable domains comprising first, second, and third light chain complementarity determining regions (CDRL1-3, respectively), where the antibody comprises immunoglobulin heavy chain variable domains and immunoglobulin light chain variable domains having sets of CDRH1-3 and CDRL1-3 selected from the group consisting of:

antigen-binding antibody fragment) is an IgG. In other embodiments, the IgG is an IgG1, IgG2a or IgG2b, or IgG3, or IgG4.

| mAb | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 1 | NYGMN (1) | SISSSSSYIYYADTVKG (3) | YTLGIT-IDY (9) | LASEDIYNNLA (22) | YASTLQD (24) | LQDSEYPFT (31) |
| 2 | NFGMN (2) | SISSTSSYIYYADTVKG (4) | ADITIAAPHY (10) | LASEDIYNNLA (22) | YASSLQD (25) | LQDSEFPYT (32) |
| 3 | NFGMN (2) | SISSTSSYIYYADTVKG (4) | ADITIAAPHY (10) | LASEDIYNNLA (22) | YASSLQD (25) | LQDSEFPYT (32) |
| 4 | NFGMH (2) | SISSTSSYISYADTVKG (5) | QDITTP-FDY (11) | LASEDIYNNLA (22) | YASTLOY (26) | LQDSEFPNT (33) |
| 5 | NFGMN (2) | SISSTSSYIYYADTVKG (4) | ADITIAAPHY (10) | LASEDIYNNLA (22) | YASSLQD (25) | LQDSEFPYT (32) |
| 6 | NYGMN (1) | SISSTSSYIYYADTVKG (4) | FTLGIT-LDY (12) | LASEDIYNNLA (22) | YASSLQD (25) | LQDSEYPWT (34) |
| 7 | NYGMN (1) | SISSSSSYIYYADTVKG (3) | SPMGITGFEY (13) | LASEDIYNNLA (22) | YASSLQD (25) | LQDSEYPYT (35) |
| 8 | NYGMN (1) | SISSSSSYIYYADTVKG (3) | HWVGGY-FDY (14) | RASEDIYNGLA (23) | NANSLHT (27) | QQYYDYLPT (36) |
| 9 | NFGMN (2) | SISSTSSYIYYADTVKG (4) | HTIGIT-FDY (15) | LASEDIYNNLA (22) | YASSLQD (25) | LQDSEYPWT (34) |
| 10 | NYGMN (1) | SISSSSSYIYYADTVKG (3) | YTLGIT-LDY (16) | LASEDIYNNLA (22) | YASSLQD (25) | LQESEYPWT (37) |
| 11 | NYEMN (1) | SISSTSSYIYYADTVKG (4) | RGLAVGPFDY (17) | LASEDIYNNLA (22) | YASSLQD (25) | LQDSEYPLT (38) |
| 12 | NYGMT (1) | SISSTSSYIYYVDTVKG (6) | QSITVP-FDY (18) | LASEDIYNNLA (22) | YTSNLQD (28) | LQDSEYPFT (31) |
| 13 | NYGMN (1) | SISSTSSYIYYADSVKG (7) | QSTYGD-FDY (19) | RASEDIYNGLA (23) | NANTLHI (29) | QQYSDYPWT (39) |
| 14 | NYEMN (1) | SISSTSSYIYYADTVKG (4) | RGLAVGPFDY (17) | LASEDIYNNLA (22) | YASSLQD (25) | LQDSEYPLT (38) |
| 15 | NYGMN (1) | SISSTRSYIYYAETVKG (8) | HTVDTP-FAH (20) | LASEDIYNNLA (22) | HASRLQD (30) | LQDSEYPWT (34) |
| 16 | NYGMN (1) | SISSTSSYIYYADTVKG (4) | xTIGIT-FDY (21) | LASEDIYNNLA (22) | YASSLQD (25) | LQDSEYPWT (34) |

In some embodiments, the isolated anti-TLR9 agent comprises a non-naturally occurring anti-TLR9 antibody (mAb) comprising two immunoglobulin heavy chain variable domains and two immunoglobulin light chain variable domains, where the immunoglobulin heavy chain variable domains have an amino acid sequence selected from among SEQ ID NOS: 41-56 or an amino acid sequence having at least 65%-95% or more sequence identity with any such heavy chain variable domain sequence and the immunoglobulin light chain variable domains are selected from among SEQ ID NOS: 57-71 or an amino acid sequence having at least 65%-95% or more sequence identity with any such light chain variable domain sequence.

In some embodiments, where the anti-TLR9 agents are antibodies, or antigen-binding antibody fragments thereof, the antibodies (or fragments thereof) are monoclonal antibodies, and may be camel, human, humanized, mouse, rabbit, or other mammalian antibodies or antigen-binding antibody fragments. In some embodiments, the antibody (or In certain embodiments of anti-TLR9 antibodies and antigen-binding antibody fragments that are other than fully human antibodies (i.e., antibodies produced or derived from a mammal capable of producing all or a portion of the human antibody repertoire), the molecules are chimeric or humanized anti-TLR9 antibodies and antigen-binding antibody fragments.

In some embodiments, the anti-TLR9 antibody, antigen-binding antibody fragment, or derivative or variant thereof includes a detectable label.

In some embodiments, the anti-TLR9 agent, for example, an anti-TLR9 antibody, antigen-binding antibody fragment, or derivative or variant thereof, is part of an immunoconjugate that further includes a cytotoxic agent, for example, a nucleic acid, a peptide, a polypeptide, a small molecule, or an aptamer.

A related aspect of technology described herein concerns compositions that include an anti-TLR9 agent that is an isolated, non-naturally occurring anti-TLR9 antibody or an antigen-binding antibody fragment according to the technology described herein. In addition to containing an anti-TLR9 antibody or an antigen-binding antibody fragment described herein, such compositions typically also include a carrier, for example, a pharmaceutically acceptable carrier. Such compositions may be packaged in containers, which in some embodiments, are further packaged into kits that also include instructions for use. In the context of pharmaceutical compositions, such kits instructions are a package insert containing not only instructions for use but also information about the pharmaceutically active ingredient (e.g., the anti-TLR9 antibody, antigen-binding antibody fragment, or derivative or variant thereof).

Another related aspect concerns diagnostics configured to detect TLR9 in a biological sample, often a biological sample taken from a subject. Such kits include a diagnostic reagent that includes an anti-TLR9 agent described herein, for example, an anti-TLR9 antibody, antigen-binding antibody fragment, or derivative or variant thereof conjugated with detectable reagents such as fluorophores or enzyme substrates and/or immobilized on a solid support.

Still other aspects of technology provided herein concern the manufacture of an anti-TLR9 agent described herein. In the context of anti-TLR9 antibodies (or antigen-binding antibody fragments or derivatives or variants thereof), one such aspect concerns isolated nucleic acid molecules that encode polypeptides provided herein. In some embodiments, such nucleic acids encode an immunoglobulin heavy chain variable domain having a first heavy chain CDR (CDRH1) that includes an amino acid sequence that has a sequence identity of at least 65 percent, optionally a sequence identity of at least 80 percent, at least 90 percent, at least 95 percent, and 100 percent identity with the amino acid sequence NYGMN or NFGMN (SEQ ID NOS:1 and 2, respectively), a second heavy chain CDR (CDRH2) that includes an amino acid sequence that has a sequence identity of at least 65 percent, optionally a sequence identity of at least 80 percent, at least 90 percent, at least 95 percent, and 100 percent identity with the amino acid sequence SIS-SSSSYIYYADTVKG, SISSTSSYIYYADTVKG, SISST-SSYISYADTVKG, SISSTSSYIYYVDTVKG, SISST-SSYIYYADSVKG, or SISSTRSYIYYAETVKG (SEQ ID NOS:3-8, respectively), and a third heavy chain CDR (CDRH3) that includes an amino acid sequence that has a sequence identity of at least 65 percent, optionally a sequence identity of at least 80 percent, at least 90 percent, at least 95 percent, and 100 percent identity with the amino acid sequence YTLGIT-IDY, ADITIAAPHY, QDITTP-FDY, FTLGIT-LDY, SPMGITGFEY, HWVGGY-FDY, HTIGIT-FDY, YTLGIT-LDY, RGLAVGPFDY, QSITVP-FDY, QSTYGD-FDY, HTVDTP-FAH, or xTIGIT-FDY (SEQ ID NO:9-21, respectively). Such nucleic acids may also encode an immunoglobulin light chain variable domain where a first light chain CDR (CDRL1) that includes an amino acid sequence that has a sequence identity of at least 65 percent, optionally a sequence identity of at least 80 percent, at least 90 percent, at least 95 percent, and 100 percent identity with the amino acid sequence LASEDIYNNLA or RASEDIYNGLA (SEQ ID NOS:22 and 23, respectively), a second light chain CDR (CDRL2) that includes an amino acid sequence that has a sequence identity of at least 65 percent, optionally a sequence identity of 100 percent identity with the amino acid sequence YASTLQD, YASSLQD, YASTLQY, NANSLHT, YTSNLQD, NANTLHI, or HASRLQD (SEQ ID NOS:24-30, respectively), and a third light chain CDR (CDRL3) that includes an amino acid sequence that has a sequence identity of at least 65 percent, optionally a sequence identity of at least 80 percent, at least 90 percent, at least 95 percent, and 100 percent identity with the amino acid sequence LQD-SEYPFT, LQDSEFPYT, LQDSEFPNT, LQDSEYPWT, LQDSEYPYT, QQYYDYLPT, LQESEYPWT, LQDSEY-PLT, or QQYSDYPWT (SEQ ID NOS:31-39, respectively).

In certain embodiments, nucleic acid molecules provided herein encode an immunoglobulin heavy chain variable domain having an amino acid sequence selected from among SEQ ID NOS: 41-56 or an amino acid sequence having at least 65%-95% or more sequence identity with any such heavy chain variable domain sequence and an immunoglobulin light chain variable domain having an amino acid sequence selected from among SEQ ID NOS: 57-71 or an amino acid sequence having at least 65%-95% or more sequence identity with any such light chain variable domain sequence.

Related aspects concern plasmids, and expression cassettes and vectors, that carry nucleic acids provided herein, as well as recombinant host cells transfected with such nucleic acid molecules.

Still other aspects of the technology provided herein concern methods of treating or preventing a disease or disorder associated with aberrant levels of TLR9 (e.g., cancer, infection, tissue damage, autoimmune disease, inflammation, and the like). Such methods include administering to a subject in need of such treatment an anti-TLR9 agent provided herein (e.g., an anti-TLR9 antibody or antigen-binding fragment, derivative, or variant thereof) in an amount sufficient to effect treatment, thereby treating or preventing the disease or disorder. Such diseases and disorders that can be so treated include non-viral cancers (e.g., breast, glioma, prostate, non-small cell lung cancer, ovarian, and the like), virus-associated cancers such as cervical cancer associated with human papilloma virus (HPV) infection, cancers associated with HBV infection (e.g., hepatocellular carcinoma), cancers associated with Epstein-Barr virus (EBV) infection, cancers associated with polyomavirus infection, erythema nodosum leprosum (ENL), autoimmune diseases, autoimmune inflammation, autoimmune thyroid diseases associated with increased TLR9 expression, B-cell lymphoma, T-cell lymphoma, acute myeloid leukemia, Hodgkin's Disease, acute myelogenous leukemia, acute myelomonocytic leukemia, acute lymphoblastic leukemia, chronic myelogenous leukemia, chronic lymphocytic leukemia, B cell large cell lymphoma, malignant lymphoma, acute leukemia, lymphosarcoma cell leukemia, B-cell leukemias, myelodysplastic syndromes, solid phase cancer, herpes viral infections, and rejection of transplanted tissues or organs, and the like. In certain instances, an anti-TLR9 agent provided herein (e.g., an anti-TLR9 antibody or antigen-binding fragment, derivative, or variant thereof) may be used as an adjuvant or in conjunction with an adjuvant (e.g., for vaccines).

The other aspects of the technology provided herein concern diagnostic methods of using an anti-TLR9 agent provided herein, for example, in vitro or in vivo diagnostic assays to detect the presence of TLR9.

The foregoing and other aspects of the technology provided herein will become more apparent from the following detailed description, accompanying drawings, and the claims.

Unless otherwise defined, all technical and scientific terms used herein have the same meaning as commonly understood by one of ordinary skill in the art to which this technology pertains. Although methods and materials similar or equivalent to those described herein can be used in the practice or testing of the present technology, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

A brief summary of each of the figures and tables described in this specification are provided below, as is a list of various nucleotide and amino acid sequences described herein.

FIG. 1 shows the amino acid sequence of a representative full-length human TLR9 precursor (SEQ ID NO: 72). In the sequence, the amino acid residues that make up the signal peptide (residues 1-25) are underlined. Residues 26-1032 comprise the mature, processed form of the protein. See, e.g., NCBI Reference Sequence: NP_059138.1.

FIG. 2 shows the amino acid sequences of the variable domains of the immunoglobulin heavy (SEQ ID NOS: 41-55) and light (SEQ ID NOS: 57-70) chains of 15 different anti-TLR9 antibodies (AB 1-15) provided herein. The CDR regions of each of the heavy and light chains are shown in bold and are underlined. A consensus sequence ("CON"; SEQ ID NOS: 56 and 71) based on the alignment is also shown for each of the heavy and light chain variable domains and CDR sequences. In each of the alignments, Three characters ("*", ":" and ".") are used: "*" indicates positions that have a single, fully conserved residue; ":" indicates that one of the following "strong" residue groups is fully conserved: STA; NEQK; NHQK; NDEQ; QHRK; MILV; MILF; HY; and FYW; and "." indicates that one of the following "weaker" residue groups is fully conserved: CSA; ATV; SAG; STNK; STPA; SGND; SNDEQK; NDEQHK; NEQHRK; FVLIM; and HFY. These are all the positively scoring residue groups that occur in the Gonnet Pam250 matrix. The "strong" and "weak" residue groups are defined as "strong" score >0.5 and "weak" score=<0.5, respectively.

FIG. 3 lists information for anti-TLR antibodies used in the experiments described in the Examples, below.

FIG. 5, panels A-J show histograms plotting results of experiments described in the Example 3, below. FIG. 5, panel K, is a table showing signal-to-noise (S:N) ratios of some of these results.

FIG. 6, panels A-J, show histograms plotting results of experiments described in the Example 3, below. FIG. 6, panel K, is a table showing signal-to-noise (S:N) ratios of some of these results.

FIG. 7, panel A, is a representative plot showing IL-8 secretion. The dashed line indicates cells treated with CpG-B only. FIG. 7, panel B, is a plot showing the fold change in IL-8 secretion with anti-TLR9 antibody treatment relative to CpG-B treatment only. Data are representative of 2 or more independent experiments. In each of panels A and B, "•" denotes anti-TLR9 antibody 1 (AB1), and "○" denotes anti-TLR9 antibody 13 AB13.

DETAILED DESCRIPTION

Antibody Generation and Characterization

Figure 4:
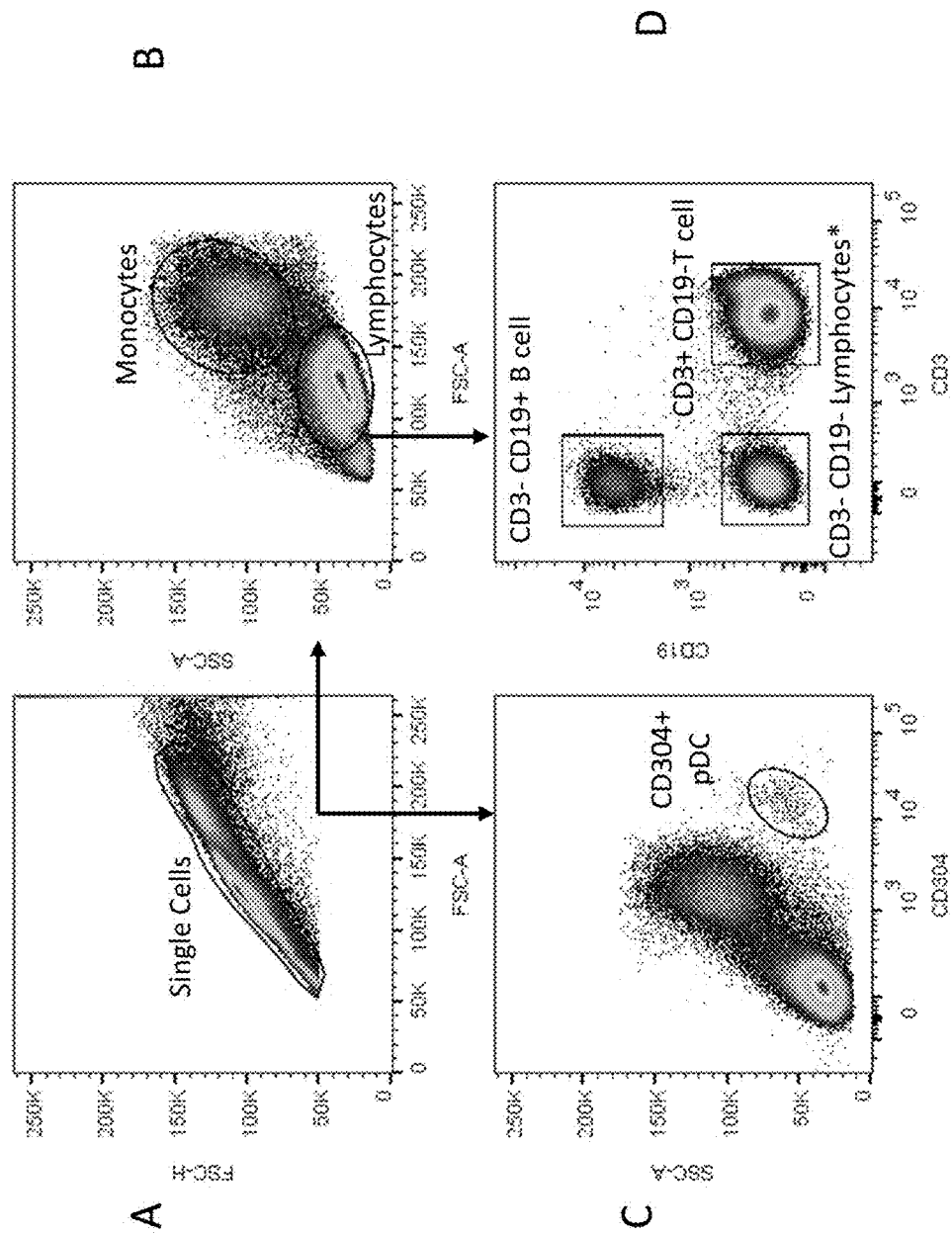
FIG. 4, panels A-D, are scatter plots showing the results of the gating strategy used for the flow cytometry experiments described in Example 3, below.

The examples herein below describe the production of anti-TLR9 agents, particularly anti-TLR9 antibodies, with desirable properties including affinity and/or specificity for TLR9 and/or its variants.

Aside from antibodies with strong binding affinity and/or specificity for TLR9, it is also desirable to select chimeric, humanized or variant antibodies that have other beneficial properties from a therapeutic perspective. For example, the antibody may be one that alters tumor progression or reduces autoimmune disease severity. Assays for determining the activity of anti-TLR9 antibodies provided herein include, for example, cell-based ELISA (e.g., to measure relative avidity of the antibody for the target on cells), flow cytometry (e.g., to measure cell specificity of the antibody), and cytotoxicity (e.g., to measure potential to mediate direct or indirect killing of TLR9-expressing target cells such as lymphoma lines or autoreactive B cells). Preferably the humanized or variant antibody fails to elicit an immunogenic response upon administration of a therapeutically effective amount of the antibody to a human patient. If an immunogenic response is elicited, preferably the response will be such that the antibody still provides a therapeutic benefit to the patient treated therewith.

In some embodiments, anti-TLR9 agents (e.g., anti-TLR9 antibodies, humanized anti-TLR9 antibodies) herein bind the same epitope. To screen for antibodies that bind to an epitope on TLR9 bound by an antibody of interest (e.g., those that block binding of the antibody to TLR9), a cross-blocking assay such as that described in Antibodies, A Laboratory Manual, Cold Spring Harbor Laboratory, Ed Harlow and David Lane (1988), can be performed. IN certain instances, epitope mapping, e.g. as described in Champe et al., J. Biol. Chem. 270:1388-1394 (1995), in Cunningham and Wells, Science 244:1081-1085 (1989) or in Davidson and Doranz, Immunology 143: 13-20 (2014), can be performed to determine whether the antibody binds an epitope of interest.

Antibodies herein generally have a heavy chain variable domain comprising an amino acid sequence represented by the formula: FRH1-CDRH1-FRH2-CDRH2-FRH3-CDRH3-FRH4, where "FRH1-4" represents the four heavy chain framework regions and "CDRH1-3" represents the three hypervariable regions of an anti-TLR9 antibody variable heavy domain. FRH1-4 may be derived from a consensus sequence (for example the most common amino acids of a class, subclass or subgroup of heavy or light chains of human immunoglobulins) or may be derived from an individual human antibody framework region or from a combination of different framework region sequences. Many human antibody framework region sequences are compiled in Kabat et al., supra, for example. In one embodiment, the variable heavy FR is provided by a consensus sequence of a human immunoglobulin subgroup as compiled by Kabat et al., supra.

The human variable heavy FR sequence may have substitutions therein, e.g. where the human FR residue is replaced by a corresponding nonhuman residue (by "corresponding nonhuman residue" is meant the nonhuman residue with the same Kabat positional numbering as the human residue of interest when the human and nonhuman sequences are aligned), but replacement with the nonhuman residue is not necessary. For example, a replacement FR residue other than the corresponding nonhuman residue may be selected by phage display.

Antibodies herein may have a light chain variable domain comprising an amino acid sequence represented by the formula: FRL1-CDRL1-FRL2-CDRL2-FRL3-CDRL3-FRL4, where "FRL1-4" represents the four framework regions and "CDRL1-3" represents the three hypervariable regions of an anti-TLR9 antibody variable light domain. FRL1-4 may be derived from a consensus sequence (for example the most common amino acids of a class, subclass or subgroup of heavy or light chains of human immunoglobulins) or may be derived from an individual human antibody framework region or from a combination of different framework region sequences. In one embodiment, the variable light FR is provided by a consensus sequence of a human immunoglobulin subgroup as compiled by Kabat et al., supra.

The human variable light FR sequence may have substitutions therein, e.g. where the human FR residue is replaced by a corresponding mouse residue, but replacement with the nonhuman residue is not necessary. For example, a replacement residue other than the corresponding nonhuman residue may be selected by phage display. Methods for generating humanized anti-TLR9 antibodies of interest herein are elaborated in more detail below.

Anti-TLR9 Agents

Provided herein are agents that bind Toll-like Receptor 9 (TLR9). Such agents may be referred to as anti-TLR9 agents and may include anti-TLR9 antibodies, anti-TLR9 antibody fragments (e.g., antigen binding fragments), and anti-TLR9 antibody derivatives. In some embodiments, the agent is isolated (e.g., separated from a component of its natural environment (e.g. an animal, a biological sample)). In some embodiments, the agent is non-naturally occurring (e.g., produced by human intervention). In some embodiments, the agent is a humanized antibody, or an antigen binding fragment thereof. In some embodiments, the agent is a derivative of a humanized antibody that binds TLR9. In some embodiments, the agent binds TLR9 under laboratory conditions (e.g., binds TLR9 in vitro, binds TLR9 in a flow cytometry assay, binds TLR9 in an ELISA). In some embodiments, the agent binds TLR9 under physiological conditions (e.g., binds TLR9 in a cell in a subject).

Generally, the anti-TLR9 agent provided herein comprises at least one immunoglobulin heavy chain variable domain and at least one immunoglobulin light chain variable domain. In some embodiments, an anti-TLR9 agent herein comprises two immunoglobulin heavy chain variable domains and two immunoglobulin light chain variable domains. Typically, each immunoglobulin heavy chain variable domain of the anti-TLR9 agent comprises first, second, and third heavy chain complementarity determining regions (CDRs; CDRH1, CDRH2, CDRH3), and each immunoglobulin light chain variable domain of the anti-TLR9 agent comprises first, second, and third light chain CDRs (DCRL1, CDRL2, CDRL3).

CDRH1

In some embodiments, the first heavy chain CDR (CDRH1) of an anti-TLR9 agent provided herein comprises an amino acid sequence that is at least 80 percent identical to the amino acid sequence $NX_1X_2MX_3$ (SEQ ID NO: 76), where $X_1$ is Y or F; $X_2$ is G or E; and $X_3$ is N, H or T. In some embodiments, the CDRH1 comprises an amino acid sequence that is at least 90 percent identical to the amino acid sequence of SEQ ID NO: 76. In some embodiments, the CDRH1 comprises an amino acid sequence that is at least 95 percent identical to the amino acid sequence of SEQ ID NO: 76. In some embodiments, the CDRH1 comprises an amino acid sequence that is 100 percent identical to the amino acid sequence of SEQ ID NO: 76.

The amino acid $X_1$ of SEQ ID NO: 76 may be substituted with any amino acid. In some embodiments, the amino acid $X_1$ of SEQ ID NO: 76 is substituted with a conservative amino acid (e.g., conservative to Y and/or F). In some embodiments, the amino acid $X_1$ of SEQ ID NO: 76 is substituted with an aromatic amino acid. In some embodiments, the amino acid $X_1$ of SEQ ID NO: 76 is substituted with a neutral amino acid.

The amino acid $X_2$ of SEQ ID NO: 76 may be substituted with any amino acid. In some embodiments, the amino acid $X_2$ of SEQ ID NO: 76 is substituted with a conservative amino acid (e.g., conservative to G and/or E).

The amino acid $X_3$ of SEQ ID NO: 76 may be substituted with any amino acid. In some embodiments, the amino acid $X_3$ of SEQ ID NO: 76 is substituted with a conservative amino acid (e.g., conservative to N, H and/or T). In some embodiments, the amino acid $X_3$ of SEQ ID NO: 76 is substituted with a polar amino acid.

In some embodiments, the CDRH1 of an anti-TLR9 agent provided herein comprises an amino acid sequence chosen from NYGMN (SEQ ID NO: 1), NFGMN (SEQ ID NO: 2), NFGMH (SEQ ID NO: 73), NYEMN (SEQ ID NO: 74), and NYGMT (SEQ ID NO: 75).

CDRH2

In some embodiments, the second heavy chain CDR (CDRH2) of an anti-TLR9 agent provided herein comprises an amino acid sequence that is at least 80 percent identical to the amino acid sequence $SISSX_1X_2SYIX_3YX_4X_5X_6VKG$ (SEQ ID NO: 77), where $X_1$ is S or T; $X_2$ is S or R; $X_3$ is Y or S; $X_4$ is A or V; $X_5$ is D or E; and $X_6$ is T or S. In some embodiments, the CDRH2 comprises an amino acid sequence that is at least 90 percent identical to the amino acid sequence of SEQ ID NO: 77. In some embodiments, the CDRH2 comprises an amino acid sequence that is at least 95 percent identical to the amino acid sequence of SEQ ID NO: 77. In some embodiments, the CDRH2 comprises an amino acid sequence that is 100 percent identical to the amino acid sequence of SEQ ID NO: 77.

The amino acid $X_1$ of SEQ ID NO: 77 may be substituted with any amino acid. In some embodiments, the amino acid $X_1$ of SEQ ID NO: 77 is substituted with a conservative amino acid (e.g., conservative to S and/or T). In some embodiments, the amino acid $X_1$ of SEQ ID NO: 77 is substituted with a polar amino acid. In some embodiments, the amino acid $X_1$ of SEQ ID NO: 77 is substituted with a neutral amino acid.

The amino acid $X_2$ of SEQ ID NO: 77 may be substituted with any amino acid. In some embodiments, the amino acid $X_2$ of SEQ ID NO: 77 is substituted with a conservative amino acid (e.g., conservative to S and/or R). In some embodiments, the amino acid $X_2$ of SEQ ID NO: 77 is substituted with a polar amino acid.

The amino acid $X_3$ of SEQ ID NO: 77 may be substituted with any amino acid. In some embodiments, the amino acid $X_3$ of SEQ ID NO: 77 is substituted with a conservative amino acid (e.g., conservative to Y and/or S). In some embodiments, the amino acid $X_3$ of SEQ ID NO: 77 is substituted with a polar amino acid. In some embodiments, the amino acid $X_3$ of SEQ ID NO: 77 is substituted with a neutral amino acid.

The amino acid $X_4$ of SEQ ID NO: 77 may be substituted with any amino acid. In some embodiments, the amino acid $X_4$ of SEQ ID NO: 77 is substituted with a conservative amino acid (e.g., conservative to A and/or V). In some embodiments, the amino acid $X_4$ of SEQ ID NO: 77 is substituted with an aliphatic amino acid. In some embodiments, the amino acid $X_4$ of SEQ ID NO: 77 is substituted with a neutral amino acid. In some embodiments, the amino acid $X_4$ of SEQ ID NO: 77 is substituted with a nonpolar amino acid.

The amino acid $X_5$ of SEQ ID NO: 77 may be substituted with any amino acid. In some embodiments, the amino acid $X_5$ of SEQ ID NO: 77 is substituted with a conservative amino acid (e.g., conservative to D and/or E). In some embodiments, the amino acid $X_5$ of SEQ ID NO: 77 is substituted with an acidic amino acid. In some embodiments, the amino acid $X_5$ of SEQ ID NO: 77 is substituted with a polar amino acid. In some embodiments, the amino acid $X_5$ of SEQ ID NO: 77 is substituted with a negatively charged amino acid.

The amino acid $X_6$ of SEQ ID NO: 77 may be substituted with any amino acid. In some embodiments, the amino acid $X_6$ of SEQ ID NO: 77 is substituted with a conservative amino acid (e.g., conservative to T and/or S). In some embodiments, the amino acid $X_6$ of SEQ ID NO: 77 is substituted with a polar amino acid. In some embodiments, the amino acid $X_6$ of SEQ ID NO: 77 is substituted with a neutral amino acid.

In some embodiments, the CDRH2 of an anti-TLR9 agent provided herein comprises an amino acid sequence chosen from SISSSSSYIYYADTVKG (SEQ ID NO: 3), SISST-SSYIYYADTVKG (SEQ ID NO: 4), SISSTSSYISY-ADTVKG (SEQ ID NO: 5), SISSTSSYIYYVDTVKG (SEQ ID NO: 6), SISSTSSYIYYADSVKG (SEQ ID NO: 7), and SISSTRSYIYYAETVKG (SEQ ID NO: 8).

CDRH3

In some embodiments, the third heavy chain CDR (CDRH3) of an anti-TLR9 agent provided herein comprises an amino acid sequence that is at least 80 percent identical to the amino acid sequence $X_1X_2X_3X_4X_5X_6X_7X_8X_9X_{10}$ (SEQ ID NO: 78), where $X_1$ is Y, A, Q, F, S, H or R; $X_2$ is T, D, P, W, G or S; $X_3$ is L, I, M, V or T; $X_4$ is G, T, A, D or Y; $X_5$ is I, T, G or V; $X_6$ is T, A, P, Y, G or D; $X_7$ is no amino acid, A, G or P; $X_8$ is I, P, F or L; $X_9$ is D, H, E or A; and $X_{10}$ is Y or H. In some embodiments, the CDRH3 comprises an amino acid sequence that is at least 90 percent identical to the amino acid sequence of SEQ ID NO: 78. In some embodiments, the CDRH3 comprises an amino acid sequence that is at least 95 percent identical to the amino acid sequence of SEQ ID NO: 78. In some embodiments, the CDRH3 comprises an amino acid sequence that is 100 percent identical to the amino acid sequence of SEQ ID NO: 78.

The amino acid $X_1$ of SEQ ID NO: 78 may be substituted with any amino acid. In some embodiments, the amino acid $X_1$ of SEQ ID NO: 78 is substituted with a conservative amino acid (e.g., conservative to Y, A, Q, F, S, H and/or R).

The amino acid $X_2$ of SEQ ID NO: 78 may be substituted with any amino acid. In some embodiments, the amino acid $X_2$ of SEQ ID NO: 78 is substituted with a conservative amino acid (e.g., conservative to T, D, P, W, G and/or S).

The amino acid $X_3$ of SEQ ID NO: 78 may be substituted with any amino acid. In some embodiments, the amino acid $X_3$ of SEQ ID NO: 78 is substituted with a conservative amino acid (e.g., conservative to L, I, M, V and/or T). In some embodiments, the amino acid $X_3$ of SEQ ID NO: 78 is substituted with a neutral amino acid.

The amino acid $X_4$ of SEQ ID NO: 78 may be substituted with any amino acid. In some embodiments, the amino acid $X_4$ of SEQ ID NO: 78 is substituted with a conservative amino acid (e.g., conservative to G, T, A, D and/or Y).

The amino acid $X_5$ of SEQ ID NO: 78 may be substituted with any amino acid. In some embodiments, the amino acid $X_5$ of SEQ ID NO: 78 is substituted with a conservative amino acid (e.g., conservative to I, T, G and/or V). In some embodiments, the amino acid $X_5$ of SEQ ID NO: 78 is substituted with a neutral amino acid.

The amino acid $X_6$ of SEQ ID NO: 78 may be substituted with any amino acid. In some embodiments, the amino acid $X_6$ of SEQ ID NO: 78 is substituted with a conservative amino acid (e.g., conservative to T, A, P, Y, G and/or D).

The amino acid $X_7$ of SEQ ID NO: 78 may be substituted with any amino acid. In some embodiments, the amino acid $X_7$ of SEQ ID NO: 78 is substituted with a conservative amino acid (e.g., conservative to A, G and/or P). In some embodiments, the amino acid $X_7$ of SEQ ID NO: 78 is substituted with a nonpolar amino acid. In some embodiments, the amino acid $X_7$ of SEQ ID NO: 78 is substituted with a neutral amino acid.

The amino acid $X_8$ of SEQ ID NO: 78 may be substituted with any amino acid. In some embodiments, the amino acid $X_8$ of SEQ ID NO: 78 is substituted with a conservative amino acid (e.g., conservative to I, P, F and/or L). In some embodiments, the amino acid $X_8$ of SEQ ID NO: 78 is substituted with a nonpolar amino acid. In some embodiments, the amino acid $X_8$ of SEQ ID NO: 78 is substituted with a neutral amino acid.

The amino acid $X_9$ of SEQ ID NO: 78 may be substituted with any amino acid. In some embodiments, the amino acid $X_9$ of SEQ ID NO: 78 is substituted with a conservative amino acid (e.g., conservative to D, H, E and/or A).

The amino acid $X_{10}$ of SEQ ID NO: 78 may be substituted with any amino acid. In some embodiments, the amino acid $X_{10}$ of SEQ ID NO: 78 is substituted with a conservative amino acid (e.g., conservative to Y or H). In some embodiments, the amino acid $X_{10}$ of SEQ ID NO: 78 is substituted with an aromatic amino acid. In some embodiments, the amino acid $X_{10}$ of SEQ ID NO: 78 is substituted with a polar amino acid. In some embodiments, the amino acid $X_{10}$ of SEQ ID NO: 78 is substituted with a neutral amino acid.

In some embodiments, the CDRH3 of an anti-TLR9 agent provided herein comprises an amino acid sequence chosen from YTLGIT-IDY (SEQ ID NO: 9), ADITIAAPHY (SEQ ID NO: 10), QDITTP-FDY (SEQ ID NO: 11), FTLGIT-LDY (SEQ ID NO: 12), SPMGITGFEY (SEQ ID NO: 13), HWVGGY-FDY (SEQ ID NO: 14), HTIGIT-FDY (SEQ ID NO: 15), YTLGIT-LDY (SEQ ID NO: 16), RGLAVGPFDY (SEQ ID NO: 17), QSITVP-FDY (SEQ ID NO: 18), QSTYGD-FDY (SEQ ID NO: 19), HTVDTP-FAH (SEQ ID NO: 20), and xTIGIT-FDY (SEQ ID NO: 21).

CDRL1

In some embodiments, the first light chain CDR (CDRL1) of an anti-TLR9 agent provided herein comprises an amino acid sequence that is at least 80 percent identical to the amino acid sequence $X_1$ASEDIYN$X_2$LA (SEQ ID NO: 79), where $X_1$ is L or R; and $X_2$ is N or G. In some embodiments, the CDRL1 comprises an amino acid sequence that is at least 90 percent identical to the amino acid sequence of SEQ ID NO: 79. In some embodiments, the CDRL1 comprises an amino acid sequence that is at least 95 percent identical to the amino acid sequence of SEQ ID NO: 79. In some embodiments, the CDRL1 comprises an amino acid sequence that is 100 percent identical to the amino acid sequence of SEQ ID NO: 79.

The amino acid $X_1$ of SEQ ID NO: 79 may be substituted with any amino acid. In some embodiments, the amino acid $X_1$ of SEQ ID NO: 79 is substituted with a conservative amino acid (e.g., conservative to L and/or R).

The amino acid $X_2$ of SEQ ID NO: 79 may be substituted with any amino acid. In some embodiments, the amino acid $X_2$ of SEQ ID NO: 79 is substituted with a conservative amino acid (e.g., conservative to N and/or G). In some embodiments, the amino acid $X_2$ of SEQ ID NO: 79 is substituted with a neutral amino acid.

In some embodiments, the CDRL1 of an anti-TLR9 agent provided herein comprises an amino acid sequence chosen from LASEDIYNNLA (SEQ ID NO: 22) and RASEDIYNGLA (SEQ ID NO: 23).

CDRL2

In some embodiments, the second light chain CDR (CDRL2) of an anti-TLR9 agent provided herein comprises an amino acid sequence that is at least 80 percent identical to the amino acid sequence $X_1X_2X_3X_4LX_5X_6$ (SEQ ID NO: 80), where $X_1$ is Y, N or H; $X_2$ is A or T; $X_3$ is S or N; $X_4$ is T, S, N or R; $X_5$ is Q or H; and $X_6$ is D, Y, T or I. In some embodiments, the CDRL2 comprises an amino acid sequence that is at least 90 percent identical to the amino acid sequence of SEQ ID NO: 80. In some embodiments, the CDRL2 comprises an amino acid sequence that is at least 95 percent identical to the amino acid sequence of SEQ ID NO: 80. In some embodiments, the CDRL2 comprises an amino acid sequence that is 100 percent identical to the amino acid sequence of SEQ ID NO: 80.

The amino acid $X_1$ of SEQ ID NO: 80 may be substituted with any amino acid. In some embodiments, the amino acid $X_1$ of SEQ ID NO: 80 is substituted with a conservative amino acid (e.g., conservative to Y, N and/or H). In some embodiments, the amino acid $X_1$ of SEQ ID NO: 80 is substituted with a polar amino acid. In some embodiments, the amino acid $X_1$ of SEQ ID NO: 80 is substituted with a neutral amino acid.

The amino acid $X_2$ of SEQ ID NO: 80 may be substituted with any amino acid. In some embodiments, the amino acid $X_2$ of SEQ ID NO: 80 is substituted with a conservative amino acid (e.g., conservative to A and/or T). In some embodiments, the amino acid $X_2$ of SEQ ID NO: 80 is substituted with a neutral amino acid.

The amino acid $X_3$ of SEQ ID NO: 80 may be substituted with any amino acid. In some embodiments, the amino acid $X_3$ of SEQ ID NO: 80 is substituted with a conservative amino acid (e.g., conservative to S and/or N). In some embodiments, the amino acid $X_3$ of SEQ ID NO: 80 is substituted with a polar amino acid. In some embodiments, the amino acid $X_3$ of SEQ ID NO: 80 is substituted with a neutral amino acid.

The amino acid $X_4$ of SEQ ID NO: 80 may be substituted with any amino acid. In some embodiments, the amino acid $X_4$ of SEQ ID NO: 80 is substituted with a conservative amino acid (e.g., conservative to T, S, N and/or R). In some embodiments, the amino acid $X_4$ of SEQ ID NO: 80 is substituted with a polar amino acid.

The amino acid $X_5$ of SEQ ID NO: 80 may be substituted with any amino acid. In some embodiments, the amino acid $X_5$ of SEQ ID NO: 80 is substituted with a conservative amino acid (e.g., conservative to Q and/or H). In some embodiments, the amino acid $X_5$ of SEQ ID NO: 80 is substituted with a polar amino acid. In some embodiments, the amino acid $X_5$ of SEQ ID NO: 80 is substituted with a neutral amino acid.

The amino acid $X_6$ of SEQ ID NO: 80 may be substituted with any amino acid. In some embodiments, the amino acid $X_6$ of SEQ ID NO: 80 is substituted with a conservative amino acid (e.g., conservative to D, Y, T or I).

In some embodiments, the CDRL2 of an anti-TLR9 agent provided herein comprises an amino acid sequence chosen from YASTLQD (SEQ ID NO: 24), YASSLQD (SEQ ID NO: 25), YASTLQY (SEQ ID NO: 26), NANSLHT (SEQ ID NO: 27), YTSNLQD (SEQ ID NO: 28), NANTLHI (SEQ ID NO: 29), and HASRLQD (SEQ ID NO: 30).

CDRL3

In some embodiments, the third light chain CDR (CDRL3) of an anti-TLR9 agent provided herein comprises an amino acid sequence that is at least 80 percent identical to the amino acid sequence $X_1QX_2X_3X_4X_5X_6X_7T$ (SEQ ID NO: 81), where $X_1$ is L or Q; $X_2$ is D, Y or E; $X_3$ is S or Y; $X_4$ is E or D; $X_5$ is Y or F; $X_6$ is P or L; and $X_7$ is F, Y, N, W, L or P. In some embodiments, the CDRL3 comprises an amino acid sequence that is at least 90 percent identical to the amino acid sequence of SEQ ID NO: 81. In some embodiments, the CDRL3 comprises an amino acid sequence that is at least 95 percent identical to the amino acid sequence of SEQ ID NO: 81. In some embodiments, the CDRL3 comprises an amino acid sequence that is 100 percent identical to the amino acid sequence of SEQ ID NO: 81.

The amino acid $X_1$ of SEQ ID NO: 81 may be substituted with any amino acid. In some embodiments, the amino acid $X_1$ of SEQ ID NO: 81 is substituted with a conservative amino acid (e.g., conservative to L and/or Q). In some embodiments, the amino acid $X_1$ of SEQ ID NO: 81 is substituted with a neutral amino acid.

The amino acid $X_2$ of SEQ ID NO: 81 may be substituted with any amino acid. In some embodiments, the amino acid $X_2$ of SEQ ID NO: 81 is substituted with a conservative amino acid (e.g., conservative to D, Y and/or E). In some embodiments, the amino acid $X_2$ of SEQ ID NO: 81 is substituted with a polar amino acid.

The amino acid $X_3$ of SEQ ID NO: 81 may be substituted with any amino acid. In some embodiments, the amino acid $X_3$ of SEQ ID NO: 81 is substituted with a conservative amino acid (e.g., conservative to S and/or Y). In some embodiments, the amino acid $X_3$ of SEQ ID NO: 81 is substituted with a polar amino acid. In some embodiments, the amino acid $X_3$ of SEQ ID NO: 81 is substituted with a neutral amino acid.

The amino acid $X_4$ of SEQ ID NO: 81 may be substituted with any amino acid. In some embodiments, the amino acid $X_4$ of SEQ ID NO: 81 is substituted with a conservative amino acid (e.g., conservative to E and/or D). In some embodiments, the amino acid $X_4$ of SEQ ID NO: 81 is substituted with an acidic amino acid. In some embodiments, the amino acid $X_4$ of SEQ ID NO: 81 is substituted with a polar amino acid. In some embodiments, the amino acid $X_4$ of SEQ ID NO: 81 is substituted with a negatively charged amino acid.

The amino acid $X_5$ of SEQ ID NO: 81 may be substituted with any amino acid. In some embodiments, the amino acid $X_5$ of SEQ ID NO: 81 is substituted with a conservative amino acid (e.g., conservative to Y and/or F). In some embodiments, the amino acid $X_5$ of SEQ ID NO: 81 is substituted with an aromatic amino acid. In some embodiments, the amino acid $X_5$ of SEQ ID NO: 81 is substituted with a neutral amino acid.

The amino acid $X_6$ of SEQ ID NO: 81 may be substituted with any amino acid. In some embodiments, the amino acid $X_6$ of SEQ ID NO: 81 is substituted with a conservative amino acid (e.g., conservative to P and/or L). In some embodiments, the amino acid $X_6$ of SEQ ID NO: 81 is substituted with a nonpolar amino acid. In some embodiments, the amino acid $X_6$ of SEQ ID NO: 81 is substituted with a neutral amino acid.

The amino acid $X_7$ of SEQ ID NO: 81 may be substituted with any amino acid. In some embodiments, the amino acid $X_7$ of SEQ ID NO: 81 is substituted with a conservative amino acid (e.g., conservative to F, Y, N, W, L or P). In some embodiments, the amino acid $X_7$ of SEQ ID NO: 81 is substituted with a neutral amino acid In some embodiments, the CDRL3 of an anti-TLR9 agent provided herein comprises an amino acid sequence chosen from LQDSEYPFT (SEQ ID NO: 31), LQDSEFPYT (SEQ ID NO: 32), LQDSEFPNT (SEQ ID NO: 33), LQDSEYPWT (SEQ ID NO: 34), LQDSEYPYT (SEQ ID NO: 35), QQYYDYLPT (SEQ ID NO: 36), LQESEYPWT (SEQ ID NO: 37), LQDSEYPLT (SEQ ID NO: 38) and QQYSDYPWT (SEQ ID NO: 39).

CDR Sets

In some embodiments, an anti-TLR9 agent comprises an immunoglobulin heavy chain variable domain comprising a set of CDRs (i.e., CDRH1, CDRH2, CDRH3); and an immunoglobulin light chain variable domain comprising a set of CDRs (i.e., CDRL1, CDRL2, CDRL3). In some embodiments, an anti-TLR9 agent herein comprises two immunoglobulin heavy chain variable domains each comprising a set of CDRs (i.e., CDRH1, CDRH2, CDRH3); and two immunoglobulin light chain variable domains each comprising a set of CDRs (i.e., CDRL1, CDRL2, CDRL3). Sets of CDRs may comprise any combination of CDR amino acid sequences (i.e., CDRH1, CDRH2, CDRH3; and CDRL1, CDRL2, CDRL3) provided herein. In some embodiments, an immunoglobulin heavy chain variable domain comprises a set of CDRH1, CDRH2 and CDRH3 amino acid sequences, and an immunoglobulin light chain variable domain comprises a set of CDRL1, CDRL2 and CDRL3 amino acid sequences chosen from sets 1-16 provided in the table below. For an anti-TLR9 agent comprising two immunoglobulin heavy chain variable domains and two immunoglobulin light chain variable domains, each immunoglobulin heavy chain variable domain may comprise a set of CDRH1, CDRH2 and CDRH3 amino acid sequences, and each immunoglobulin light chain variable domain may comprise a set of CDRL1, CDRL2 and CDRL3 amino acid sequences chosen from sets 1-16 provided in the following table.

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 1 | NYGMN (1) | SISSSSSYIYYADTVKG (3) | YTLGIT-IDY (9) | LASEDIYNNLA (22) | YASTLQD (24) | LQDSEYPFT (31) |
| 2 | NFGMN (2) | SISSTSSYIYYADTVKG (4) | ADITIAAPHY (10) | LASEDIYNNLA (22) | YASSLQD (25) | LQDSEFPYT (32) |
| 3 | NFGMN (2) | SISSTSSYIYYADTVKG (4) | ADITIAAPHY (10) | LASEDIYNNLA (22) | YASSLQD (25) | LQDSEFPYT (32) |
| 4 | NFGMH (2) | SISSTSSYISYADTVKG (5) | QDITTP-FDY (11) | LASEDIYNNLA (22) | YASTLQY (26) | LQDSEFPNT (33) |
| 5 | NFGMN (2) | SISSTSSYIYYADTVKG (4) | ADITIAAPHY (10) | LASEDIYNNLA (22) | YASSLQD (25 | LQDSEFPYT (32) |
| 6 | NYGMN (1) | SISSTSSYIYYADTVKG (4) | FTLGIT-LDY (12) | LASEDIYNNLA (22) | YASSLQD (25) | LQDSEYPWT (34) |
| 7 | NYGMN (1) | SISSSSSYIYYADTVKG (3) | SPMGITGFEY (13) | LASEDIYNNLA (22) | YASSLQD (25) | LQDSEYPYT (35) |
| 8 | NYGMN (1) | SISSSSSYIYYADTVKG (3) | HWVGGY-FDY (14) | RASEDIYNGLA (23) | NANSLHT (27) | QQYYDYLPT (36) |
| 9 | NFGMN (2) | SISSTSSYIYYADTVKG (4) | HTIGIT-FDY (15) | LASEDIYNNLA (22) | YASSLQD (25) | LQDSEYPWT (34) |
| 10 | NYGMN (1) | SISSSSSYIYYADTVKG (3) | YTLGIT-LDY (16) | LASEDIYNNLA (22) | YASSLQD (25) | LQESEYPWT (37) |
| 11 | NYEMN (1) | SISSTSSYIYYADTVKG (4) | RGLAVGPFDY (17) | LASEDIYNNLA (22) | YASSLQD (25) | LQDSEYPLT (38) |
| 12 | NYGMT (1) | SISSTSSYIYYVDTVKG (6) | QSITVP-FDY (18) | LASEDIYNNLA (22) | YTSNLQD (28) | LQDSEYPFT (31) |

-continued

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 13 | NYGMN (1) | SISSTSSYIYYADSVKG (7) | QSTYGD-FDY (19) | RASEDIYNGLA (23) | NANTLHI (29) | QQYSDYPWT (39) |
| 14 | NYEMN (1) | SISSTSSYIYYADTVKG (4) | RGLAVGPFDY (17) | LASEDIYNNLA (22) | YASSLQD (25) | LQDSEYPLT (38) |
| 15 | NYGMN (1) | SISSTRSYIYYAETVKG (8) | HTVDTP-FAH (20) | LASEDIYNNLA (22) | HASRLQD (30) | LQDSEYPWT (34) |
| 16 | NYGMN (1) | SISSTSSYIYYADTVKG (4) | xTIGIT-FDY (21) | LASEDIYNNLA (22) | YASSLQD (25) | LQDSEYPWT (34) |

In some embodiments, all CDRs are from the same set. For example, for an anti-TLR9 agent comprising two immunoglobulin heavy chain variable domains and two immunoglobulin light chain variable domains, each immunoglobulin heavy chain variable domain may comprise a set of CDRH1, CDRH2 and CDRH3 amino acid sequences from set 1, and each immunoglobulin light chain variable domain may comprise a set of CDRL1, CDRL2 and CDRL3 amino acid sequences from set 1.

In some embodiments, CDRs are from the different sets. For example, for an anti-TLR9 agent comprising two immunoglobulin heavy chain variable domains and two immunoglobulin light chain variable domains, each immunoglobulin heavy chain variable domain may comprise a set of CDRH1, CDRH2 and CDRH3 amino acid sequences from set 1, and each immunoglobulin light chain variable domain may comprise a set of CDRL1, CDRL2 and CDRL3 amino acid sequences from set 2. In another example, for an anti-TLR9 agent comprising two immunoglobulin heavy chain variable domains and two immunoglobulin light chain variable domains, one immunoglobulin heavy chain variable domain may comprise a set of CDRH1, CDRH2 and CDRH3 amino acid sequences from set 1 and the other immunoglobulin heavy chain variable domain may comprise a set of CDRH1, CDRH2 and CDRH3 amino acid sequences from set 2; and one immunoglobulin light chain variable domain may comprise a set of CDRL1, CDRL2 and CDRL3 amino acid sequences from set 1 and the other immunoglobulin light chain variable domain may comprise a set of CDRL1, CDRL2 and CDRL3 amino acid sequences from set 2.

Agents that Competitively Bind with an Anti-TLR9 Agent

Provided herein are anti-TLR9 agents that competitively bind, or are capable of competitively binding, with one or more anti-TLR9 agents described herein. In particular, provided herein are anti-TLR9 agents that compete, or are capable of competing, with one or more anti-TLR9 agents described herein for binding to TLR9. Such agents that compete, or are capable of competing, with anti-TLR9 agents described herein may be referred to as competitor agents. In certain instances, an agent (i.e., competitor agent) may be considered to compete for binding to TLR9 when the competitor binds to the same general region of TLR9 as an anti-TLR9 agent described herein (i.e., extracellular region or leucine-rich binding domain). In certain instances, an agent (i.e., competitor agent) may be considered to compete for binding to TLR9 when the competitor binds to the exact same region of TLR9 as an anti-TLR9 agent described herein (e.g., exact same peptide (linear epitope) or exact same surface amino acids (conformational epitope)). In certain instances, an agent (i.e., competitor agent) may be considered capable of competing for binding to TLR9 when the competitor binds to the same general region of TLR9 as an anti-TLR9 agent described herein (i.e., extracellular region or leucine-rich binding domain) under suitable assay conditions. In certain instances, an agent (i.e., competitor agent) may be considered capable of competing for binding to TLR9 when the competitor binds to the exact same region of TLR9 as an anti-TLR9 agent described herein (e.g., exact same peptide (linear epitope) or exact same surface amino acids (conformational epitope)) under suitable assay conditions.

In certain instances, an agent (i.e., competitor agent) may be considered to compete for binding to TLR9 when the competitor blocks the binding of one or more anti-TLR9 agents described herein to TLR9. In certain instances, an agent (i.e., competitor agent) may be considered capable of competing for binding to TLR9 when the competitor blocks the binding of one or more anti-TLR9 agents described herein to TLR9 under suitable assay conditions. Whether a competitor blocks the binding of one or more anti-TLR9 agents described herein to TLR9 may be determined using a suitable competition assay or blocking assay, such as, for example, a blocking assay as described in Example 6 herein. A competitor agent may block binding of one or more anti-TLR9 agents described herein to TLR9 in a competition or blocking assay by 50% or more, and conversely, one or more anti-TLR9 agents described herein may block binding of the competitor agent to TLR9 in a competition or blocking assay by about 50% or more. For example, an agent (i.e., competitor agent) may block binding of one or more anti-TLR9 agents described herein to TLR9 in a competition or blocking assay by about 55%, 60%, 65%, 70%, 75%, 80%, 85%, 90%, 95%, or 100%, and conversely, one or more anti-TLR9 agents described herein may block binding of the competitor agent to TLR9 in a competition or blocking assay by about 55%, 60%, 65%, 70%, 75%, 80%, 85%, 90%, 95%, or 100%.

In certain instances, an agent (i.e., competitor agent) may be considered to compete for binding to TLR9 when the competitor binds to TLR9 with a similar affinity as one or more anti-TLR9 agents described herein. In certain instances, an agent (i.e., competitor agent) may be considered capable of competing for binding to TLR9 when the competitor binds to TLR9 with a similar affinity as one or more anti-TLR9 agents described herein under suitable assay conditions. In some embodiments, an agent (i.e., competitor agent) is considered to compete for binding to TLR9 when the competitor binds to TLR9 with an affinity that is at least about 50% of the affinity of one or more anti-TLR9 agents described herein. For example, an agent (i.e., competitor agent) may be considered to compete for binding to TLR9 when the competitor binds to TLR9 with an affinity that is at least about 55%, 60%, 65%, 70%, 75%, 80%, 85%, 90%, 95%, or 100% of the affinity of one or more anti-TLR9 agents described herein. A competitor agent may comprise any feature described herein for anti-TLR9 agents.

Also provided herein are anti-TLR9 agents that bind to, or are capable of binding to, the same epitope as one or more anti-TLR9 agents described herein. In particular, provided herein are anti-TLR9 agents that compete with one or more anti-TLR9 agents described herein for binding to the same epitope on TLR9. Such agents that bind the same epitope may be referred to as epitope competitors. In certain instances, an epitope competitor may bind to the exact same region of TLR9 as an anti-TLR9 agent described herein (e.g., exact same peptide (linear epitope) or exact same surface amino acids (conformational epitope)). In certain instances, epitope competitor blocks the binding of one or more anti-TLR9 agents described herein to TLR9. An epitope competitor may block binding of one or more anti-TLR9 agents described herein to TLR9 in a competition assay by about 50% or more, and conversely, one or more anti-TLR9 agents described herein may block binding of the epitope competitor to TLR9 in a competition assay by 50% or more. In certain instances, an epitope competitor binds to TLR9 with a similar affinity as one or more anti-TLR9 agents described herein. In some embodiments, an epitope competitor binds to TLR9 with an affinity that is at least about 50% of the affinity of one or more anti-TLR9 agents described herein. For example, an epitope competitor may bind to TLR9 with an affinity that is at least about 55%, 60%, 65%, 70%, 75%, 80%, 85%, 90%, 95%, or 100% of the affinity of one or more anti-TLR9 agents described herein. An epitope competitor may comprise any feature described herein for anti-TLR9 agents.

Antibody Preparation

In some embodiments, an anti-TLR9 agent is an antibody. Methods for generating anti-TLR9 antibodies and variants of anti-TLR9 antibodies are described in the Examples below. In some embodiments, an anti-TLR9 agent is a humanized antibody, or an antigen binding fragment thereof. In some embodiments, an anti-TLR9 agent is a humanized antibody, or a derivative thereof that binds TLR9. Humanized anti-TLR9 antibodies may be prepared based on a nonhuman anti-TLR9 antibody. Fully human antibodies may also be prepared, e.g., in a genetically engineered (i.e., transgenic) mouse (e.g., from Medarex) that, when presented with an immunogen, can produce a human antibody that does not necessarily require CDR grafting. These antibodies are fully human (100% human protein sequences) from animals such as mice in which the non-human antibody genes are suppressed and replaced with human antibody gene expression. Antibodies may be generated against TLR9 when presented to these genetically engineered mice or other animals that can to produce human frameworks for the relevant CDRs.

Where a variant is generated, the parent antibody is prepared. Example techniques for generating such nonhuman antibody and parent antibodies are described in the following sections.

Antigen Preparation

The antigen for production of antibodies may be, e.g., intact TLR9, particularly expressed in cells, or a portion of TLR9 (e.g. N-terminal domain, C-terminal domain, a cytoplasmic domain, an intra-organelle domain, a transmembrane domain, an extracellular domain, an ectodomain, a TIR domain, a leucine-rich domain, or a TLR9 fragment comprising a desired epitope). Other forms of antigens useful for generating antibodies will be apparent to those skilled in the art.

Polyclonal Antibodies

Polyclonal antibodies may be raised in animals (vertebrate or invertebrates, including mammals, birds and fish, including cartilaginous fish) by multiple subcutaneous (sc) or intraperitoneal (ip) injections of a relevant antigen and an adjuvant. It may be useful to conjugate the relevant antigen to a protein or other carrier that is immunogenic in the species to be immunized, e.g., keyhole limpet hemocyanin, serum albumin, bovine thyroglobulin, or soybean trypsin inhibitor using a bifunctional or derivatizing agent, for example, maleimidobenzoyl sulfosuccinimide ester (conjugation through cysteine residues), N-hydroxysuccinimide (through lysine residues), glutaraldehyde, succinic anhydride, $SOCl_2$, or $R^1N=C=NR$, where R and $R^1$ are different alkyl groups. Non-protein carriers (e.g., colloidal gold) also may be used for antibody production.

Animals are immunized against the antigen, immunogenic conjugates, or derivatives by combining, e.g., 100 μg or 5 μg of the protein or conjugate (for rabbits or mice, respectively) with three volumes of Freund's complete adjuvant and injecting the solution intradermally at multiple sites. One month later the animals are boosted with one-fifth to one-tenth of the original amount of peptide or conjugate in Freund's complete adjuvant by subcutaneous injection at multiple sites. Seven to 14 days later the animals are bled and the serum is assayed for antibody titer. Animals are boosted until the titer plateaus. Often, the animal is boosted with the conjugate of the same antigen, but conjugated to a different protein and/or through a different cross-linking reagent. Conjugates also can be made in recombinant cell culture as protein fusions. Also, aggregating agents such as alum are suitably used to enhance the immune response.

Monoclonal Antibodies

Monoclonal antibodies may be made using the hybridoma method first described by Kohler et al., Nature, 256:495 (1975), or may be made by other methods such as recombinant DNA methods (U.S. Pat. No. 4,816,567). In the hybridoma method, a mouse or other appropriate host animal, such as a hamster or macaque monkey, is immunized as hereinabove described to elicit lymphocytes that produce or are capable of producing antibodies that will specifically bind to the protein used for immunization. Alternatively, lymphocytes may be immunized in vitro. Lymphocytes then are fused with myeloma cells using a suitable fusing agent, such as polyethylene glycol, to form a hybridoma cell (Goding, Monoclonal Antibodies: Principles and Practice, pp. 59-103 (Academic Press, 1986)).

The hybridoma cells thus prepared are seeded and grown in a suitable culture medium that may contain one or more substances that inhibit the growth or survival of the unfused, parental myeloma cells. For example, if the parental myeloma cells lack the enzyme hypoxanthine guanine phosphoribosyl transferase (HGPRT or HPRT), the culture medium for the hybridomas typically will include hypoxanthine, aminopterin, and thymidine (HAT medium), which substances prevent the growth of HGPRT-deficient cells.

Preferred myeloma cells are those that fuse efficiently, support stable high-level production of antibody by the selected antibody-producing cells, and are sensitive to a medium such as HAT medium. Among these, preferred myeloma cell lines are murine myeloma lines, such as SP-2 or X63-Ag8-653 cells available from the American Type Culture Collection, Rockville, Md. USA. Human myeloma and mouse-human heteromyeloma cell lines also have been described for the production of human monoclonal antibodies (Kozbor, J. Immunol., 133:3001 (1984); Brodeur et al., Monoclonal Antibody Production Techniques and Applications, pp. 51-63 (Marcel Dekker, Inc., New York, 1987)).

Culture medium in which hybridoma cells are growing is assayed for production of monoclonal antibodies directed against the antigen. The binding specificity of monoclonal antibodies produced by hybridoma cells may be determined by immunoprecipitation, by an in vitro binding assay, such as radioimmunoassay (RIA) or enzyme-linked immunoabsorbent assay (ELISA), or by flow cytometric analysis of cells expressing the membrane antigen.

The binding affinity of the monoclonal antibody can, for example, be determined by the Scatchard analysis of Munson et al., Anal. Biochem., 107:220 (1980).

After hybridoma cells are identified that produce antibodies of the desired specificity, affinity, and/or activity, the clones may be subcloned by limiting dilution procedures and grown by standard methods (Goding, Monoclonal Antibodies: Principles and Practice, pp. 59-103 (Academic Press, 1986)). Suitable culture media for this purpose include, for example, D-MEM or RPMI-1640 medium. In addition, the hybridoma cells may be grown in vivo as ascites tumors in an animal.

The monoclonal antibodies secreted by the subclones are suitably separated from the culture medium, ascites fluid, or serum by conventional immunoglobulin purification procedures such as, for example, protein A-Sepharose, hydroxylapatite chromatography, gel electrophoresis, dialysis, or affinity chromatography.

DNA encoding the monoclonal antibodies is readily isolated and sequenced using conventional procedures (e.g., by using oligonucleotide probes that are capable of binding specifically to genes encoding the heavy and light chains of the monoclonal antibodies). Alternatively, cDNA may be prepared from mRNA and the cDNA then subjected to DNA sequencing. The hybridoma cells serve as a preferred source of such genomic DNA or RNA for cDNA preparation. Once isolated, the DNA may be placed into expression vectors, which are well known in the art, and which are then transfected into host cells such as E coli cells, simian COS cells, Chinese hamster ovary (CHO) cells, or myeloma cells that do not otherwise produce immunoglobulin protein, to obtain the synthesis of monoclonal antibodies in the recombinant host cells. Recombinant production of antibodies will be described in more detail below.

Humanization and Amino Acid Sequence Variants

General methods for humanization of antibodies are described in U.S. Pat. No. 5,861,155, US19960652558 19960606, U.S. Pat. No. 6,479,284, US20000660169 20000912, U.S. Pat. No. 6,407,213, US19930146206 19931117, U.S. Pat. No. 6,639,055, US20000705686 20001102, U.S. Pat. No. 6,500,931, US19950435516 19950504, U.S. Pat. Nos. 5,530,101, 5,585,089, US19950477728 19950607, U.S. Pat. No. 5,693,761, US19950474040 19950607, U.S. Pat. No. 5,693,762, US19950487200 19950607, U.S. Pat. No. 6,180,370, US19950484537 19950607, US2003229208, US20030389155 20030313, U.S. Pat. No. 5,714,350, US19950372262 19950113, U.S. Pat. No. 6,350,861, US19970862871 19970523, U.S. Pat. No. 5,777,085, US19950458516 19950517, U.S. Pat. No. 5,834,597, US19960656586 19960531, U.S. Pat. No. 5,882,644, US19960621751 19960322, U.S. Pat. No. 5,932,448, US19910801798 19911129, U.S. Pat. No. 6,013,256, US19970934841 19970922, U.S. Pat. No. 6,129,914, US19950397411 19950301, U.S. Pat. No. 6,210,671, v, U.S. Pat. No. 6,329,511, US19990450520 19991129, US2003166871, US20020078757 20020219, U.S. Pat. No. 5,225,539, US19910782717 19911025, U.S. Pat. No. 6,548,640, US19950452462 19950526, U.S. Pat. No. 5,624,821, and US19950479752 19950607. In certain embodiments, it may be desirable to generate amino acid sequence variants of these humanized antibodies, particularly where these improve the binding affinity or other biological properties of the antibody.

Amino acid sequence variants of the anti-TLR9 antibody are prepared by introducing appropriate nucleotide changes into the anti-TLR9 antibody DNA, or by peptide synthesis. Such variants include, for example, deletions from, and/or insertions into and/or substitutions of, residues within the amino acid sequences of the anti-TLR9 antibodies of the examples herein. Any combination of deletion, insertion, and substitution is made to arrive at the final construct, provided that the final construct possesses the desired characteristics. The amino acid changes also may alter post-translational processes of the humanized or variant anti-TLR9 antibody, such as changing the number or position of glycosylation sites.

A useful method for identification of certain residues or regions of the anti-TLR9 antibody that are preferred locations for mutagenesis is called "alanine scanning mutagenesis," as described by Cunningham and Wells Science, 244:1081-1085 (1989). Here, a residue or group of target residues are identified (e.g., charged residues such as arg, asp, his, lys, and glu) and replaced by a neutral or negatively charged amino acid (most preferably alanine or polyalanine) to affect the interaction of the amino acids with TLR9 antigen. Those amino acid locations demonstrating functional sensitivity to the substitutions then are refined by introducing further or other variants at, or for, the sites of substitution. Thus, while the site for introducing an amino acid sequence variation is predetermined, the nature of the mutation per se need not be predetermined. For example, to analyze the performance of a mutation at a given site, alanine scanning or random mutagenesis is conducted at the target codon or region and the expressed anti-TLR9 antibody variants are screened for the desired activity. Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an N-terminal methionyl residue or the antibody fused to an epitope tag. Other insertional variants include the fusion of an enzyme or a polypeptide that increases the serum half-life of the antibody to the N- or C-terminus of the antibody.

Another type of variant is an amino acid substitution variant. These variants have at least one amino acid residue removed from the antibody molecule and a different residue inserted in its place. The sites of greatest interest for substitutional mutagenesis include the hypervariable regions, but FR alterations are also contemplated. Conservative substitutions are preferred, but more substantial changes may be introduced and the products may be screened. Examples of substitutions are listed below:

Example Amino Acid Residue Substitutions

Ala (A) val; leu; ile; val
Arg (R) lys; gln; asn; lys
Asn (N) gln; his; asp, lys; gln; arg
Asp (D) glu; asn
Cys (C) ser; ala
Gln (Q) asn; glu
Glu (E) asp; gln Gly (G) ala
His (H) asn; gln; lys; arg
Ile (I) leu; val; met; ala; leu; phe; norleucine
Leu (L) norleucine; ile; val; ile; met; ala; phe
Lys (K) arg; gln; asn
Met (M) leu; phe; ile
Phe (F) leu; val; ile; ala; tyr
Pro (P) ala
Ser (S) thr
Thr (T) ser
Trp (W) tyr; phe
Tyr (Y) trp; phe; thr; ser
Val (V) ile; leu; met; phe; ala; norleucine Substantial modifications in the biological properties of an antibody are accomplished by selecting substitutions that differ significantly in their effect on maintaining (a) the structure of the polypeptide backbone in the area of the substitution, for example, as a sheet or helical conformation, (b) the charge or hydrophobicity of the molecule at the target site, or (c) the bulk of the side chain. Naturally occurring residues are divided into groups based on common side-chain properties:

(1) hydrophobic: norleucine, met, ala, val, leu, ile;
(2) neutral hydrophilic: cys, ser, thr;
(3) acidic: asp, glu;
(4) basic: asn, gln, his, lys, arg;
(5) residues that influence chain orientation: gly, pro; and
(6) aromatic: trp, tyr, phe.

Non-conservative substitutions will entail exchanging a member of one of these classes for another class.

Any cysteine residue not involved in maintaining the proper conformation of the antibody also may be substituted, to improve the oxidative stability of the molecule and prevent aberrant crosslinking. Conversely, cysteine bond(s) may be added to the antibody to improve its stability (particularly where the antibody is an antibody fragment such as an Fv fragment).

One type of substitutional variant involves substituting one or more hypervariable region residues of a parent antibody (e.g. a humanized or human antibody). Generally, the resulting variant(s) selected for further development will have improved biological properties relative to the parent antibody from which they are generated. A convenient way for generating such substitutional variants is affinity maturation using phage display. Briefly, several hypervariable region sites (e.g. 6-7 sites) are mutated to generate all possible amino substitutions at each site. The antibody variants thus generated are displayed in a monovalent fashion from filamentous phage particles as fusions to the gene III product of M13 packaged within each particle. The phage-displayed variants are then screened for their biological activity (e.g. binding affinity) as herein disclosed. In order to identify candidate hypervariable region sites for modification, alanine-scanning mutagenesis can be performed to identify hypervariable region residues contributing significantly to antigen binding. Alternatively, or in addition, it may be beneficial to analyze a crystal structure of the antigen-antibody complex to identify contact points between the antibody and antigen. Such contact residues and neighboring residues are candidates for substitution according to the techniques elaborated herein. Once such variants are generated, the panel of variants is subjected to screening as described herein and antibodies with superior properties in one or more relevant assays may be selected for further development.

Another type of amino acid variant of the antibody alters the original glycosylation pattern of the antibody. By altering is meant deleting one or more carbohydrate moieties found in the antibody, and/or adding one or more glycosylation sites that are not present in the antibody.

Glycosylation of antibodies is typically either N-linked and/or or O-linked. N-linked refers to the attachment of the carbohydrate moiety to the side chain of an asparagine residue. The tripeptide sequences asparagine-X-serine and asparagine-X-threonine, where X is any amino acid except proline, are the most common recognition sequences for enzymatic attachment of the carbohydrate moiety to the asparagine side chain. Thus, the presence of either of these tripeptide sequences in a polypeptide creates a potential glycosylation site. O-linked glycosylation refers to the attachment of one of the sugars N-acetylgalactosamine, galactose, or xylose to a hydroxyamino acid, most commonly serine or threonine, although 5-hydroxyproline or 5-hydroxylysine may also be used.

Addition of glycosylation sites to the antibody is conveniently accomplished by altering the amino acid sequence such that it contains one or more of the above-described tripeptide sequences (for N-linked glycosylation sites). The alteration may also be made by the addition of, or substitution by, one or more serine or threonine residues to the sequence of the original antibody (for O-linked glycosylation sites).

Nucleic acid molecules encoding amino acid sequence variants of anti-TLR9 antibodies herein are prepared by a variety of methods known in the art. These methods include, but are not limited to, isolation from a natural source (in the case of naturally occurring amino acid sequence variants) or preparation by oligonucleotide-mediated (or site-directed) mutagenesis, PCR mutagenesis, and cassette mutagenesis of an earlier prepared variant or a non-variant version of an anti-TLR9 antibody.

Human Antibodies

As an alternative to humanization, human antibodies can be generated. For example, transgenic animals (e.g., mice) may be generated that are capable, upon immunization, of producing a full repertoire of human antibodies in the absence of endogenous immunoglobulin production. For example, a homozygous deletion of the antibody heavy-chain joining region (JH) gene in chimeric and germ-line mutant mice results in complete inhibition of endogenous antibody production. Transfer of the human germ-line immunoglobulin gene array into such germ-line mutant mice can result in the production of human antibodies upon antigen challenge (see, e.g., Jakobovits et al., Proc. Natl. Acad. Sci. USA, 90:2551 (1993); Jakobovits et al., Nature, 362:255-258(1993); Bruggermann et al., Year in Immuno., 7:33 (1993); and U.S. Pat. Nos. 5,591,669, 5,589,369 and 5,545,807). Human antibodies also can be derived from phage-display libraries (Hoogenboom et al., J. Mol. Biol., 227:381 (1991); Marks et al., J. Mol. Biol., 222:581-597 (1991); and U.S. Pat. Nos. 5,565,332 and 5,573,905). Human antibodies also may be generated by in vitro activated B cells (see U.S. Pat. Nos. 5,567,610 and 5,229,275).

Antigen-Binding Antibody Fragments

In certain embodiments, an anti-TLR9 agent is an antibody fragment that retains at least one desired activity, including antigen binding. Various techniques have been developed for the production of antibody fragments. In some instances, these fragments are derived via proteolytic digestion of intact antibodies (see, e.g., Morimoto et al., Journal of Biochemical and Biophysical Methods 24:107-117(1992) and Brennan et al., Science 229:81 (1985)). In some instances, these fragments are produced directly by recombinant host cells. For example, Fab'-SH fragments can be directly recovered from *E. coli* and chemically coupled to form F(ab')2 fragments (Carter et al., Bio/Technology 10:163-167 (1992)). In some instances, the F(ab')2 is formed using the leucine zipper GCN4 to promote assembly of the F(ab')2 molecule. According to another approach, Fv, Fab or F(ab')2 fragments can be isolated directly from recombinant host cell culture. Other techniques for the production of antibody fragments will be apparent to the skilled practitioner.

Multispecific Antibodies and Other Agents

In some embodiments, an anti-TLR9 agent comprises a first binding moiety and a second binding moiety, where the first binding moiety is specifically reactive with a first molecule that is TLR9 and the second binding moiety is specifically reactive with a second molecule that is a molecular species different from the first molecule. Such agents may comprise a plurality of first binding moieties, a plurality of second binding moieties, or a plurality of first binding moieties and a plurality of second binding moieties. Preferably, the ratio of first binding moieties to second binding moieties is about 1:1, although it may range from about 1000:1 to about 1:1000, where the ratio may be measured in terms of valency.

In those embodiments where the first moiety is an antibody, the second binding moiety may also be an antibody. In some embodiments, the first and second moieties are linked via a linker moiety, which may have two to many 100's or even thousands of valencies for attachment of first and second binding moieties by one or different chemistries. Examples of bispecific antibodies include those that are reactive against two different epitopes; in some instances one epitope is a TLR9 epitope and the second epitope is on an unrelated soluble molecule. In some embodiments, the bispecific antibody is reactive against an epitope on TLR9 and against an epitope on a different molecule found on the surface of the same cell. In some embodiments, the bispecific antibody is reactive against an epitope on TLR9 and against an epitope on a different molecule found on the surface of a different cell.

Compositions herein may also comprise a first agent and a second agent, where the first agent comprises a first binding moiety specifically reactive with a first molecule (e.g., TLR9) and the second agent comprises a second binding moiety specifically reactive with a second molecule that is a molecular species different than the first molecule. The first and/or second agent may be an antibody. The ratio of first agent to second agent may range from about 1,000:1 to 1:1,000, although the preferred ratio is about 1:1. In some embodiments, it may be desirable to generate multispecific (e.g. bispecific) anti-TLR9 antibodies having binding specificities for at least two different epitopes. Certain bispecific antibodies may bind to two different epitopes of TLR9. Bispecific antibodies can be prepared as full-length antibodies or antibody fragments (e.g., F(ab')$_2$ bispecific antibodies).

According to one for making bispecific antibodies, the interface between a pair of antibody molecules can be engineered to maximize the percentage of heterodimers that are recovered from recombinant cell culture. The preferred interface comprises at least a part of the $C_H3$ domain of an antibody constant domain. In this method, one or more small amino acid side chains from the interface of the first antibody molecule are replaced with larger side chains (e.g., tyrosine or tryptophan). Compensatory "cavities" of identical or similar size to the large side chain(s) are created on the interface of the second antibody molecule by replacing large amino acid side chains with smaller ones (e.g., alanine or threonine). This provides a mechanism for increasing the yield of the heterodimer over other unwanted end-products such as homodimers (see e.g., WO96/27011 published Sep. 6, 1996).

Bispecific antibodies include cross-linked or "heteroconjugate" antibodies. For example, one of the antibodies in the heteroconjugate can be coupled to avidin, the other to biotin. Heteroconjugate antibodies may be made using any convenient cross-linking methods. Suitable cross-linking agents are well known in the art, and are disclosed in U.S. Pat. No. 4,676,980, along with a number of cross-linking techniques.

Techniques for generating bispecific antibodies from antibody fragments have also been described in the literature. For example, bispecific antibodies can be prepared using chemical linkage. Brennan et al., Science 229:81 (1985) describe a procedure where intact antibodies are proteolytically cleaved to generate F(ab')$_2$ fragments. These fragments are reduced in the presence of the dithiol complexing agent sodium arsenite to stabilize vicinal dithiols and prevent intermolecular disulfide formation. The Fab' fragments generated are then converted to thionitrobenzoate (TNB) derivatives. One of the Fab'-TNB derivatives is then reconverted to the Fab'-thiol by reduction with mercaptoethylamine and is mixed with an equimolar amount of the other Fab'-TNB derivative to form the bispecific antibody. In yet a further embodiment, Fab'-SH fragments directly recovered from *E. coli* can be chemically coupled in vitro to form bispecific antibodies (see e.g., Shalaby et al., J. Exp. Med. 175:217-225 (1992)).

Various techniques for making and isolating bispecific antibody fragments directly from recombinant cell culture have also been described. For example, bispecific antibodies have been produced using leucine zippers (see e.g., Kostelny et al., J. Immunol. 148(5):1547-1553 (1992)). The leucine zipper peptides from the Fos and Jun proteins were linked to the Fab' portions of two different antibodies by gene fusion. The antibody homodimers were reduced at the hinge region to form monomers and then re-oxidized to form the antibody heterodimers. This method can also be utilized for the production of antibody homodimers. The "diabody" technology described by Hollinger et al., Proc. Natl. Acad. Sci. USA 90:6444-6448 (1993) has provided an alternative mechanism for making bispecific antibody fragments. The fragments comprise a heavy-chain variable domain ($V_H$) connected to a light-chain variable domain ($V_L$) by a linker that is too short to allow pairing between the two domains on the same chain. Accordingly, the $V_H$ and $V_L$ domains of one fragment are forced to pair with the complementary $V_L$ and $V_H$ domains of another fragment, thereby forming two antigen-binding sites. Another strategy for making bispecific antibody fragments by the use of single-chain Fv (scFv) dimers has also been reported. See Gruber et al., J. Immunol. 152:5368 (1994). Alternatively, the bispecific antibody may be a "linear antibody" produced as described in Zapata et al. Protein Eng. 8(10):1057-1062 (1995).

Antibodies with more than two valencies are contemplated. For example, trispecific antibodies can be prepared (e.g., Tutt et al., J. Immunol. 147:60 (1991)).

An antibody (or polymer or polypeptide) herein comprising one or more binding sites per arm or fragment thereof will be referred to herein as "multivalent" antibody. For example a "bivalent" antibody herein comprises two binding sites per Fab or fragment thereof whereas a "trivalent" polypeptide herein comprises three binding sites per Fab or fragment thereof. In a multivalent polymer herein, the two or more binding sites per Fab may be binding to the same or different antigens. For example, the two or more binding sites in a multivalent polypeptide herein may be directed against the same antigen, for example against the same parts or epitopes of said antigen or against two or more same or different parts or epitopes of said antigen; and/or may be directed against different antigens; or a combination thereof. Thus, a bivalent polypeptide herein, for example, may comprise two identical binding sites, may comprise a first binding sites directed against a first part or epitope of an antigen and a second binding site directed against the same part or epitope of said antigen or against another part or epitope of said antigen; or may comprise a first binding sites directed against a first part or epitope of an antigen and a second binding site directed against the a different antigen. However, as will be clear from the description hereinabove, the technology herein is not limited thereto, in the sense that a multivalent polypeptide herein may comprise any number of binding sites directed against the same or different antigens. In one embodiment the multivalent polypeptide comprises at least two ligand binding elements, one of which contains one or more CDR peptide sequences shown herein. In another embodiment the multivalent polypeptide comprises three ligand binding sites, each independently selected from the CDR sequences disclosed herein.

At least one of the ligand binding elements binds TLR9. In one embodiment at least one of the ligand binding elements binds another target. In one embodiment there are up to 10,000 binding elements in a multivalent binding molecule, and the ligand binding elements may be linked to a scaffold.

An antibody (or polymer or polypeptide) herein that contains at least two binding sites per Fab or fragment thereof, in which at least one binding site is directed against a first antigen and a second binding site directed against a second antigen different from the first antigen, may also be referred to as "multispecific." Thus, a "bispecific" polymer comprises at least one site directed against a first antigen and at least one second site directed against a second antigen, whereas a "trispecific" is a polymer that comprises at least one binding site directed against a first antigen, at least one further binding site directed against a second antigen, and at least one further binding site directed against a third antigen; and the like. Accordingly, in their simplest form, a bispecific polypeptide herein is a bivalent polypeptide (per Fab) of the technology provided herein. However, as will be clear from the description hereinabove, the technology herein is not limited thereto, in the sense that a multispecific polypeptide herein may comprise any number of binding sites directed against two or more different antigens.

Other Modifications

Other modifications of an anti-TLR9 agent are contemplated. For example, technology herein also pertains to immunoconjugates comprising an antibody described herein (e.g., an anti-TLR9 antibody) conjugated to a cytotoxic agent such as a toxin (e.g., an enzymatically active toxin of bacterial, fungal, plant or animal origin, or fragments thereof), or a radioactive isotope (for example, a radioconjugate), or a cytotoxic drug. Such conjugates are sometimes referred to as "agent-drug conjugates" or "ADC". Conjugates are made using a variety of bifunctional protein coupling agents such as N-succinimidyl-3-(2-pyridyldithiol) propionate (SPDP), iminothiolane (IT), bifunctional derivatives of imidoesters (such as dimethyl adipimidate HCL), active esters (such as disuccinimidyl suberate), aldehydes (such as glutaraldehyde), bis-azido compounds (such as bis (p-azidobenzoyl)hexanediamine), bis-diazonium derivatives (such as bis-(p-diazoniumbenzoyl)-ethylenediamine), diisocyanates (such as tolyene 2,6-diisocyanate), and bis-active fluorine compounds (such as 1,5-difluoro-2,4-dinitrobenzene).

Anti-TLR9 agents (e.g., anti-TLR9 antibodies) disclosed herein may be formulated as immunoliposomes. Liposomes containing an antibody are prepared by methods known in the art, such as described in Epstein et al., Proc. Natl. Acad. Sci. USA 82:3688 (1985); Hwang et al., Proc. Natl Acad. Sci. USA 77:4030 (1980); and U.S. Pat. Nos. 4,485,045 and 4,544,545. Liposomes with enhanced circulation time are disclosed in U.S. Pat. No. 5,013,556. For example, liposomes can be generated by the reverse phase evaporation method with a lipid composition comprising phosphatidyl choline, cholesterol and PEG-derivatized phosphatidylethanolamine (PEG-PE). Liposomes are extruded through filters of defined pore size to yield liposomes with the desired diameter. Fab' fragments of an antibody provided herein can be conjugated to the liposomes as described in Martin et al., J. Biol. Chem. 257:286-288 (1982) via a disulfide interchange reaction. Another active ingredient is optionally contained within the liposome.

Enzymes or other polypeptides can be covalently bound to an anti-TLR9 agent (e.g., anti-TLR9 antibody) by techniques well known in the art such as the use of the heterobifunctional cross-linking reagents discussed above. In some embodiments, fusion proteins comprising at least the antigen binding region of an antibody provided herein linked to at least a functionally active portion of an enzyme can be constructed using recombinant DNA techniques well known in the art (see, e.g., Neuberger et al., Nature 312:604-608 (1984)).

In certain embodiments, it may be desirable to use an antibody fragment, rather than an intact antibody, to increase penetration of target tissues and cells, for example. In such instances, it may be desirable to modify the antibody fragment in order to increase its serum half-life. This may be achieved, for example, by incorporation of a salvage receptor binding epitope into the antibody fragment (e.g., by mutation of the appropriate region in the antibody fragment or by incorporating the epitope into a peptide tag that is then fused to the antibody fragment at either end or in the middle, e.g., by DNA or peptide synthesis; see, e.g., WO96/32478 published Oct. 17, 1996).

Covalent modifications of an anti-TLR9 agent (e.g., anti-TLR9 antibody) are also included within the scope of this technology. For example, modifications may be made by chemical synthesis or by enzymatic or chemical cleavage of an anti-TLR9 antibody. Other types of covalent modifications of an antibody are introduced into the molecule by reacting targeted amino acid residues of the antibody with an organic derivatizing agent that is capable of reacting with selected side chains or the N- or C-terminal residues. Example covalent modifications of polypeptides are described in U.S. Pat. No. 5,534,615, specifically incorporated herein by reference. A preferred type of covalent modification of the antibody comprises linking the antibody to one of a variety of non-proteinaceous polymers, e.g., polyethylene glycol, polypropylene glycol, or polyoxyalkylenes, in the manner set forth in U.S. Pat. Nos. 4,640,835; 4,496,689; 4,301,144; 4,670,417; 4,791,192 or 4,179,337.

Nucleic Acids, Vectors, Host Cells, and Recombinant Methods

Technology described herein also provides isolated nucleic acids encoding an anti-TLR9 agent (e.g., anti-TLR9 antibody), vectors and host cells comprising the nucleic acid, and recombinant techniques for the production of the agent or antibody.

Provided herein are nucleic acids (e.g., isolated nucleic acids) comprising a nucleotide sequence that encodes an anti-TLR9 agent or antibody, or fragment thereof. In some embodiments, a nucleic acid encodes an immunoglobulin heavy chain variable domain of an anti-TLR9 agent provided herein. In some embodiments, a nucleic acid encodes an immunoglobulin light chain variable domain of an anti-TLR9 agent provided herein. In some embodiments, a nucleic acid encodes an immunoglobulin heavy chain variable domain and an immunoglobulin light chain variable domain of an anti-TLR9 agent provided herein. In some embodiments, a nucleic acid comprises a nucleotide sequence that encodes an amino acid sequence of any one of SEQ ID NOs. 1-71 and 73-81. For example, a nucleic acid may comprise a nucleotide sequence that encodes a CDR amino acid sequence of any one of SEQ ID NOs. 1-39 and 73-81. A nucleic acid may comprise a nucleotide sequence that encodes an immunoglobulin heavy chain variable domain amino acid sequence of any one of SEQ ID NOs. 41-56. A nucleic acid may comprise a nucleotide sequence that encodes an immunoglobulin light chain variable domain amino acid sequence of any one of SEQ ID NOs. 57-71.

For recombinant production of an anti-TLR9 agent or antibody, a nucleic acid encoding the anti-TLR9 agent or antibody may be isolated and inserted into a replicable vector for further cloning (amplification of the DNA) or for expression. In certain instances, an anti-TLR9 agent or antibody may be produced by homologous recombination, e.g. as described in U.S. Pat. No. 5,204,244, specifically incorporated herein by reference. DNA encoding an anti-TLR9 agent or antibody can be readily isolated and sequenced using conventional procedures (e.g., by using oligonucleotide probes that are capable of binding specifically to genes encoding the heavy and light chains of the antibody). Many vectors are available. The vector components generally include, but are not limited to, one or more of the following: a signal sequence, an origin of replication, one or more marker genes, an enhancer element, a promoter, and a transcription termination sequence, e.g., as described in U.S. Pat. No. 5,534,615 issued Jul. 9, 1996 and specifically incorporated herein by reference.

Suitable host cells for cloning or expressing DNA in vectors herein are prokaryote, yeast, or higher eukaryote cells. Suitable prokaryotes for this purpose include eubacteria, such as Gram-negative or Gram-positive organisms, for example, Enterobacteriaceae such as *Escherichia*, e.g., *E. coli*, *Enterobacter*, *Erwinia*, *Klebsiella*, *Proteus*, *Salmonella*, e.g., *Salmonella typhimurium*, *Serratia*, e.g., *Serratia marcescans*, and *Shigella*, as well as Bacilli such as *B. subtilis* and *B. licheniformis* (e.g., *B. licheniformis* 41P disclosed in DD 266,710 published 12 Apr. 1989), *Pseudomonas* such as *P. aeruginosa*, and *Streptomyces*. One preferred *E. coli* cloning host is *E. coli* 294 (ATCC 31,446), although other strains such as *E. coli* B, *E. coli* X1776 (ATCC 31,537), and *E. coli* W3110 (ATCC 27,325) are suitable. These examples are illustrative rather than limiting.

In addition to prokaryotes, eukaryotic microbes such as filamentous fungi or yeast are suitable cloning or expression hosts for anti-TLR9 agent/antibody-encoding vectors. *Saccharomyces cerevisiae*, or common baker's yeast, is the most commonly used among lower eukaryotic host microorganisms. A number of other genera, species, and strains are commonly available and useful herein, such as *Schizosaccharomyces pombe*; *Kluyveromyces* hosts such as, e.g., *K. lactis*, *K. fragilis* (ATCC 12,424), *K. bulgaricus* (ATCC 16,045), *K. wickeramii* (ATCC 24,178), *K. waltii* (ATCC 56,500), *K. drosophilarum* (ATCC 36,906), *K. thermotolerans*, and *K. marxianus*; *yarrowia* (EP 402,226); *Pichia pastoris* (EP 183,070); *Candida*; *Trichoderma reesia* (EP 244,234); *Neurospora crassa*; *Schwanniomyces* such as *Schwanniomyces occidentalis*; and filamentous fungi such as, e.g., *Neurospora*, *Penicillium*, *Tolypocladium*, and *Aspergillus* hosts such as *A. nidulans* and *A. niger*.

Suitable host cells for the expression of anti-TLR9 agents/antibodies (e.g., glycosylated anti-TLR9 agents/antibodies) are derived from multicellular organisms. Examples of invertebrate cells include plant and insect cells. Numerous baculoviral strains and variants and corresponding permissive insect host cells from hosts such as *Spodoptera frugiperda* (caterpillar), *Aedes aegypti* (mosquito), *Aedes albopictus* (mosquito), *Drosophila melanogaster* (fruitfly), and *Bombyx mori* (silk moth) have been identified. A variety of viral strains for transfection are publicly available, e.g., the L-1 variant of *Autographa californica* NPV and the Bm-5 strain of *Bombyx mori* NPV, and such viruses may be used as the virus herein according to the present technology, particularly for transfection of *Spodoptera frugiperda* cells. Plant cell cultures of cotton, corn, potato, soybean, petunia, tomato, and tobacco can also be utilized as hosts.

Suitable host cells for the expression of anti-TLR9 agents/antibodies also may include vertebrate cells (e.g., mammalian cells). Vertebrate cells may be propagated in culture (tissue culture). Examples of useful mammalian host cell lines include monkey kidney CV1 line transformed by SV40 (COS-7, ATCC CRL 1651); human embryonic kidney line (293 or 293 cells subcloned for growth in suspension culture, Graham et al., J. Gen Virol. 36:59 (1977)); baby hamster kidney cells (BHK, ATCC CCL 10); Chinese hamster ovary cells/-DHFR (CHO, Urlaub et al., Proc. Natl. Acad. Sci. USA 77:4216 (1980)); mouse Sertoli cells (TM4, Mather, Biol. Reprod. 23:243-251 (1980)); monkey kidney cells (CV1 ATCC CCL 70); African green monkey kidney cells (VERO-76, ATCC CRL-1587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562, ATCC CCL51); TRI cells (Mather et al., Annals N.Y. Acad. Sci. 383:44-68 (1982)); MRC 5 cells; FS4 cells; and a human hepatoma line (Hep G2).

Host cells may be transformed with the above-described expression or cloning vectors for antibody production and cultured in conventional nutrient media modified as appropriate for inducing promoters, selecting transformants, or amplifying the genes encoding the desired sequences.

Host cells used to produce an agent/antibody herein may be cultured in a variety of media. Commercially available media such as Ham's F10 (Sigma), Minimal Essential Medium ((MEM), (Sigma), RPMI-1640 (Sigma), and Dulbecco's Modified Eagle's Medium ((DMEM), Sigma) are suitable for culturing the host cells. In addition, any of the media described in Ham et al., Meth. Enz. 58:44 (1979), Barnes et al., Anal. Biochem. 102:255 (1980), U.S. Pat. Nos. 4,767,704; 4,657,866; 4,927,762; 4,560,655; or 5,122,469; WO 90/03430; WO 87/00195; or U.S. Pat. Re. 30,985 may be used as culture media for the host cells. Any of these media may be supplemented as necessary with hormones and/or other growth factors (such as insulin, transferrin, or epidermal growth factor), salts (such as sodium chloride, calcium, magnesium, and phosphate), buffers (such as HEPES), nucleotides (such as adenosine and thymidine), antibiotics (such as GENTAMYCIN™), trace elements (defined as inorganic compounds usually present at final concentrations in the micromolar range), and glucose or an equivalent energy source. Any other necessary supplements may also be included at appropriate concentrations that would be known to those skilled in the art. The culture conditions, such as temperature, pH, and the like, are those previously used with the host cell selected for expression, and will be apparent to the ordinarily skilled artisan.

When using recombinant techniques, an agent/antibody can be produced intracellularly, in the periplasmic space, or directly secreted into the medium. If the antibody is produced intracellularly, as a first step, the particulate debris, either host cells or lysed fragments, is removed, for example, by centrifugation or ultrafiltration. Carter et al., Bio/Technology 10:163-167 (1992) describe a procedure for isolating antibodies that are secreted to the periplasmic space of E. coli. Briefly, cell paste is thawed in the presence of sodium acetate (pH 3.5), EDTA, and phenylmethylsulfonylfluoride (PMSF) over about 30 min. Cell debris can be removed by centrifugation. Where the antibody is secreted into the medium, supernatants from such expression systems are generally first concentrated using a commercially available protein concentration filter, for example, an Amicon or Millipore Pellicon ultrafiltration unit. A protease inhibitor such as PMSF may be included in any of the foregoing steps to inhibit proteolysis and antibiotics may be included to prevent the growth of adventitious contaminants.

The agent/antibody composition prepared from the cells can be purified using, for example, hydroxylapatite chromatography, gel electrophoresis, dialysis, and affinity chromatography, with affinity chromatography being the preferred purification technique. The suitability of protein A as an affinity ligand depends on the species and isotype of any immunoglobulin Fc domain that is present in the antibody. Protein A can be used to purify antibodies that are based on human heavy chains (Lindmark et al., J. Immunol. Meth. 62:1-13 (1983)). Protein G is recommended for all mouse isotypes and for human γ3 (Guss et al., EMBO J. 5:15671575 (1986)). The matrix to which the affinity ligand is attached is most often agarose, but other matrices are available. Mechanically stable matrices such as controlled pore glass or poly(styrenedivinyl)benzene allow for faster flow rates and shorter processing times than can be achieved with agarose. Where the antibody comprises a $C_{H3}$ domain, Bakerbond ABX™ resin (J. T. Baker, Phillipsburg, N.J.) is useful for purification. Other techniques for protein purification, such as fractionation on an ion-exchange column, ethanol precipitation, Reverse Phase HPLC, chromatography on silica, chromatography on heparin SEPHAROSE™ chromatography on an anion or cation exchange resin (such as a polyaspartic acid column), chromatofocusing, SDS-PAGE, and ammonium sulfate precipitation are also available depending on the antibody to be recovered.

Following any preliminary purification step(s), the mixture comprising the agent or antibody of interest and contaminants may be subjected to low pH hydrophobic interaction chromatography using an elution buffer at a pH between about 2.5-4.5, and may be performed at low salt concentrations (e.g., from about 0-0.25M salt).

Pharmaceutical Formulations, Dosing, and Routes of Administration

The present technology provides anti-TLR9 agents and antibodies and related compositions, useful for elimination of TLR9 expressing cells from the body, for example, and for identification and quantification of the number of TLR9 expressing cells in tissue samples, for example.

Therapeutic methods and compositions of the present technology may be referred to as "TLR9-based" in order to indicate that these therapies can change the relative or absolute numbers of undesirable or toxic TLR9 expressing cells such as lymphomas or autoimmune B lymphocytes.

One way to control the amount of undesirable TLR9 expressing cells in a patient is by providing a composition that comprises one or more anti-TLR9 antibodies to cause cytotoxic activity towards the TLR9-expressing cells, for example.

Anti-TLR9 agents/antibodies may be formulated in a pharmaceutical composition that is useful for a variety of purposes, including the treatment of diseases, disorders or physical trauma. Pharmaceutical compositions comprising one or more anti-TLR9 agents/antibodies herein may be incorporated into kits and medical devices for such treatment. Medical devices may be used to administer pharmaceutical compositions herein to a patient in need thereof, and according to one embodiment of the technology, kits are provided that include such devices. Such devices and kits may be designed for routine administration, including self-administration, of the pharmaceutical compositions herein.

Therapeutic formulations of an agent or antibody may be prepared for storage by mixing the agent/antibody having the desired degree of purity with optional physiologically acceptable carriers, excipients or stabilizers (Remington's Pharmaceutical Sciences 16th edition, Osol, A. Ed. (1980)), in the form of lyophilized formulations or aqueous solutions. Acceptable carriers, excipients, or stabilizers are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN™, PLURONICS™ or polyethylene glycol (PEG).

The formulation herein may also contain more than one active compound as necessary for the particular indication being treated, preferably those with complementary activities that do not adversely affect each other. Such molecules are suitably present in combination in amounts that are effective for the purpose intended.

The active ingredients may also be entrapped in microcapsule prepared, for example, by coacervation techniques or by interfacial polymerization, for example, hydroxymethylcellulose or gelatin-microcapsule and poly-(methylmethacylate) microcapsule, respectively, in colloidal drug delivery systems (for example, liposomes, albumin microspheres, microemulsions, nano-particles and nanocapsules) or in macroemulsions. Such techniques are disclosed in Remington's Pharmaceutical Sciences 16th edition, Osol, A. Ed. (1980).

Formulations for in vivo administration generally must be sterile. This is readily accomplished for instance by filtration through sterile filtration membranes.

Sustained-release preparations may be prepared. Suitable examples of sustained-release preparations include semipermeable matrices of solid hydrophobic polymers containing the agent/antibody, which matrices are in the form of shaped articles, e.g., films, or microcapsule. Examples of sustained-release matrices include polyesters, hydrogels (for example, poly(2-hydroxyethyl-methacrylate), or poly(vinyl alcohol)), polylactides (U.S. Pat. No. 3,773,919), copolymers of L-glutamic acid and .gamma. ethyl-L-glutamate, non-degradable ethylene-vinyl acetate, degradable lactic acid-glycolic acid copolymers such as the Lupron Depot™ (injectable microspheres composed of lactic acid-glycolic acid copolymer and leuprolide acetate), and poly-D-(−)-3-hydroxybutyric acid. While polymers such as ethylene-vinyl acetate and lactic acid-glycolic acid enable release of molecules for over 100 days, certain hydrogels release proteins for shorter time periods. When encapsulated agents/antibodies remain in the body for a long time, they may denature or aggregate as a result of exposure to moisture at 37° C., resulting in a loss of biological activity and possible changes in immunogenicity. Rational strategies can be devised for stabilization depending on the mechanism involved. For example, if the aggregation mechanism is discovered to be intermolecular S—S bond formation through thio-disulfide interchange, stabilization may be achieved by modifying sulfhydryl residues, lyophilizing from acidic solutions, controlling moisture content, using appropriate additives, and developing specific polymer matrix compositions.

For therapeutic applications, anti-TLR9 agents, e.g., antibodies, provided herein are administered to a mammal, e.g., a human, in a pharmaceutically acceptable dosage form such as those discussed above, including those that may be administered to a human intravenously as a bolus or by continuous infusion over a period of time, or by intramuscular, intraperitoneal, intra-cerebrospinal, subcutaneous, intra-articular, intrasynovial, intrathecal, oral, topical, or inhalation routes.

For the prevention or treatment of disease, the appropriate dosage of agent/antibody will depend on the type of disease to be treated, as defined above, the severity and course of the disease, whether the antibody is administered for preventive or therapeutic purposes, previous therapy, the patient's clinical history and response to the antibody, and the discretion of the attending physician. The antibody is suitably administered to the patient at one time or over a series of treatments.

Depending on the type and severity of the disease, about 1 g/kg to about 50 mg/kg (e.g., 0.1-20 mg/kg) of antibody may be an initial candidate dosage for administration to the patient, whether, for example, by one or more separate administrations, or by continuous infusion. A typical daily or weekly dosage might range from about 1 µg/kg to about 20 mg/kg or more, depending on the factors mentioned above. For repeated administrations over several days or longer, depending on the condition, the treatment is repeated until a desired suppression of disease symptoms occurs. However, other dosage regimens may be useful. The progress of this therapy is easily monitored by conventional techniques and assays, including, for example, radiographic imaging. Detection methods using the antibody to determine TLR9 levels in bodily fluids or tissues may be used in order to optimize patient exposure to the therapeutic antibody.

In some embodiments, a composition comprising an anti-TLR9 agent herein (e.g., an mAb that interferes with TLR9 activity) is administered as a monotherapy, and in some embodiments, the composition comprising the anti-TLR9 agent is administered as part of a combination therapy. In some cases the effectiveness of the agent/antibody in preventing or treating disease may be improved by administering the agent/antibody serially or in combination with another agent that is effective for those purposes, such as a chemotherapeutic drug for treatment of cancer or a microbial infection. In other cases, the anti-TLR9 agent may serve to enhance or sensitize cells to chemotherapeutic treatment, thus permitting efficacy at lower doses and with lower toxicity. Certain combination therapies include, in addition to administration of the composition comprising an agent that reduces the number of TLR9 expressing cells, delivering a second therapeutic regimen selected from the group consisting of administration of a chemotherapeutic agent, radiation therapy, surgery, and a combination of any of the foregoing.

Such other agents may be present in the composition being administered or may be administered separately. Also, the anti-TLR agent may be suitably administered serially or in combination with the other agent or modality, e.g., chemotherapeutic drug or radiation for treatment of cancer, infection, and the like, or an immunosuppressive drug.

Research and Diagnostic, Including Clinical Diagnostic, Uses for Anti-TLR9 Agents Herein Provided herein are diagnostic reagents comprising an anti-TLR9 agent described herein. For example, anti-TLR9 agents, e.g., antibodies, provided herein may be used to detect and/or purify TLR9, e.g., from bodily fluid(s) or expressed on cells in bodily fluids or tissues. Also provided herein are methods for detecting TLR9. For example, a method may comprise contacting a sample (e.g., a biological sample known or suspected of to contain TLR9) with an anti-TLR9 agent provided herein, and, if the sample contains TLR9, detecting TLR9:anti-TLR9 complexes. Also provided herein are reagents comprising an anti-TLR9 agent described herein and methods for detecting TLR9 for research purposes.

Anti-TLR9 antibodies, for example, may be useful in diagnostic assays for TLR9, e.g., detecting its presence in specific cells, tissues, or bodily fluids. Such diagnostic methods may be useful in diagnosis, e.g., of a hyperproliferative disease or disorder. Thus clinical diagnostic uses as well as research uses are comprehended herein.

In some embodiments, an anti-TLR9 agent/antibody comprises a detectable marker or label. In some embodiments, an anti-TLR9 agent/antibody is conjugated to a detectable marker or label. For example, for research and diagnostic applications, an anti-TLR9 agent/antibody may be labeled with a detectable moiety. Numerous labels are available which are generally grouped into the following categories:

(a) Radioisotopes, such as $^{35}S$, $^{14}C$, $^{125}I$, $^{3}H$, and $^{131}I$. The antibody can be labeled with the radioisotope using the techniques described in Current Protocols in Immunology, Volumes 1 and 2, Coligen et al., Ed. Wiley-Interscience, New York, N.Y., Pubs. (1991), for example, and radioactivity can be measured using scintillation counting.

(b) Fluorescent labels such as rare earth chelates (europium chelates) or fluorescein and its derivatives, rhodamine and its derivatives, dansyl, Lissamine, phycoerythrin, Texas Red and Brilliant Violet™ are available. The fluorescent labels can be conjugated to the antibody using the techniques disclosed in Current Protocols in Immunology, supra, for example. Fluorescence can be quantified using a flow cytometer, imaging microscope or fluorimeter.

(c) Various enzyme-substrate labels are available and U.S. Pat. No. 4,275,149 provides a review of some of these. The enzyme generally catalyzes a chemical alteration of the chromogenic substrate that can be measured using various techniques. For example, the enzyme may catalyze a color change in a substrate, which can be measured spectrophotometrically. Alternatively, the enzyme may alter the fluorescence or chemiluminescence of the substrate. Techniques for quantifying a change in fluorescence are described above. The chemiluminescent substrate becomes electronically excited by a chemical reaction and may then emit light that can be measured (using a chemilluminometer, for example) or donates energy to a fluorescent acceptor. Examples of enzymatic labels include luciferases (e.g., firefly luciferase and bacterial luciferase; U.S. Pat. No. 4,737,456), luciferin, 2,3-dihydrophthalazinediones, malate dehydrogenase, urease, peroxidase such as horseradish peroxidase (HRPO), alkaline phosphatase, beta-galactosidase, glucoamylase, lysozyme, saccharide oxidases (e.g., glucose oxidase, galactose oxidase, and glucose-6-phosphate dehydrogenase), heterocyclicoxidases (such as uricase and xanthine oxidase), lactoperoxidase, microperoxidase, and the like. Techniques for conjugating enzymes to antibodies are described in O'Sullivan et al., Methods for the Preparation of Enzyme-Antibody Conjugates for use in Enzyme Immunoassay, in Methods in Enzym. (ed J. Langone & H. Van Vunakis), Academic press, New York, 73:147-166 (1981).

Examples of enzyme-substrate combinations include, for example:
(i) Horseradish peroxidase (HRPO) with hydrogen peroxidase as a substrate, where the hydrogen peroxidase oxidizes a dye precursor (e.g., orthophenylene diamine (OPD) or 3,3',5,5'-tetramethyl benzidine hydrochloride (TMB));
(ii) alkaline phosphatase (AP) with para-Nitrophenyl phosphate as chromogenic substrate; and
(iii) .beta.-D-galactosidase (.beta.-D-Gal) with a chromogenic substrate (e.g., p-nitrophenyl-β-D-galactosidase) or fluorogenic substrate 4-methylumbelliferyl-.beta.-D-galactosidase.

Numerous other enzyme-substrate combinations are available to those skilled in the art. For a general review of these, see U.S. Pat. Nos. 4,275,149 and 4,318,980.

In certain instances, the label is indirectly conjugated with the agent/antibody. The skilled artisan will be aware of various techniques for achieving this. For example, an antibody can be conjugated with biotin and any of the three broad categories of labels mentioned above can be conjugated with avidin, or vice versa. Biotin binds selectively to avidin and thus, the label can be conjugated with the antibody in this indirect manner. Alternatively, to achieve indirect conjugation of the label with the antibody, the antibody is conjugated with a small hapten (e.g., digoxin) and one of the different types of labels mentioned above is conjugated with an anti-hapten antibody (e.g., anti-digoxin antibody). Thus, indirect conjugation of the label with the antibody can be achieved.

In some embodiments, an anti-TLR9 agent/antibody need not be labeled, and the presence thereof can be detected, e.g., using a labeled antibody which binds to an anti-TLR9 antibody.

In some embodiments, an anti-TLR9 agent/antibody herein is immobilized on a solid support or substrate. In some embodiments, an anti-TLR9 agent/antibody herein is non-diffusively immobilized on a solid support (e.g., the anti-TLR9 agent/antibody does not detach from the solid support). A solid support or substrate can be any physically separable solid to which an anti-TLR9 agent/antibody can be directly or indirectly attached including, but not limited to, surfaces provided by microarrays and wells, and particles such as beads (e.g., paramagnetic beads, magnetic beads, microbeads, nanobeads), microparticles, and nanoparticles. Solid supports also can include, for example, chips, columns, optical fibers, wipes, filters (e.g., flat surface filters), one or more capillaries, glass and modified or functionalized glass (e.g., controlled-pore glass (CPG)), quartz, mica, diazotized membranes (paper or nylon), polyformaldehyde, cellulose, cellulose acetate, paper, ceramics, metals, metalloids, semiconductive materials, quantum dots, coated beads or particles, other chromatographic materials, magnetic particles; plastics (including acrylics, polystyrene, copolymers of styrene or other materials, polybutylene, polyurethanes, TEFLON™, polyethylene, polypropylene, polyamide, polyester, polyvinylidenedifluoride (PVDF), and the like), polysaccharides, nylon or nitrocellulose, resins, silica or silica-based materials including silicon, silica gel, and modified silicon, Sephadex®, Sepharose®, carbon, metals (e.g., steel, gold, silver, aluminum, silicon and copper), inorganic glasses, conducting polymers (including polymers such as polypyrrole and polyindole); micro or nanostructured surfaces such as nucleic acid tiling arrays, nanotube, nanowire, or nanoparticulate decorated surfaces; or porous surfaces or gels such as methacrylates, acrylamides, sugar polymers, cellulose, silicates, or other fibrous or stranded polymers. In some embodiments, the solid support or substrate may be coated using passive or chemically-derivatized coatings with any number of materials, including polymers, such as dextrans, acrylamides, gelatins or agarose. Beads and/or particles may be free or in connection with one another (e.g., sintered). In some embodiments, a solid support or substrate can be a collection of particles. In some embodiments, the particles can comprise silica, and the silica may comprise silica dioxide. In some embodiments the silica can be porous, and in certain embodiments the silica can be non-porous. In some embodiments, the particles further comprise an agent that confers a paramagnetic property to the particles. In certain embodiments, the agent comprises a metal, and in certain embodiments the agent is a metal oxide, (e.g., iron or iron oxides, where the iron oxide contains a mixture of Fe2+ and Fe3+). An anti-TLR9 agent/antibody may be linked to a solid support by covalent bonds or by non-covalent interactions and may be linked to a solid support directly or indirectly (e.g., via an intermediary agent such as a spacer molecule or biotin).

Agents and antibodies provided herein may be employed in any known assay method, such as flow cytometry, immunohistochemistry, immunofluorescence, mass cytometry (e.g., Cytof instrument), competitive binding assays, direct and indirect sandwich assays, and immunoprecipitation assays. Zola, Monoclonal Antibodies: A Manual of Techniques, pp. 147-158 (CRC Press, Inc. 1987).

Flow cytometry and mass cytometry assays generally involve the use of a single primary antibody to specifically identify the presence of the target molecule expressed on the surface of a dispersed suspension of individual cells. The dispersed cells are typically obtained from a biological fluid sample, e.g., blood, but may also be obtained from a dispersion of single cells prepared from a solid tissue sample such as spleen or tumor biopsy. The primary antibody may be directly conjugated with a detectable moiety, e.g., a fluorophore such as phycoerythrin for flow cytometry or a heavy metal chelate for mass cytometry. Alternatively, the primary antibody may be unlabeled or labeled with an undetectable tag such as biotin, and the primary antibody is then detected by a detectably labeled secondary antibody that specifically recognizes the primary antibody itself or the tag on the primary antibody. The labeled cells are then analyzed in an instrument capable of single cell detection, e.g., flow cytometer, mass cytometer, fluorescence microscope or brightfield light microscope, to identify those individual cells in the dispersed population or tissue sample that express the target recognized by the primary antibody. Detailed description of the technological basis and practical application of flow cytometry principles may be found in, e.g., Shapiro, Practical Flow Cytometry, $4^{th}$ Edition, Wiley, 2003.

Sandwich assays involve the use of two antibodies, each capable of binding to a different immunogenic portion, or epitope, of the protein that is detected. In a sandwich assay, the test sample analyte is bound by a first antibody that is immobilized on a solid support, and thereafter a second antibody binds to the analyte, thus forming an insoluble three-part complex. See, e.g., U.S. Pat. No. 4,376,110. The second antibody may itself be labeled with a detectable moiety (direct sandwich assays) or may be measured using an anti-immunoglobulin antibody that is labeled with a detectable moiety (indirect sandwich assay). For example, one type of sandwich assay is an ELISA assay, in which case the detectable moiety is an enzyme. In a cell ELISA, the target cell population may be attached to the solid support using antibodies first attached to the support and that recognize different cell surface proteins. These first antibodies capture the cells to the support. TLR9 on the surface of the cells can then be detected by adding anti-TLR9 antibody to the captured cells and detecting the amount of TLR9 antibody attached to the cells. In certain instances, fixed and permeabilized cells may be used, and in such instances, surface TLR9 and intracellular TLR9 may be detected.

For immunohistochemistry, the blood or tissue sample may be fresh or frozen or may be embedded in paraffin and fixed with a preservative such as formalin, for example.

The agents/antibodies herein also may be used for in vivo diagnostic assays. Generally, the antibody is labeled with a radionuclide (such as $^{111}$In, $^{99}$Tc, $^{14}$C, $^{131}$I, $^{125}$I, $^{3}$H, $^{32}$P, or $^{35}$S) so that the bound target molecule can be localized using immunoscintillography.

Detection of TLR9 in Immune Cells

Provided herein are agents and methods for detecting TLR9 in immune cells. Detection of TLR9 in immune cells may refer to detection on the surface of immune cells (e.g., by surface staining) and/or inside immune cells (e.g., by intracellular staining). In some embodiments, agents and methods are provided for detecting TLR9 in a heterogeneous population of immune cells. A heterogeneous population of immune cells may comprise two or more types of immune cells. For example a heterogeneous population of immune cells may comprise two or more of B cells, plasmacytoid dendritic cells (pDCs), lymphocytes, leukocytes, T cells, monocytes, macrophages, neutrophils, myeloid dendritic cells (mDCs), innate lymphoid cells, mast cells, eosinophils, basophils, natural killer cells, and the like. In some embodiments, a heterogeneous population of immune cells comprises peripheral blood mononuclear cells (PBMCs) which may include, for example, T cells, B cells, natural killer cells, and monocytes.

Generally, cells are contacted with an anti-TLR9 agent described herein (e.g., in a flow cytometry assay as described in Example 3; or any suitable protein or cell detection assay). In some embodiments, TLR9 is detected at a significant level in certain immune cells by an anti-TLR9 agent described herein. TLR9 may be detected at a significant level by an anti-TLR9 agent described herein in certain immune cells and not significantly detected in other immune cells. The level of TLR9 detection in certain immune cells may vary according to certain factors such as, for example, type of detection assay, type of detection reagent (e.g., type of dye), antibody concentration, donor cell variability, and the like.

Detection of TLR9 at a significant level may refer to a particular signal to noise (S:N) ratio (e.g., threshold or range) measured in a flow cytometry assay. In some embodiments, detection of TLR9 at a significant level refers to a signal to noise (S:N) ratio of about 2.0 or greater. For example, detection of TLR9 at a significant level may refer to a signal to noise (S:N) ratio of about 2 or greater, about 2.5 or greater, about 3 or greater, about 4 or greater, about 5 or greater, about 6 or greater, about 7 or greater, about 8 or greater, about 9 or greater, about 10 or greater, about 11 or greater, about 12 or greater, about 13 or greater, about 14 or greater, about 15 or greater, about 16 or greater, about 17 or greater, about 18 or greater, about 19 or greater, about 20 or greater, about 25 or greater, about 30 or greater, about 35 or greater, about 40 or greater, about 45 or greater, about 50 or greater, about 55 or greater, or about 60 or greater. No significant detection of TLR9 may refer to a particular signal to noise (S:N) ratio (e.g., threshold or range) measured in a flow cytometry assay. In some embodiments, no significant detection of TLR9 refers to a signal to noise (S:N) ratio of about 1.5 or less. In some embodiments, no significant detection of TLR9 refers to a signal to noise (S:N) ratio of about 1 or less.

In some embodiments, TLR9 is detected at a significant level in plasmacytoid dendritic cells (pDCs). In certain instances, plasmacytoid dendritic cells (pDCs) may be identified by the expression of CD304. Accordingly, in some embodiments, TLR9 is detected at a significant level in CD304$^+$ plasmacytoid dendritic cells (pDCs). CD304, also referred to as neuropilin-1, BDCA-4 and VEGF165R, is a 140 kD type I transmembrane protein. Its extracellular region contains 2 CUB, 2 FV/FVIII, and one MAM domain; a soluble isoform is produced by alternative mRNA splicing. CD304 is involved in angiogenesis, neural development, and tumor metastasis, and may be expressed by plasmacytoid dendritic cells, thymocytes, neurons, endothelium, and a subset of TFH cells. CD304 also may be expressed in several carcinomas, and a high expression of this molecule in prostate cancer may correlate with a poor prognosis.

In some embodiments, TLR9 is detected at a significant level in B cells. In certain instances, B cells may be identified by the expression of CD19 and by the lack of expression of CD3. Accordingly, in some embodiments, TLR9 is detected at a significant level in CD19$^+$CD3$^-$ B cells. CD19 is a 95 kD type I transmembrane glycoprotein also referred to as B4. It is a member of the immunoglobulin superfamily expressed on B-cells (from pro-B to blastoid B cells, absent on plasma cells) and follicular dendritic cells. CD19 generally is involved in B cell development, activation, and differentiation. CD19 forms a complex with CD21 (CR2) and CD81 (TAPA-1), and functions as a BCR co-receptor. CD3, also referred to as T3, is a member of the Ig superfamily and primarily expressed on T cells, NK-T cells, and at different levels on thymocytes during T cell differentiation. CD3 is composed of CD3$\varepsilon$, $\delta$, $\gamma$ and $\zeta$ chains, and forms a TCR complex by associating with TCR $\alpha/\beta$ or $\gamma/\delta$ chains. CD3 is involved in TCR signal transduction, T cell activation, and antigen recognition by binding the peptide/MHC antigen complex.

In some embodiments, TLR9 is not significantly detected in certain immune cells by an anti-TLR9 agent described herein. For example, TLR9 may not be significantly detected in certain lymphocytes (e.g., CD3⁻CD19⁻ lymphocytes), T cells (e.g., CD3⁺CD19⁻ T cells), and/or monocytes. No significant detection of TLR9 in certain lymphocytes (e.g., CD3⁻CD19⁻ lymphocytes), T cells (e.g., CD3⁺CD19⁻ T cells), and/or monocytes may refer to a particular signal to noise (S:N) ratio (e.g., threshold or range) measured in a flow cytometry assay. In some embodiments, no significant detection of TLR9 in certain lymphocytes (e.g., CD3⁻CD19⁻ lymphocytes), T cells (e.g., CD3⁺CD19⁻ T cells), and/or monocytes refers to a signal to noise (S:N) ratio of about 1.5 or less. In some embodiments, no significant detection of TLR9 in certain lymphocytes (e.g., CD3⁻CD19⁻ lymphocytes), T cells (e.g., CD3⁺CD19⁻ T cells), and/or monocytes refers to a signal to noise (S:N) ratio of about 1 or less.

Provided herein are agents and methods for detecting TLR9 on the surface of immune cells (e.g., by surface staining). In some embodiments, TLR9 is detected on the surface of plasmacytoid dendritic cells (pDCs) (e.g., CD304⁺ plasmacytoid dendritic cells (pDCs)). In some embodiments, TLR9 is detected on the surface of plasmacytoid dendritic cells (pDCs) (e.g., CD304⁺ plasmacytoid dendritic cells (pDCs)) in a flow cytometry assay. In some embodiments, TLR9 is detected on the surface of plasmacytoid dendritic cells (pDCs) (e.g., CD304⁺ plasmacytoid dendritic cells (pDCs)) in a flow cytometry assay with a signal to noise (S:N) ratio of about 15 or greater. In some embodiments, TLR9 is detected on the surface of plasmacytoid dendritic cells (pDCs) (e.g., CD304⁺ plasmacytoid dendritic cells (pDCs)) in a flow cytometry assay with a signal to noise (S:N) ratio of about 16 or greater. In some embodiments, TLR9 is detected on the surface of plasmacytoid dendritic cells (pDCs) (e.g., CD304⁺ plasmacytoid dendritic cells (pDCs)) in a flow cytometry assay with a signal to noise (S:N) ratio of about 17 or greater. The above signal to noise (S:N) ratio examples for detection of TLR9 on the surface of plasmacytoid dendritic cells (pDCs) may vary according to certain factors such as, for example, type of detection assay, type of detection reagent (e.g., type of dye), antibody concentration, donor cell variability, and the like.

In some embodiments, TLR9 is detected on the surface of B cells (e.g., CD19⁺CD3⁻ B cells). In some embodiments, TLR9 is detected on the surface of B cells (e.g., CD19⁺CD3⁻ B cells) in a flow cytometry assay. In some embodiments, TLR9 is detected on the surface of B cells (e.g., CD19⁺CD3⁻ B cells) in a flow cytometry assay with a signal to noise (S:N) ratio of about 2.0 or greater. In some embodiments, TLR9 is detected on the surface of B cells (e.g., CD19⁺CD3⁻ B cells) in a flow cytometry assay with a signal to noise (S:N) ratio of about 2.4 or greater. In some embodiments, TLR9 is detected on the surface of B cells (e.g., CD19⁺CD3⁻ B cells) in a flow cytometry assay with a signal to noise (S:N) ratio of about 2.5 or greater. The above signal to noise (S:N) ratio examples for detection of TLR9 on the surface of B cells may vary according to certain factors such as, for example, type of detection assay, type of detection reagent (e.g., type of dye), antibody concentration, donor cell variability, and the like.

Provided herein are agents and methods for detecting TLR9 on the inside of immune cells (e.g., by intracellular staining). In some embodiments, TLR9 is detected on the inside of plasmacytoid dendritic cells (pDCs) (e.g., CD304⁺ plasmacytoid dendritic cells (pDCs)). In some embodiments, TLR9 is detected on the inside of plasmacytoid dendritic cells (pDCs) (e.g., CD304⁺ plasmacytoid dendritic cells (pDCs)) in a flow cytometry assay. In some embodiments, TLR9 is detected on the inside of plasmacytoid dendritic cells (pDCs) (e.g., CD304⁺ plasmacytoid dendritic cells (pDCs)) in a flow cytometry assay with a signal to noise (S:N) ratio of about 40 or greater. In some embodiments, TLR9 is detected on the inside of plasmacytoid dendritic cells (pDCs) (e.g., CD304⁺ plasmacytoid dendritic cells (pDCs)) in a flow cytometry assay with a signal to noise (S:N) ratio of about 45 or greater. In some embodiments, TLR9 is detected on the inside of plasmacytoid dendritic cells (pDCs) (e.g., CD304⁺ plasmacytoid dendritic cells (pDCs)) in a flow cytometry assay with a signal to noise (S:N) ratio of about 50 or greater. The above signal to noise (S:N) ratio examples for detection of TLR9 on the inside of plasmacytoid dendritic cells (pDCs) may vary according to certain factors such as, for example, type of detection assay, type of detection reagent (e.g., type of dye), antibody concentration, donor cell variability, and the like.

In some embodiments, TLR9 is detected on the inside of B cells (e.g., CD19⁺CD3⁻ B cells). In some embodiments, TLR9 is detected on the inside of B cells (e.g., CD19⁺CD3⁻ B cells) in a flow cytometry assay. In some embodiments, TLR9 is detected on the inside of B cells (e.g., CD19⁺CD3⁻ B cells) in a flow cytometry assay with a signal to noise (S:N) ratio of about 10 or greater. In some embodiments, TLR9 is detected on the inside of B cells (e.g., CD19⁺CD3⁻ B cells) in a flow cytometry assay with a signal to noise (S:N) ratio of about 11 or greater. In some embodiments, TLR9 is detected on the inside of B cells (e.g., CD19⁺CD3⁻ B cells) in a flow cytometry assay with a signal to noise (S:N) ratio of about 12 or greater. The above signal to noise (S:N) ratio examples for detection of TLR9 on the inside of B cells may vary according to certain factors such as, for example, type of detection assay, type of detection reagent (e.g., type of dye), antibody concentration, donor cell variability, and the like.

Kits Incorporating Anti-TLR9 Agents Herein

As a matter of convenience, an anti-TLR9 agent (e.g., an anti-TLR9 mAb) herein can be provided in a kit, for example, a packaged combination of reagents in predetermined amounts with instructions for use (e.g., instructions for performing a diagnostic assay). In some embodiments, the kit is a diagnostic kit configured to detect TLR9 in a sample (e.g., a biological sample). Where the anti-TLR9 agent is labeled with a fluorophore, the kit may include an identical isotype negative control irrelevant antibody to control for non-specific binding of the anti-TLR9 agent. Where the anti-TLR9 agent is labeled with an enzyme, the kit may include substrates and cofactors required by the enzyme (e.g., a substrate precursor which provides the detectable chromophore or fluorophore). In addition, other additives may be included such as stabilizers, buffers (e.g., a block buffer or lysis buffer) and the like. The relative amounts of the various reagents may be varied widely to provide for concentrations in solution of the reagents that substantially optimize the sensitivity of the assay. Particularly, the reagents may be provided as dry powders, usually lyophilized, including excipients that on dissolution will provide a reagent solution having the appropriate concentration.

Articles of Manufacture

In another aspect of the present technology, an article of manufacture containing materials useful for the treatment, or diagnosis, of the disorders described above is provided. The article of manufacture comprises a container and a label. Suitable containers include, for example, bottles, vials, syringes, and test tubes. The containers may be formed from a variety of materials such as glass or plastic. The container holds a composition that is effective for treating the condition and may have a sterile access port (for example the container may be an intravenous solution bag or a vial having a stopper pierceable by a hypodermic injection needle). The active anti-TLR9 agent in the composition may be an anti-TLR9 antibody. The label on, or associated with, the container indicates that the composition is used for treating, or diagnosing, the condition of choice. The article of manufacture may further comprise a second container comprising a pharmaceutically acceptable buffer, such as phosphate-buffered saline, Ringer's solution and dextrose solution. It may further include other materials desirable from a commercial and user standpoint, including other buffers, diluents, filters, needles, syringes, and package inserts with instructions for use.

EXAMPLES

The examples set forth below illustrate certain embodiments and do not limit the technology.

Example 1: Creation and Characterization of Anti-TLR9 Hybridomas

Hybridomas that secrete monoclonal antibody that reacts with TLR9 as expressed in vivo can be prepared as described in this Example. The resulting anti-TLR9 antibodies can be used for a variety of purposes, including in diagnostic assays, examples of which are provided in Examples 3 and 4 below.

Common strains of laboratory mice, e.g., BALB/c or C57/Bl6, or rats, e.g., Sprague Dawley, are suitable hosts for immunization with a TLR9 immunogen. Following successful immunization of mice, hybridomas are formed using standard protocols to fuse myeloma cells with spleen and draining lymph node cells harvested from the animals. Following selection of successful fusions in HAT medium and cloning to approximately one cell/well in microtiter plates, the culture supernatants can be tested against TLR9-expressing cell transfectants, e.g., HEK 293 or RBL, by flow cytometry. Wells with successful staining profiles are then subcultured into larger vessels until sufficient cells are present to allow subcloning. Further characterization of the hybridoma subclone candidates can again be performed by flow cytometry using TLR9-transfected cells. Clones selected as the best candidates are then further screened, for example, by flow cytometry against human blood cells divided into distinct subsets (e.g., lymphocytes, monocytes, and the like) as well as against one or more cell lines generated from diseased and/or infected human cells. As compared to an isotype control, the percentage of positive cells in each blood cell subset can be quantified.

One example of an ideal candidate clone will have strong reactivity against immune cells that express TLR9 (e.g., plasmacytoid dendritic cells (pDCs), B cells) but no appreciable reactivity against other blood cell populations (e.g., certain lymphocytes, T cells, monocytes). In certain instances, an ideal candidate clone can detect TLR9 on the cell surface. In certain instances, an ideal candidate clone can detect TLR9 on the cell surface of plasmacytoid dendritic cells (pDCs). In certain instances, an ideal candidate clone can detect TLR9 on the cell surface of B cells. In certain instances, an ideal candidate clone can detect TLR9 on the cell surface of plasmacytoid dendritic cells (pDCs) and B cells. In certain instances, an ideal candidate clone can detect intracellular TLR9. In certain instances, an ideal candidate clone can detect intracellular TLR9 in plasmacytoid dendritic cells (pDCs). In certain instances, an ideal candidate clone can detect intracellular TLR9 in B cells. In certain instances, an ideal candidate clone can detect intracellular TLR9 in plasmacytoid dendritic cells (pDCs) and B cells.

Example 2: Sequencing of the Anti-TLR9 Antibody Variable Regions

Cells from well-performing anti-TLR9 hybridoma cell lines (described in Example 1, above) were grown in standard mammalian tissue culture media. Total RNA was isolated from hybridoma cells from various clones expressing anti-TLR monoclonal antibodies using a procedure based on the RNeasy Mini kit (Qiagen). The RNA was used to generate first strand cDNA. Both light chain and heavy chain variable domain cDNAs were amplified by a 5'-RACE technique. Positive clones were prepared by PCR and then subject to DNA sequencing of multiple clones.

Figure 2:
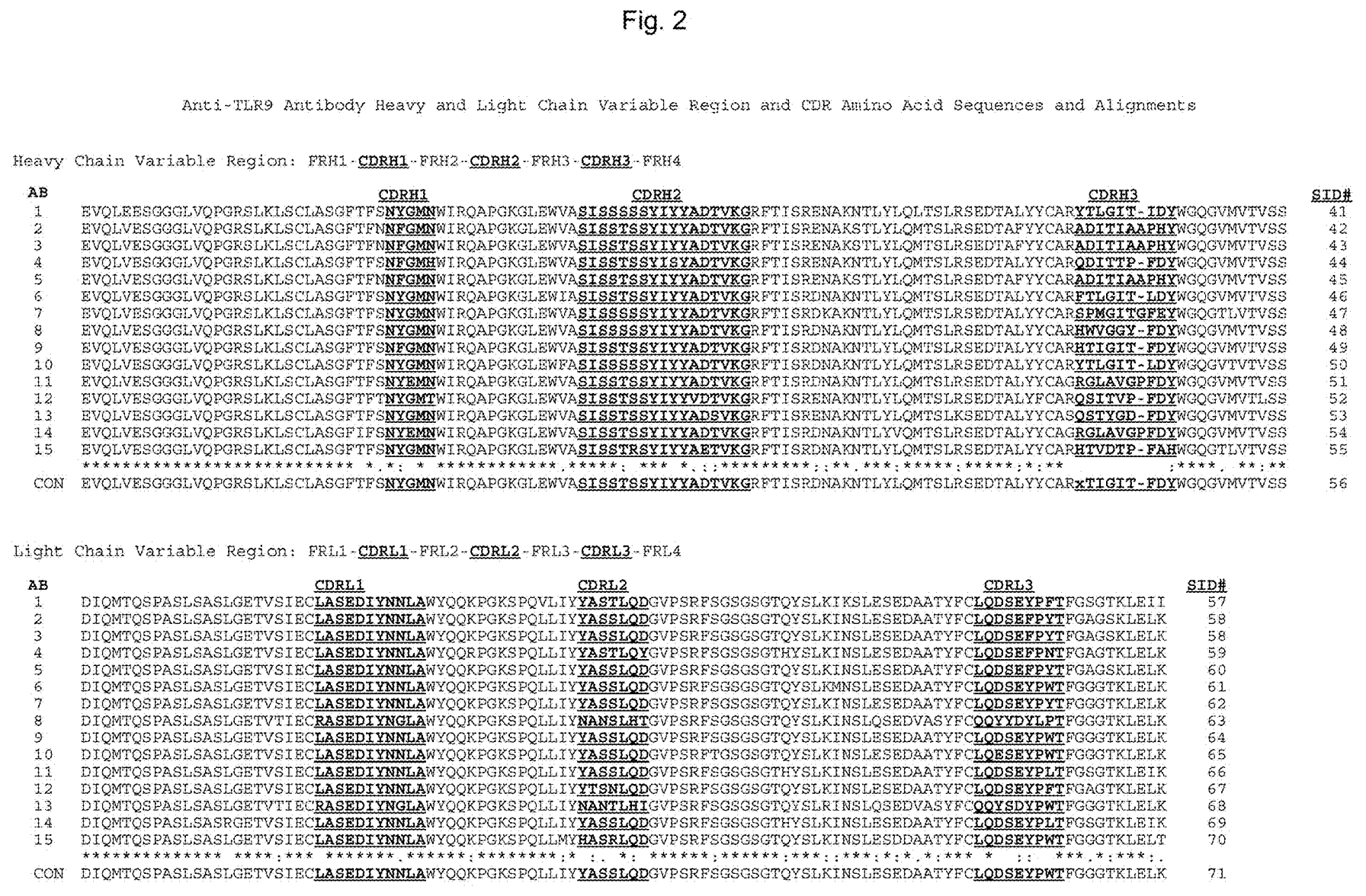

Amino acid sequences of the individual variable domains (CDRs and Framework regions), including the CDR1, CDR2, and CDR3 regions, for both the heavy and light chains for 15 different antibodies (clones), designated AB 1-15 (also referred to herein as antibodies 1-15, and clones 1-15), are shown in FIG. 2. The various heavy and light chain CDR sequences are shown in Table 1, below.

TABLE 1

CDR Sequences and Sequence ID Numbers of VH and VL domains for representative mouse anti-TLR9 monoclonal antibodies

| SEQ ID NO | CDR Type | AB (clone) Number (s) | Amino Acid Sequence |
|---|---|---|---|
| 1 | CDRH1 | 1, 6-8, 10, 13, 15, VH Con | NYGMN |
| 2 | CDRH1 | 2, 3, 5, 9 | NFGMN |
| 73 | CDRH1 | 4 | NFGMH |
| 74 | CDRH1 | 11, 14 | NYEMN |
| 75 | CDRH1 | 12 | NYGMT |
| 3 | CDRH2 | 1, 7, 8, 10 | SISSSSSYIYYADTVKG |
| 4 | CDRH2 | 2, 3, 5, 6, 9, 11, 14, VH Con | SISSTSSYIYYADTVKG |
| 5 | CDRH2 | 4 | SISSTSSYISYADTVKG |

TABLE 1-continued

CDR Sequences and Sequence ID Numbers of VH and VL domains for representative mouse anti-TLR9 monoclonal antibodies

| SEQ ID NO | CDR Type | AB (clone) Number (s) | Amino Acid Sequence |
|---|---|---|---|
| 6 | CDRH2 | 12 | SISSTSSYIYYVDTVKG |
| 7 | CDRH2 | 13 | SISSTSSYIYYADSVKG |
| 8 | CDRH2 | 15 | SISSTRSYIYYAETVKG |
| 9 | CDRH3 | 1 | YTLGIT-IDY |
| 10 | CDRH3 | 2, 3, 5 | ADITIAAPHY |
| 11 | CDRH3 | 4 | QDITTP-FDY |
| 12 | CDRH3 | 6 | FTLGIT-LDY |
| 13 | CDRH3 | 7 | SPMGITGFEY |
| 14 | CDRH3 | 8 | HWVGGY-FDY |
| 15 | CDRH3 | 9 | HTIGIT-FDY |
| 16 | CDRH3 | 10 | YTLGIT-LDY |
| 17 | CDRH3 | 11, 14 | RGLAVGPFDY |
| 18 | CDRH3 | 12 | QSITVP-FDY |
| 19 | CDRH3 | 13 | QSTYGD-FDY |
| 20 | CDRH3 | 15 | HTVDTP-FAH |
| 21 | CDRH3 | VH Con | xTIGIT-FDY |
| 22 | CDRL1 | 1-7, 9-12, 14, 15, VL Con | LASEDIYNNLA |
| 23 | CDRL1 | 8, 13 | RASEDIYNGLA |
| 24 | CDRL2 | 1 | YASTLQD |
| 25 | CDRL2 | 2, 3, 5-7, 9-11, 14, VL Con | YASSLQD |
| 26 | CDRL2 | 4 | YASTLQY |
| 27 | CDRL2 | 8 | NANSLHT |
| 28 | CDRL2 | 12 | YTSNLQD |
| 29 | CDRL2 | 13 | NANTLHI |
| 30 | CDRL2 | 15 | HASRLQD |
| 31 | CDRL3 | 1, 12 | LQDSEYPFT |
| 32 | CDRL3 | 2, 3, 5 | LQDSEFPYT |
| 33 | CDRL3 | 4 | LQDSEFPNT |
| 34 | CDRL3 | 6, 9, 15, VL Con | LQDSEYPWT |
| 35 | CDRL3 | 7 | LQDSEYPYT |
| 36 | CDRL3 | 8 | QQYYDYLPT |
| 37 | CDRL3 | 10 | LQESEYPWT |
| 38 | CDRL3 | 11, 14 | LQDSEYPLT |
| 39 | CDRL3 | 13 | QQYSDYPWT |

"x" denotes any residue. In some embodiments, "x" is Y, A, Q, F, S, H, or R.

Example 3: Detection of Cells Expressing TLR9

This example describes flow cytometry-based detection of human peripheral blood mononuclear cells (PBMCs) using certain murine anti-TLR9 monoclonal antibodies provided herein.

Materials and Methods

PBMC Isolation

Human peripheral blood mononuclear cells (PBMCs) were isolated in aseptic conditions through a gradient of Ficoll-Paque PLUS (GE Healthcare) according manufacturer instructions.

Surface and Intracellular Staining

The PBMCs were counted and adjusted in Cell Staining Buffer (BioLegend, cat. #420201) to a cell density of 0.7-$1 \times 10^7$ cells/mL. A 100 µl cell suspension (0.7-$1 \times 10^6$ total cells) was stained with CD3, CD19, and CD304 for 15 minutes in the dark. For detection of surface CD289/TLR9, isotype (rat IgG2a, k or mouse IgG1, k) or monoclonal TLR9 antibodies (see FIG. 3; AB1, AB2, AB3, AB4, Commercial ABI, or Commercial ABII) were included in the surface cocktail and stained for 15 minutes in the dark. Cells were washed twice with 2 mL of Cell Staining Buffer. For detection of surface CD289/TLR9, cells were resuspended in 300 µL 1% paraformaldehyde and acquired on a cytometer. For detection of intracellular CD289/TLR9, cells were resuspended in 300-500 µL Fixation Buffer (BioLegend, cat. #420801) for 20 minutes in the dark. Cells were washed twice with 2 mL of 1× Intracellular Staining Permeabilization Wash Buffer (BioLegend, cat. #421002) and then stained with isotype (rat IgG2a, k or mouse IgG1, k) or monoclonal TLR9 antibodies (AB1, AB2, AB3, AB4, Commercial ABI, Commercial ABII) for 30 minutes in the dark. Cells were washed with 2 mL of 1× Intracellular Staining Permeabilization Wash Buffer followed by a 2 mL wash with Cell Staining Buffer. Cells were resuspended in 300 µL of Cell Staining Buffer and acquired on a cytometer. Samples were acquired on a BD CantoII and analyzed using FlowJo software.

All reagents used are from BioLegend unless otherwise indicated.

Flow Cytometry/Gating Hierarchy

Lymphocytes and monocytes were gated based on their forward (FSC) and side scatter (SSC) profiles (FIG. 4, panel A). Lymphocytes were $FS^{lo}SSC^{lo}$ and monocytes were $FSC^{int}SSC^{int}$ (FIG. 4, panel B). From the lymphocyte gate, B cells were $CD19^+CD3^-$ and T cells were $CD3^+CD19^-$ (FIG. 4, panel D). Lymphocytes* fell into the lymphocyte gate, but were not T cells or B cells ($CD19^-CD3^-$). Plasmacytoid dendritic cells (pDCs) were intermediate between lymphocytes and monocytes by FSC and SSC, so pDCs were identified as $SSC^{int}CD304^+$ (FIG. 4, panel C). A histogram was generated of each cell population and the median fluorescent intensity (MFI) was quantified. The MFI of each TLR9 antibody (clone) and respective isotype control was used to calculate the signal to noise (S:N) ratio for each antibody (clone).

Results

Figure 5:
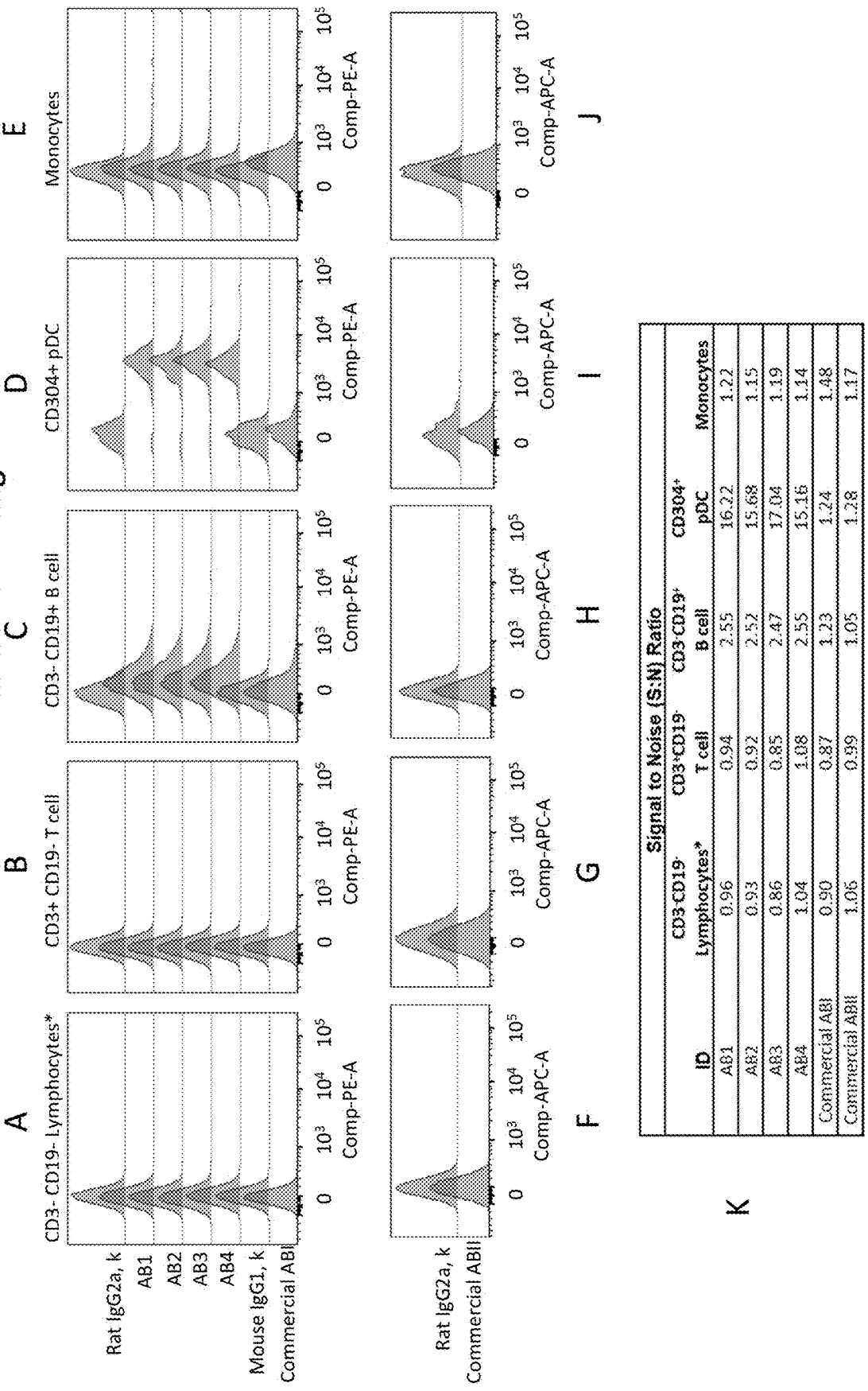
FIG. 5, panels A-K, show the surface staining results of experiments described in Example 3, below.

For surface expression of TLR9, dim expression was detected on B cells by all BioLegend antibodies (i.e., antibodies 1-15; results for antibodies 1-4 are shown) with an average signal-to-noise ratio (S:N) of 2.5. Greater TLR9 expression was observed on pDCs by all BioLegend antibodies (i.e., antibodies 1-15; results for antibodies 1-4 are shown) with an average S:N of 16. Neither the Commercial ABI nor Commercial ABII antibodies detected surface expression of TLR9 on B cells or pDCs, and all antibodies (i.e., antibodies 1-15; results for antibodies 1-4 are shown; and Commercial ABI and Commercial ABII) stained negative on Lymphocytes*, T cells, and monocytes. The results of certain cell surface staining experiments are shown in FIG. 5, panels A-K.

Figure 6:
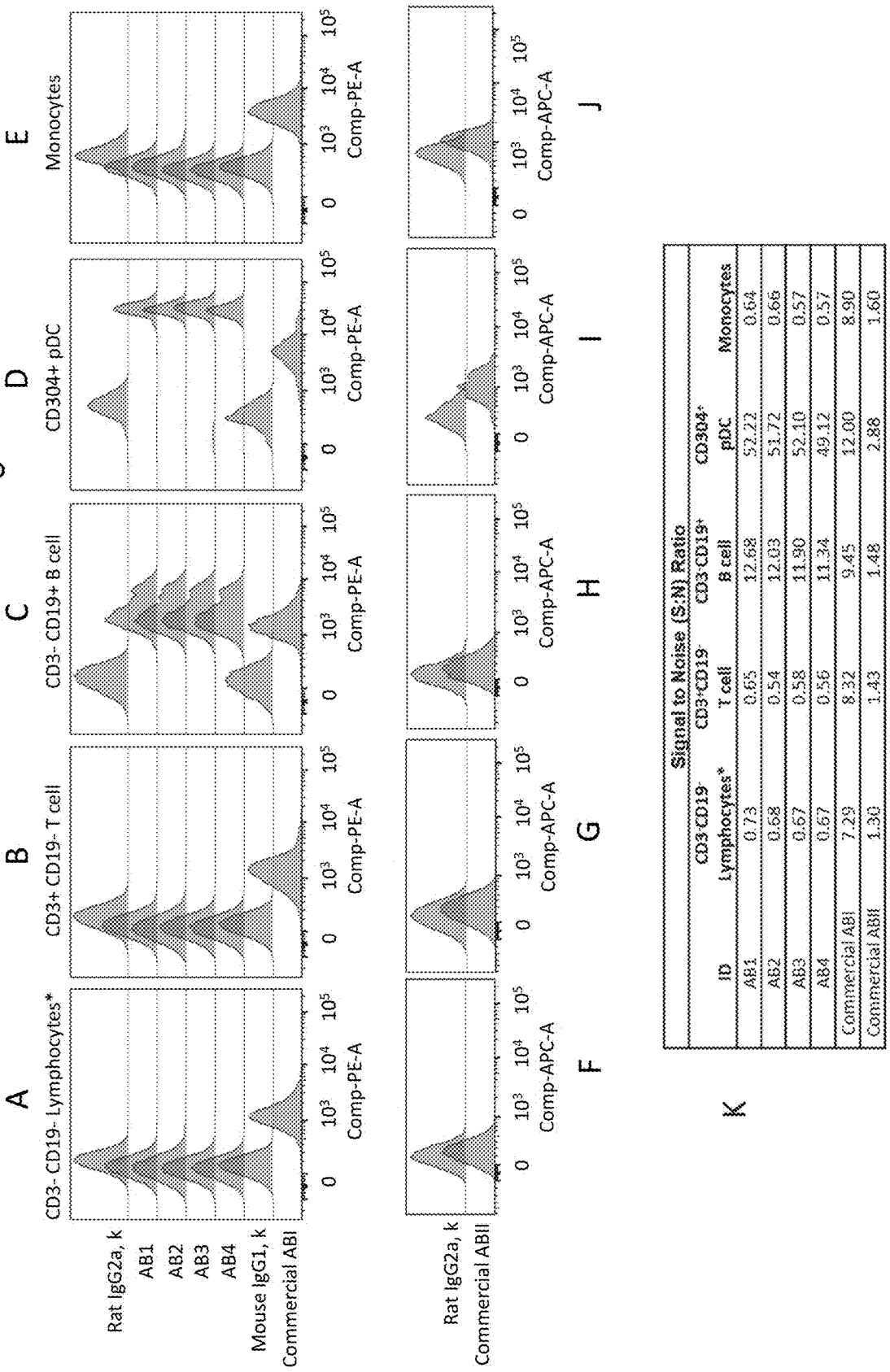
FIG. 6, panels A-K, show the intracellular staining results of experiments described in Example 3, below.

For intracellular measurement of TLR9, all BioLegend antibodies (i.e., antibodies 1-15; results for antibodies 1-4 are shown) detected significant expression of TLR9 in B cells and pDCs with an average S:N of 12 and 51.3, respectively. All BioLegend antibodies (i.e., antibodies 1-15; results for antibodies 1-4 are shown) stained negative on Lymphocytes*, T cells, and monocytes. In contrast, Commercial ABI stained positive on all PBMC populations while Commercial ABII stained dim/negative on all PBMC populations. The results of certain intracellular staining experiments are shown in FIG. 6, panels A-K.

Example 4: Functional Assay

This example describes a functional assay based on TLR9 detection in cells that overexpress the target.

Experimental

HEK293 cells overexpressing human TLR9 (293XL-hTLR9A, InvivoGen) were cultured and stimulated according to the manufacturer's instructions. Briefly, 50,000 293XL-hTLR9A cells were seeded in a 96 well plate, cultured overnight, and then stimulated with 10 µg/mL CpG-B (InvivoGen) and multiple concentrations of TLR9 antibody (0.00061-10 µg/ml) for 24 hours. Supernatants were collected and evaluated for secretion of IL-8 (BioLegend cat. #431507).

Results

Figure 7:
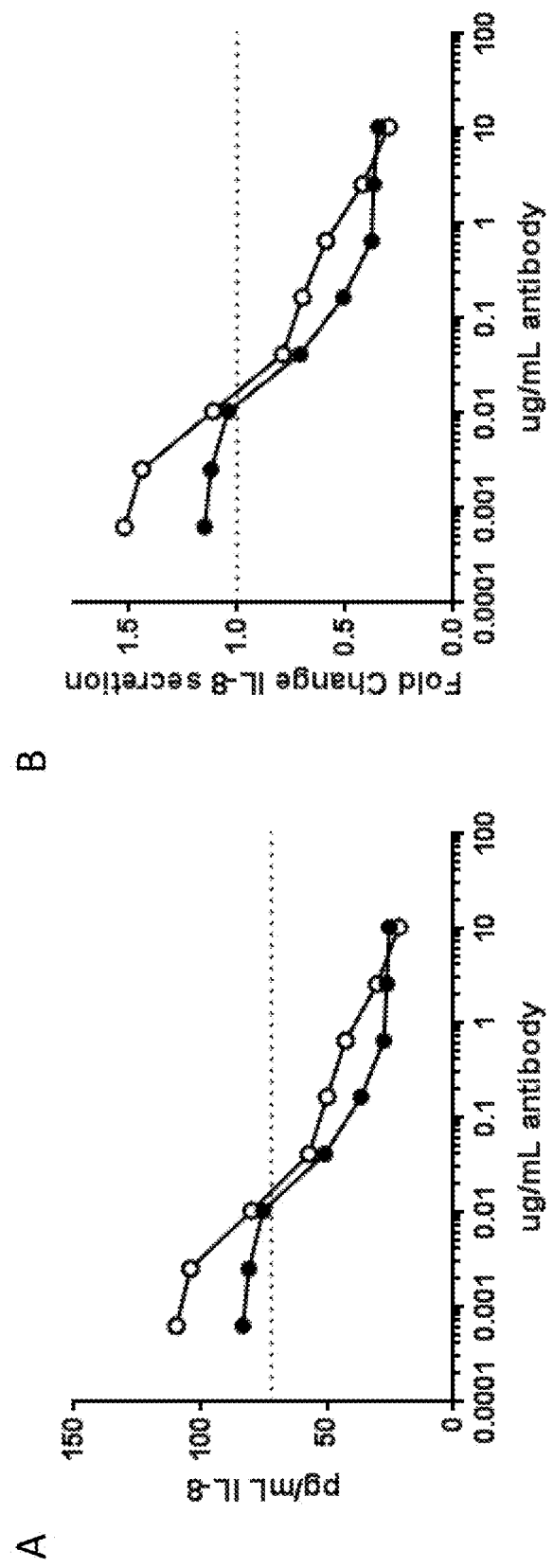
FIG. 7, panels A and B, show plots of the results of the functional assay described in Example 4, below. Briefly, panels A and B show IL-8 secretion by 293XL-hTLR9A cells following treatment with CpG-B and an anti-TLR9 antibody provided herein.

In vitro cell stimulation studies with CpG-B indicated that some antibodies enhance and inhibit TLR9-induced IL-8 secretion by 283XL-hTLR9 cells at low and high concentrations, respectively. FIG. 7, panels A and B, graphically present these results. Antibody 13 (AB13; clone 13) inhibited 50% of CpG-B-induced IL-8 secretion ($IC_{50}$) at 1 µg/ml and antibody 1 (AB1; clone 1) has an $IC_{50}$ of 0.125 µg/ml.

Example 6: Blocking Assay

This example describes a blocking assay performed using a representative subset of anti-TLR9 antibodies described herein.

PBMC Isolation

Human peripheral blood mononuclear cells (PBMCs) were isolated through a gradient of Ficoll-Paque PLUS (GE Healthcare) according to manufacturer instructions.

Blocking Assay

For blocking studies, PBMCs were stained with CD19, and CD304, fixed, permeabilized, and then incubated with 5 µg purified antibody (Rat IgG2a, Rag IgG2b, AB1, AB2, AB8, or AB13) for 30 minutes in the dark. Rat IgG2a, Rag IgG2b, AB1, AB2, AB8, and AB13 were used as blocking agents. In certain instances, no blocking agents were used. Cells were then incubated with PE conjugated antibody (AB1, AB2, AB3, AB4, AB8, AB9, AB10, AB12, AB13, AB14, AB15) or isotype control for 30 minutes. Cells were washed with 1× Permeabilization Buffer (Intracellular Staining Permeabilization Wash Buffer (BioLegend, cat. #421002)), acquired on a BD CantoII and analyzed using FlowJo software.

Calculations for % Blocking

Percentage original MFI was calculated by dividing the MFI of samples blocked with isotype controls, AB1, AB2, AB8, or AB13 by the MFI without blocking. This value was subtracted from 100 to get a blocking percentage. The formula is shown below:

$$100 - \left(\frac{[MFI \text{ blocking}]}{[MFI \text{ no blocking}]} * 100\right)$$

Results

Figure 8:
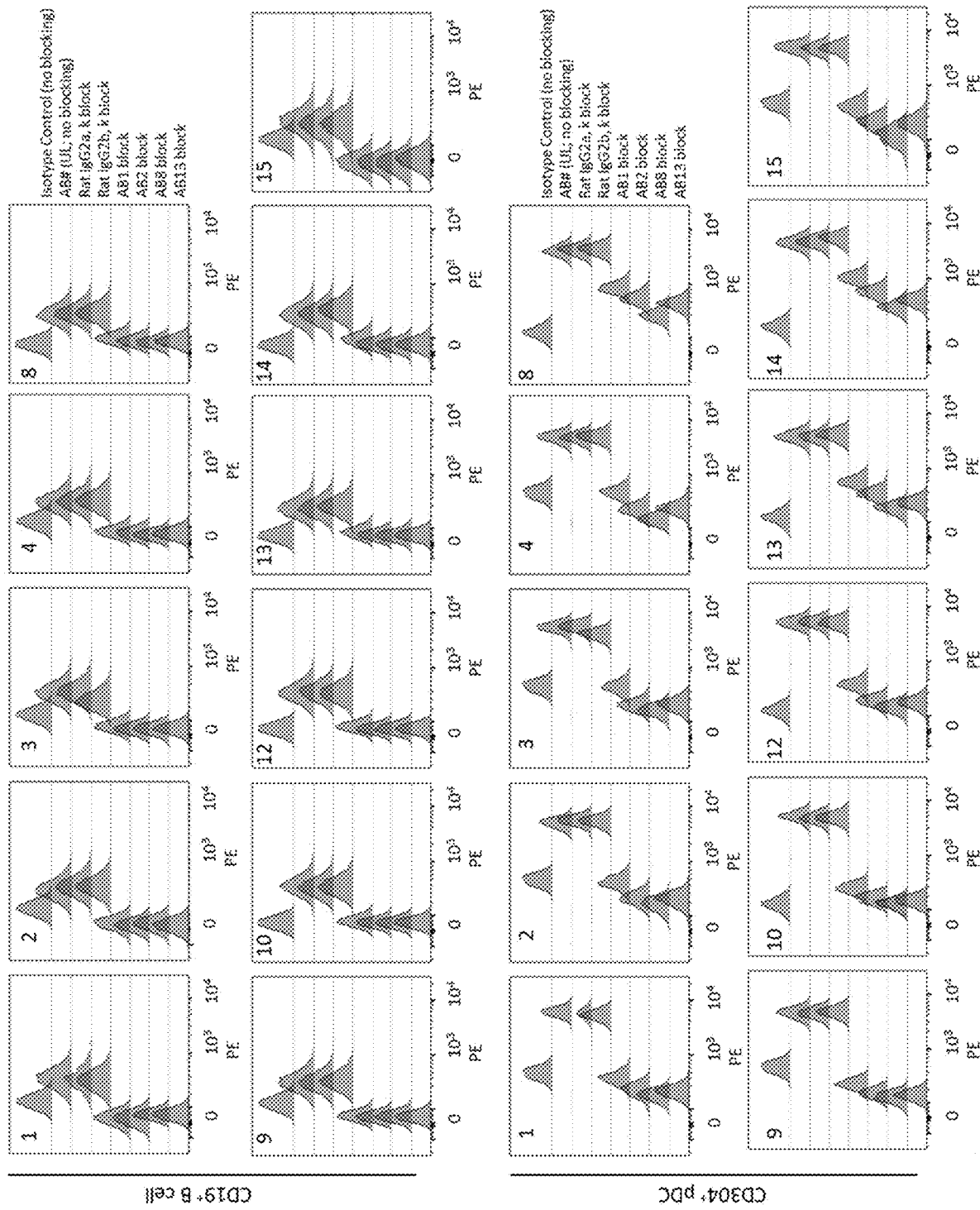
FIG. 8 shows results of a blocking assay described in Example 6. The top two rows show assay results for CD19+ B cells. The bottom two rows show assay results for CD304+ plasmacytoid dendritic cells (pDCs). Each panel is numbered in the upper left (UL) according to the PE conjugated anti-TLR9 antibody used for each assay (i.e., AB1, AB2, AB3, AB4, AB8, AB9, AB10, AB12, AB13, AB14, AB15).

Staining results for isotype control (no blocking; top histogram in each panel of FIG. 8) and each of anti-TLR9 antibodies AB1, AB2, AB3, AB4, AB8, AB9, AB10, AB12, AB13, AB14, AB15 (no blocking; second histogram from the top in each panel of FIG. 8; each panel numbered according to the respective staining antibody #) are presented in FIG. 8. For the blocking assay, Rat IgG2a and Rat IgG2b did not significantly alter the MFI (median fluorescent intensity) of TLR9 expressed by B cells or pDCs (third and fourth histograms (from the top) in each panel of FIG. 8). AB1, AB2, AB8 and AB13 used in the blocking assay reduced the MFI of TLR9 expression by a percentage ranging from 70% to 100% on B cells and 76% to 100% on pDCs. Overall, AB1, AB2, AB8 and AB13 used in the blocking assay reduced the MFI of TLR9 expression by an average 84% on B cells and 91% on pDCs (bottom four histograms in each panel of FIG. 8). Tables 2 and 3 below present MFI and % blocking results for B cells and pDCs, respectively.

TABLE 2

| | B cell subset | | |
|---|---|---|---|
| PE conjugate | Block | MFI | % Blocking |
| | Rat IgG2a | N/A | 142 | N/A |
| | Rat IgG2b | N/A | 52 | N/A |
| AB1 | N/A | 380 | N/A |
| | Rat IgG2a | 369 | 3 |
| | Rat IgG2b | 351 | 8 |
| | AB1 | 30 | 92 |
| | AB2 | 30 | 92 |
| | AB8 | 52 | 86 |
| | AB13 | 52 | 86 |
| AB2 | N/A | 317 | N/A |
| | Rat IgG2a | 360 | 0 |
| | Rat IgG2b | 365 | 0 |
| | AB1 | 40 | 87 |
| | AB2 | 27 | 91 |
| | AB8 | 36 | 89 |
| | AB13 | 27 | 91 |
| AB3 | N/A | 366 | N/A |
| | Rat IgG2a | 377 | 0 |
| | Rat IgG2b | 264 | 28 |
| | AB1 | 58 | 84 |
| | AB2 | 42 | 88 |
| | AB8 | 43 | 88 |
| | AB13 | 46 | 88 |
| AB4 | N/A | 337 | N/A |
| | Rat IgG2a | 340 | 0 |
| | Rat IgG2b | 350 | 0 |
| | AB1 | 68 | 80 |
| | AB2 | 58 | 83 |

TABLE 2-continued

| | B cell subset | | |
|---|---|---|---|
| PE conjugate | Block | MFI | % Blocking |
| | AB8 | 47 | 86 |
| | AB13 | 56 | 83 |
| AB8 | N/A | 297 | N/A |
| | Rat IgG2a | 308 | 0 |
| | Rat IgG2b | 316 | 0 |
| | AB1 | 89 | 70 |
| | AB2 | 71 | 76 |
| | AB8 | 62 | 79 |
| | AB13 | 69 | 77 |
| AB9 | N/A | 353 | N/A |
| | Rat IgG2a | 350 | 1 |

TABLE 2

| | B cell subset | | |
|---|---|---|---|
| PE conjugate | Block | MFI | % Blocking |
| | Rat IgG2b | 368 | 0 |
| | AB1 | 54 | 85 |
| | AB2 | 49 | 86 |
| | AB8 | 51 | 86 |
| | AB13 | 49 | 86 |
| AB10 | N/A | 392 | N/A |
| | Rat IgG2a | 370 | 6 |
| | Rat IgG2b | 380 | 3 |
| | AB1 | 61 | 84 |
| | AB2 | 53 | 86 |
| | AB8 | 52 | 87 |
| | AB13 | 53 | 86 |
| AB12 | N/A | 387 | N/A |
| | Rat IgG2a | 399 | 0 |
| | Rat IgG2b | 385 | 1 |
| | AB1 | 65 | 83 |
| | AB2 | 52 | 87 |
| | AB8 | 52 | 86 |
| | AB13 | 53 | 86 |
| AB13 | N/A | 272 | N/A |
| | Rat IgG2a | 276 | 0 |
| | Rat IgG2b | 297 | 0 |
| | AB1 | 72 | 74 |
| | AB2 | 56 | 79 |
| | AB8 | 52 | 81 |
| | AB13 | 55 | 80 |
| AB14 | N/A | 308 | N/A |
| | Rat IgG2a | 321 | 0 |
| | Rat IgG2b | 375 | 0 |
| | AB1 | 88 | 71 |
| | AB2 | 59 | 81 |
| | AB8 | 52 | 83 |
| | AB13 | 58 | 81 |
| AB15 | N/A | 313 | N/A |
| | Rat IgG2a | 276 | 12 |
| | Rat IgG2b | 280 | 11 |
| | AB1 | 0 | 100 |
| | AB2 | 0 | 100 |
| | AB8 | 0 | 100 |
| | AB13 | 12 | 96 |

TABLE 3

| | pDC cell subset | | |
|---|---|---|---|
| PE conjugate | Block | MFI | % Blocking |
| | Rat IgG2a | N/A | 490 | N/A |
| | Rat IgG2b | N/A | 138 | N/A |
| AB1 | N/A | 5797 | N/A |
| | Rat IgG2a | 5614 | 3 |
| | Rat IgG2b | 5048 | 13 |
| | AB1 | 404 | 93 |

TABLE 3-continued pDC cell subset

| PE conjugate | Block | MFI | % Blocking |
|---|---|---|---|
| | AB2 | 262 | 95 |
| | AB8 | 210 | 96 |
| | AB13 | 244 | 96 |
| AB2 | N/A | 4785 | N/A |
| | Rat IgG2a | 5247 | 0 |
| | Rat IgG2b | 5125 | 0 |
| | AB1 | 441 | 91 |
| | AB2 | 239 | 95 |
| | AB8 | 186 | 96 |
| | AB13 | 235 | 95 |
| AB3 | N/A | 5116 | N/A |
| | Rat IgG2a | 5185 | 0 |
| | Rat IgG2b | 3794 | 26 |
| | AB1 | 472 | 91 |
| | AB2 | 233 | 95 |
| | AB8 | 188 | 96 |
| | AB13 | 243 | 95 |
| AB4 | N/A | 4419 | N/A |
| | Rat IgG2a | 4353 | 1 |
| | Rat IgG2b | 4522 | 0 |
| | AB1 | 500 | 89 |
| | AB2 | 257 | 94 |
| | AB8 | 168 | 96 |
| | AB13 | 274 | 94 |
| AB8 | N/A | 3745 | N/A |
| | Rat IgG2a | 3958 | 0 |
| | Rat IgG2b | 4083 | 0 |
| | AB1 | 841 | 78 |
| | AB2 | 569 | 85 |
| | AB8 | 298 | 92 |
| | AB13 | 469 | 87 |
| AB9 | N/A | 4339 | N/A |
| | Rat IgG2a | 4240 | 2 |
| | Rat IgG2b | 4485 | 0 |
| | AB1 | 254 | 94 |
| | AB2 | 169 | 96 |
| | AB8 | 141 | 97 |
| | AB13 | 155 | 96 |
| AB10 | N/A | 4825 | N/A |
| | Rat IgG2a | 4463 | 8 |
| | Rat IgG2b | 4583 | 5 |
| | AB1 | 280 | 94 |
| | AB2 | 185 | 96 |
| | AB8 | 144 | 97 |
| | AB13 | 165 | 97 |
| AB12 | N/A | 4833 | N/A |
| | Rat IgG2a | 4906 | 0 |
| | Rat IgG2b | 4745 | 2 |
| | AB1 | 411 | 91 |
| | AB2 | 220 | 95 |
| | AB8 | 164 | 97 |
| | AB13 | 203 | 96 |
| AB13 | N/A | 3516 | N/A |
| | Rat IgG2a | 3499 | 0 |
| | Rat IgG2b | 3788 | 0 |
| | AB1 | 583 | 83 |
| | AB2 | 376 | 89 |
| | AB8 | 218 | 94 |
| | AB13 | 264 | 92 |
| AB14 | N/A | 4185 | N/A |
| | Rat IgG2a | 4382 | 0 |
| | Rat IgG2b | 5108 | 0 |
| | AB1 | 1010 | 76 |
| | AB2 | 582 | 86 |
| | AB8 | 332 | 92 |
| | AB13 | 430 | 90 |
| AB15 | N/A | 4698 | N/A |
| | Rat IgG2a | 4515 | 4 |
| | Rat IgG2b | 4545 | 3 |
| | AB1 | 423 | 91 |
| | AB2 | 231 | 95 |
| | AB8 | 132 | 97 |
| | AB13 | 224 | 95 |

Example 7: Examples of Embodiments

The examples set forth below illustrate certain embodiments and do not limit the technology.

A1. An anti-TLR9 agent, optionally, an isolated, non-naturally occurring antibody, or antigen-binding fragment or derivative thereof, that binds Toll-like Receptor 9 (TLR9) under laboratory or physiological conditions, wherein the agent comprises at least one immunoglobulin heavy chain variable domain and at least one immunoglobulin light chain variable domain, wherein:

a) each immunoglobulin heavy chain variable domain of the anti-TLR9 agent comprises first, second, and third heavy chain complementarity determining regions (CDRs), wherein the first heavy chain CDR (CDRH1) comprises an amino acid sequence that has a sequence identity of at least 65 percent, optionally a sequence identity of at least 80 percent, at least 90 percent, at least 95 percent, and 100 percent identity with the amino acid sequence NYGMN or NFGMN (SEQ ID NOS:1 and 2, respectively), the second heavy chain CDR (CDRH2) comprises an amino acid sequence that has a sequence identity of at least 65 percent, optionally a sequence identity of at least 80 percent, at least 90 percent, at least 95 percent, and 100 percent identity with the amino acid sequence SISSSSSYIYY-ADTVKG, SISSTSSYIYYADTVKG, SISSTSSYISY-ADTVKG, SISSTSSYIYYVDTVKG, SISST-SSYIYYADSVKG, or SISSTRSYIYYAETVKG (SEQ ID NOS:3-8, respectively), and the third heavy chain CDR (CDRH3) comprises an amino acid sequence that has a sequence identity of at least 65 percent, optionally a sequence identity of at least 80 percent, at least 90 percent, at least 95 percent, and 100 percent identity with the amino acid sequence YTLGIT-IDY, ADI-TIAAPHY, QDITTP-FDY, FTLGIT-LDY, SPMGITGFEY, HWVGGY-FDY, HTIGIT-FDY, YTLGIT-LDY, RGLAVGPFDY, QSITVP-FDY, QSTYGD-FDY, HTVDTP-FAH, or xTIGIT-FDY (SEQ ID NO:9-21, respectively); and b) each immunoglobulin light chain variable domain of the anti-TLR9 agent comprises first, second, and third light chain CDRs, wherein the first light chain CDR (CDRL1) comprises an amino acid sequence that has a sequence identity of at least 65 percent, optionally a sequence identity of at least 80 percent, at least 90 percent, at least 95 percent, and 100 percent identity with the amino acid sequence LASEDIYNNLA or RASEDIYNGLA (SEQ ID NOS:22 and 23, respectively), the second light chain CDR (CDRL2) comprises an amino acid sequence that has a sequence identity of at least 65 percent, optionally a sequence identity of 100 percent identity with the amino acid sequence YASTLQD, YASSLQD, YASTLQY, NANSLHT, YTSNLQD, NANTLHI, or HASRLQD (SEQ ID NOS:24-30, respectively), and the third light chain CDR (CDRL3) comprises an amino acid sequence that has a sequence identity of at least 65 percent, optionally a sequence identity of at least 80 percent, at least 90 percent, at least 95 percent, and 100 percent identity with the amino acid sequence LQD-SEYPFT, LQDSEFPYT, LQDSEFPNT, LQDSEY-PWT, LQDSEYPYT, QQYYDYLPT, LQESEYPWT, LQDSEYPLT, or QQYSDYPWT (SEQ ID NOS:31-39, respectively).

A2. An anti-TLR9 agent according to embodiment A1 that comprises a non-naturally occurring anti-TLR9 antibody (mAb) comprising two immunoglobulin heavy chain variable domains comprising first, second, and third heavy chain complementarity determining regions (CDRH1-3, respectively) and two immunoglobulin light chain variable domains comprising first, second, and third light chain complementarity determining regions (CDRL1-3, respectively), wherein the antibody comprises immunoglobulin heavy chain variable domains and immunoglobulin light chain variable domains having sets of CDRH1-3 and CDRL1-3 selected from the group consisting of:

A6. An anti-TLR9 agent according to embodiment A1, A2 or A3 that further comprises a detectable label.

A7. An isolated nucleic acid molecule that encodes an immunoglobulin heavy chain variable domain of an anti-TLR9 agent according to embodiment A1, A2 or A3.

A8. An isolated nucleic acid molecule that encodes an immunoglobulin light chain variable domain of an anti-TLR9 agent according to embodiment A1, A2 or A3.

A9. A recombinant expression vector that comprises first and second expression cassettes, the first expression cassette

| mAb | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 1 | NYGMN (1) | SISSSSSYIYYADTVKG (3) | YTLGIT-IDY (9) | LASEDIYNNLA (22) | YASTLQD (24) | LQDSEYPFT (31) |
| 2 | NFGMN (2) | SISSTSSYIYYADTVKG (4) | ADITIAAPHY (10) | LASEDIYNNLA (22) | YASSLQD (25) | LQDSEFPYT (32) |
| 3 | NFGMN (2) | SISSTSSYIYYADTVKG (4) | ADITIAAPHY (10) | LASEDIYNNLA (22) | YASSLQD (25) | LQDSEFPYT (32) |
| 4 | NFGMH (2) | SISSTSSYISYADTVKG (5) | QDITTP-FDY (11) | LASEDIYNNLA (22) | YASTLQY (26) | LQDSEFPNT (33) |
| 5 | NFGMN (2) | SISSTSSYIYYADTVKG (4) | ADITIAAPHY (10) | LASEDIYNNLA (22) | YASSLQD (25) | LQDSEFPYT (32) |
| 6 | NYGMN (1) | SISSTSSYIYYADTVKG (4) | FTLGIT-LDY (12) | LASEDIYNNLA (22) | YASSLQD (25) | LQDSEYPWT (34) |
| 7 | NYGMN (1) | SISSSSSYIYYADTVKG (3) | SPMGITGFEY (13) | LASEDIYNNLA (22) | YASSLQD (25) | LQDSEYPYT (35) |
| 8 | NYGMN (1) | SISSSSSYIYYADTVKG (3) | HWVGGY-FDY (14) | RASEDIYNGLA (23) | NANSLHT (27) | QQYYDYLPT (36) |
| 9 | NFGMN (2) | SISSTSSYIYYADTVKG (4) | HTIGIT-FDY (15) | LASEDIYNNLA (22) | YASSLQD (25) | LQDSEYPWT (34) |
| 10 | NYGMN (1) | SISSSSSYIYYADTVKG (3) | YTLGIT-LDY (16) | LASEDIYNNLA (22) | YASSLQD (25) | LQESEYPWT (37) |
| 11 | NYEMN (1) | SISSTSSYIYYADTVKG (4) | RGLAVGPFDY (17) | LASEDIYNNLA (22) | YASSLQD (25) | LQDSEYPLT (38) |
| 12 | NYGMT (1) | SISSTSSYIYYVDTVKG (6) | QSITVP-FDY (18) | LASEDIYNNLA (22) | YTSNLQD (28) | LQDSEYPFT (31) |
| 13 | NYGMN (1) | SISSTSSYIYYADSVKG (7) | QSTYGD-FDY (19) | RASEDIYNGLA (23) | NANTLHI (29) | QQYSDYPWT (39) |
| 14 | NYEMN (1) | SISSTSSYIYYADTVKG (4) | RGLAVGPFDY (17) | LASEDIYNNLA (22) | YASSLQD (25) | LQDSEYPLT (38) |
| 15 | NYGMN (1) | SISSTRSYIYYAETVKG (8) | HTVDTP-FAH (20) | LASEDIYNNLA (22) | HASRLQD (30) | LQDSEYPWT (34) |
| 16 | NYGMN (1) | SISSTSSYIYYADTVKG (4) | xTIGIT-FDY (21) | LASEDIYNNLA (22) | YASSLQD (25) | LQDSEYPWT (34) |

A3. An anti-TLR9 agent according to embodiment A1 or A2 that is a humanized antibody or an antigen-binding fragment or derivative of a humanized antibody that binds TLR9.

A4. A diagnostic reagent that comprises an anti-TLR9 agent according to embodiment A1, A2 or A3.

A5. A diagnostic kit configured to detect Toll-like Receptor 9 (TLR9) in a biological sample, the kit comprising an anti-TLR9 agent according to embodiment A1, A2 or A3 conjugated with a detectable marker or non-diffusively immobilized on a solid support.

comprising a promoter and a nucleic acid molecule that encodes an immunoglobulin heavy chain variable domain and an immunoglobulin light chain variable of an anti-TLR9 agent according to embodiment A1, A2 or A3.

A10. A recombinant host cell transfected with a recombinant expression vector according to embodiment A9.

A11. A method of detecting TLR9, comprising contacting a sample known or suspected to contain TLR9 with an anti-TLR9 agent according to embodiment A1, A2 or A3 and, if the sample contains TLR9, detecting TLR9:anti-TLR9 complexes.

B1. An anti-TLR9 agent that binds Toll-like Receptor 9 (TLR9) under laboratory or physiological conditions, wherein the agent comprises at least one immunoglobulin heavy chain variable domain and at least one immunoglobulin light chain variable domain, wherein:
- a) each immunoglobulin heavy chain variable domain of the anti-TLR9 agent comprises first, second, and third heavy chain complementarity determining regions (CDRs), wherein the first heavy chain CDR (CDRH1) comprises an amino acid sequence that is at least 80 percent identical to the amino acid sequence $NX_1X_2MX_3$ (SEQ ID NO: 76), wherein $X_1$ is Y or F,
  $X_2$ is G or E, and
  $X_3$ is N, H or T;

the second heavy chain CDR (CDRH2) comprises an amino acid sequence that is at least 80 percent identical to the amino acid sequence $SISSX_1X_2SYIX_3YX_4X_5X_6VKG$ (SEQ ID NO: 77), wherein $X_1$ is S or T,
  $X_2$ is S or R,
  $X_3$ is Y or S,
  $X_4$ is A or V,
  $X_5$ is D or E, and
  $X_6$ is T or S; and the third heavy chain CDR (CDRH3) comprises an amino acid sequence that is at least 80 percent identical to the amino acid sequence $X_1X_2X_3X_4X_5X_6X_7X_8X_9X_{10}$ (SEQ ID NO: 78), wherein $X_1$ is Y, A, Q, F, S, H or R,
  $X_2$ is T, D, P, W, G or S,
  $X_3$ is L, I, M, V or T,
  $X_4$ is G, T, A, D or Y,
  $X_5$ is I, T, G or V,
  $X_6$ is T, A, P, Y, G or D,
  $X_7$ is no amino acid, A, G or P,
  $X_8$ is I, P, F or L,
  $X_9$ is D, H, E or A, and
  $X_{10}$ is Y or H; and

- b) each immunoglobulin light chain variable domain of the anti-TLR9 agent comprises first, second, and third light chain CDRs, wherein the first light chain CDR (CDRL1) comprises an amino acid sequence that is at least 80 percent identical to the amino acid sequence $X_1ASEDIYNX_2LA$ (SEQ ID NO: 79), wherein $X_1$ is L or R; and
  $X_2$ is N or G;

the second light chain CDR (CDRL2) comprises an amino acid sequence that is at least 80 percent identical to the amino acid sequence $X_1X_2X_3X_4LX_5X_6$ (SEQ ID NO: 80), wherein $X_1$ is Y, N or H,
  $X_2$ is A or T,
  $X_3$ is S or N,
  $X_4$ is T, S, N or R,
  $X_5$ is Q or H, and
  $X_6$ is D, Y, T or I; and the third light chain CDR (CDRL3) comprises an amino acid sequence that is at least 80 percent identical to the amino acid sequence $X_1QX_2X_3X_4X_5X_6X_7T$ (SEQ ID NO: 81), wherein $X_1$ is L or Q,
  $X_2$ is D, Y or E,
  $X_3$ is S or Y,
  $X_4$ is E or D,
  $X_5$ is Y or F,
  $X_6$ is P or L, and
  $X_7$ is F, Y, N, W, L or P.

B2. The anti-TLR9 agent of embodiment B1, wherein the CDRH1 comprises an amino acid sequence that is at least 90 percent identical to the amino acid sequence of SEQ ID NO: 76.

B3. The anti-TLR9 agent of embodiment B1, wherein the CDRH1 comprises an amino acid sequence that is at least 95 percent identical to the amino acid sequence of SEQ ID NO: 76.

B4. The anti-TLR9 agent of embodiment B1, wherein the CDRH1 comprises an amino acid sequence that is 100 percent identical to the amino acid sequence of SEQ ID NO: 76.

B5. The anti-TLR9 agent of any one of embodiments B1 to B4, wherein the CDRH2 comprises an amino acid sequence that is at least 90 percent identical to the amino acid sequence of SEQ ID NO: 77.

B6. The anti-TLR9 agent of any one of embodiments B1 to B4, wherein the CDRH2 comprises an amino acid sequence that is at least 95 percent identical to the amino acid sequence of SEQ ID NO: 77.

B7. The anti-TLR9 agent of any one of embodiments B1 to B4, wherein the CDRH2 comprises an amino acid sequence that is 100 percent identical to the amino acid sequence of SEQ ID NO: 77.

B8. The anti-TLR9 agent of any one of embodiments B1 to B7, wherein the CDRH3 comprises an amino acid sequence that is at least 90 percent identical to the amino acid sequence of SEQ ID NO: 78.

B9. The anti-TLR9 agent of any one of embodiments B1 to B7, wherein the CDRH3 comprises an amino acid sequence that is at least 95 percent identical to the amino acid sequence of SEQ ID NO: 78.

B10. The anti-TLR9 agent of any one of embodiments B1 to B7, wherein the CDRH3 comprises an amino acid sequence that is 100 percent identical to the amino acid sequence of SEQ ID NO: 78.

B11. The anti-TLR9 agent of any one of embodiments B1 to B10, wherein the CDRL1 comprises an amino acid sequence that is at least 90 percent identical to the amino acid sequence of SEQ ID NO: 79.

B12. The anti-TLR9 agent of any one of embodiments B1 to B10, wherein the CDRL1 comprises an amino acid sequence that is at least 95 percent identical to the amino acid sequence of SEQ ID NO: 79.

B13. The anti-TLR9 agent of any one of embodiments B1 to B10, wherein the CDRL1 comprises an amino acid sequence that is 100 percent identical to the amino acid sequence of SEQ ID NO: 79.

B14. The anti-TLR9 agent of any one of embodiments B1 to B13, wherein the CDRL2 comprises an amino acid sequence that is at least 90 percent identical to the amino acid sequence of SEQ ID NO: 80.

B15. The anti-TLR9 agent of any one of embodiments B1 to B13, wherein the CDRL2 comprises an amino acid sequence that is at least 95 percent identical to the amino acid sequence of SEQ ID NO: 80.

B16. The anti-TLR9 agent of any one of embodiments B1 to B13, wherein the CDRL2 comprises an amino acid sequence that is 100 percent identical to the amino acid sequence of SEQ ID NO: 80.

B17. The anti-TLR9 agent of any one of embodiments B1 to B16, wherein the CDRL3 comprises an amino acid sequence that is at least 90 percent identical to the amino acid sequence of SEQ ID NO: 81.

B18. The anti-TLR9 agent of any one of embodiments B1 to B16, wherein the CDRL3 comprises an amino acid sequence that is at least 95 percent identical to the amino acid sequence of SEQ ID NO: 81.

B19. The anti-TLR9 agent of any one of embodiments B1 to B16, wherein the CDRL3 comprises an amino acid sequence that is 100 percent identical to the amino acid sequence of SEQ ID NO: 81.

B20. The anti-TLR9 agent of any one of embodiments B1 to B19, wherein the CDRH1 comprises an amino acid sequence chosen from NYGMN (SEQ ID NO: 1), NFGMN (SEQ ID NO: 2), NFGMH (SEQ ID NO: 73), NYEMN (SEQ ID NO: 74), and NYGMT (SEQ ID NO: 75).

B21. The anti-TLR9 agent of any one of embodiments B1 to B20, wherein the CDRH2 comprises an amino acid sequence chosen from SISSSSSYIYYADTVKG (SEQ ID NO: 3), SISSTSSYIYYADTVKG (SEQ ID NO: 4), SISST-SSYISYADTVKG (SEQ ID NO: 5), SISST-SSYIYYVDTVKG (SEQ ID NO: 6), SISSTSSYIYY-ADSVKG (SEQ ID NO: 7), and SISSTRSYIYYAETVKG (SEQ ID NO: 8).

B22. The anti-TLR9 agent of any one of embodiments B1 to B21, wherein the CDRH3 comprises an amino acid sequence chosen from YTLGIT-IDY (SEQ ID NO: 9), ADITIAAPHY (SEQ ID NO: 10), QDITTP-FDY (SEQ ID NO: 11), FTLGIT-LDY (SEQ ID NO: 12), SPMGITGFEY (SEQ ID NO: 13), HWVGGY-FDY (SEQ ID NO: 14), HTIGIT-FDY (SEQ ID NO: 15), YTLGIT-LDY (SEQ ID NO: 16), RGLAVGPFDY (SEQ ID NO: 17), QSITVP-FDY (SEQ ID NO: 18), QSTYGD-FDY (SEQ ID NO: 19), HTVDTP-FAH (SEQ ID NO: 20), and xTIGIT-FDY (SEQ ID NO: 21).

B23. The anti-TLR9 agent of any one of embodiments B1 to B22, wherein the CDRL1 comprises an amino acid sequence chosen from LASEDIYNNLA (SEQ ID NO: 22) and RASEDIYNGLA (SEQ ID NO: 23).

B24. The anti-TLR9 agent of any one of embodiments B1 to B23, wherein the CDRL2 comprises an amino acid sequence chosen from YASTLQD (SEQ ID NO: 24), YASSLQD (SEQ ID NO: 25), YASTLQY (SEQ ID NO: 26), NANSLHT (SEQ ID NO: 27), YTSNLQD (SEQ ID NO: 28), NANTLHI (SEQ ID NO: 29), and HASRLQD (SEQ ID NO: 30).

B25. The anti-TLR9 agent of any one of embodiments B1 to B24, wherein the CDRL3 comprises an amino acid sequence chosen from LQDSEYPFT (SEQ ID NO: 31), LQDSEFPYT (SEQ ID NO: 32), LQDSEFPNT (SEQ ID NO: 33), LQDSEYPWT (SEQ ID NO: 34), LQDSEYPYT (SEQ ID NO: 35), QQYYDYLPT (SEQ ID NO: 36), LQESEYPWT (SEQ ID NO: 37), LQDSEYPLT (SEQ ID NO: 38) and QQYSDYPWT (SEQ ID NO: 39).

B26. The anti-TLR9 agent of any one of embodiments B1 to B25, which comprises two immunoglobulin heavy chain variable domains and two immunoglobulin light chain variable domains.

B27. The anti-TLR9 agent of embodiment B26, wherein the two immunoglobulin heavy chain variable domains each comprise a set of CDRH1, CDRH2 and CDRH3 amino acid sequences.

B28. The anti-TLR9 agent of embodiment B26 or B27, wherein the two immunoglobulin light chain variable domains each comprise a set of CDRL1, CDRL2 and CDRL3 amino acid sequences.

B29. The anti-TLR9 agent of any one of embodiments B1 to B28, wherein each immunoglobulin heavy chain variable domain comprises a set of CDRH1, CDRH2 and CDRH3 amino acid sequences and each immunoglobulin light chain variable domain comprises a set of CDRL1, CDRL2 and CDRL3 amino acid sequences chosen from sets 1-16:

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 1 | NYGMN (1) | SISSSSSYIYYADTVKG (3) | YTLGIT-IDY (9) | LASEDIYNNLA (22) | YASTLQD (24) | LQDSEYPFT (31) |
| 2 | NFGMN (2) | SISSTSSYIYYADTVKG (4) | ADITIAAPHY (10) | LASEDIYNNLA (22) | YASSLQD (25) | LQDSEFPYT (32) |
| 3 | NFGMN (2) | SISSTSSYIYYADTVKG (4) | ADITIAAPHY (10) | LASEDIYNNLA (22) | YASSLQD (25) | LQDSEFPYT (32) |
| 4 | NFGMH (2) | SISSTSSYISYADTVKG (5) | QDITTP-FDY (11) | LASEDIYNNLA (22) | YASTLQY (26) | LQDSEFPNT (33) |
| 5 | NFGMN (2) | SISSTSSYIYYADTVKG (4) | ADITIAAPHY (10) | LASEDIYNNLA (22) | YASSLQD (25) | LQDSEFPYT (32) |
| 6 | NYGMN (1) | SISSTSSYIYYADTVKG (4) | FTLGIT-LDY (12) | LASEDIYNNLA (22) | YASSLQD (25) | LQDSEYPWT (34) |
| 7 | NYGMN (1) | SISSSSSYIYYADTVKG (3) | SPMGITGFEY (13) | LASEDIYNNLA (22) | YASSLQD (25) | LQDSEYPYT (35) |
| 8 | NYGMN (1) | SISSSSSYIYYADTVKG (3) | HWVGGY-FDY (14) | RASEDIYNGLA (23) | NANSLHT (27) | QQYYDYLPT (36) |
| 9 | NFGMN (2) | SISSTSSYIYYADTVKG (4) | HTIGIT-FDY (15) | LASEDIYNNLA (22) | YASSLQD (25) | LQDSEYPWT (34) |
| 10 | NYGMN (1) | SISSSSSYIYYADTVKG (3) | YTLGIT-LDY (16) | LASEDIYNNLA (22) | YASSLQD (25) | LQESEYPWT (37) |

-continued

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 11 | NYEMN (1) | SISSTSSYIYYADTVKG (4) | RGLAVGPFDY (17) | LASEDIYNNLA (22) | YASSLQD (25) | LQDSEYPLT (38) |
| 12 | NYGMT (1) | SISSTSSYIYYVDTVKG (6) | QSITVP-FDY (18) | LASEDIYNNLA (22) | YTSNLQD (28) | LQDSEYPFT (31) |
| 13 | NYGMN (1) | SISSTSSYIYYADSVKG (7) | QSTYGD-FDY (19) | RASEDIYNGLA (23) | NANTLHI (29) | QQYSDYPWT (39) |
| 14 | NYEMN (1) | SISSTSSYIYYADTVKG (4) | RGLAVGPFDY (17) | LASEDIYNNLA (22) | YASSLQD (25) | LQDSEYPLT (38) |
| 15 | NYGMN (1) | SISSTRSYIYYAETVKG (8) | HTVDTP-FAH (20) | LASEDIYNNLA (22) | HASRLQD (30) | LQDSEYPWT (34) |
| 16 | NYGMN (1) | SISSTSSYIYYADTVKG (4) | XTIGIT-FDY (21) | LASEDIYNNLA (22) | YASSLQD (25) | LQDSEYPWT (34) |

B30. The anti-TLR9 agent of embodiment B29, wherein all CDR sequences are from the same set.

B31. The anti-TLR9 agent of any one of embodiments B1 to B30, wherein the agent is isolated.

B32. The anti-TLR9 agent of any one of embodiments B1 to B31, wherein the agent is non-naturally occurring.

B33. The anti-TLR9 agent of any one of embodiments B1 to B32, wherein the agent is an antibody, or antigen-binding fragment thereof.

B34. The anti-TLR9 agent of any one of embodiments B1 to B32, wherein the agent is an antibody, or derivative thereof.

B35. The anti-TLR9 agent of any one of embodiments B1 to B34, wherein the agent is a humanized antibody, or an antigen binding fragment thereof.

B36. The anti-TLR9 agent of any one of embodiments B1 to B34, wherein the agent is a derivative of a humanized antibody that binds TLR9.

B37. The anti-TLR9 agent of any one of embodiments B1 to B36, wherein the agent is comprises a detectable marker or label.

B38. The anti-TLR9 agent of any one of embodiments B1 to B37, wherein the agent is conjugated to a detectable marker or label.

B39. The anti-TLR9 agent of any one of embodiments B1 to B38, wherein the agent is non-diffusively immobilized on a solid support.

B40. A diagnostic reagent comprising the anti-TLR9 agent of any one of embodiments B1 to B39.

B41. A kit comprising the anti-TLR9 agent of any one of embodiments B1 to B39 or the diagnostic reagent of embodiment B40.

B42. A diagnostic kit configured to detect Toll-like Receptor 9 (TLR9) in a biological sample, wherein the kit comprises the anti-TLR9 agent of any one of embodiments B1 to B39 or the diagnostic reagent of embodiment B40.

B43. An isolated nucleic acid molecule comprising a nucleotide sequence that encodes an immunoglobulin heavy chain variable domain of the anti-TLR9 agent of any one of embodiments B1 to B39.

B44. An isolated nucleic acid molecule comprising a nucleotide sequence that encodes an immunoglobulin light chain variable domain of the anti-TLR9 agent of any one of embodiments B1 to B39.

B45. A recombinant expression vector comprising a first expression cassette and a second expression cassette, wherein the first expression cassette comprises a promoter and a nucleic acid molecule comprising a nucleotide sequence that encodes an immunoglobulin heavy chain variable domain of the anti-TLR9 agent of any one of embodiments B1 to B39, and the second expression cassette comprises a promoter and a nucleic acid molecule comprising a nucleotide sequence that encodes an immunoglobulin light chain variable domain of the anti-TLR9 agent of any one of embodiments B1 to B39.

B46. A recombinant host cell transfected with the recombinant expression vector of embodiment B45.

B47. A method of detecting TLR9, comprising contacting a sample known or suspected to contain TLR9 with the anti-TLR9 agent of any one of embodiments B1 to B39, and, if the sample contains TLR9, detecting TLR9:anti-TLR9 complexes.

C1. A first anti-TLR9 agent that binds Toll-like Receptor 9 (TLR9) under laboratory or physiological conditions, wherein the first agent competitively binds, or is capable of competitively binding, with a second anti-TLR9 agent, which second agent comprises at least one immunoglobulin heavy chain variable domain and at least one immunoglobulin light chain variable domain, wherein:

a) each immunoglobulin heavy chain variable domain of the second agent comprises first, second, and third heavy chain complementarity determining regions (CDRs), wherein the first heavy chain CDR (CDRH1) comprises an amino acid sequence that is at least 80 percent identical to the amino acid sequence $NX_1X_2MX_3$ (SEQ ID NO: 76), wherein $X_1$ is Y or F, $X_2$ is G or E, and $X_3$ is N, H or T;

the second heavy chain CDR (CDRH2) comprises an amino acid sequence that is at least 80 percent identical to the amino acid sequence $SISSX_1X_2SYIX_3YX_4X_5X_6VKG$ (SEQ ID NO: 77), wherein $X_1$ is S or T, $X_2$ is S or R, $X_3$ is Y or S, $X_4$ is A or V, $X_5$ is D or E, and
$X_6$ is T or S; and
the third heavy chain CDR (CDRH3) comprises an amino acid sequence that is at least 80 percent identical to the amino acid sequence $X_1X_2X_3X_4X_5X_6X_7X_8X_9X_{10}$ (SEQ ID NO: 78), wherein
$X_1$ is Y, A, Q, F, S, H or R,
$X_2$ is T, D, P, W, G or S,
$X_3$ is L, I, M, V or T,
$X_4$ is G, T, A, D or Y,
$X_5$ is I, T, G or V,
$X_6$ is T, A, P, Y, G or D,
$X_7$ is no amino acid, A, G or P,
$X_8$ is I, P, F or L,
$X_9$ is D, H, E or A, and
$X_{10}$ is Y or H; and
b) each immunoglobulin light chain variable domain of the second agent comprises first, second, and third light chain CDRs, wherein
the first light chain CDR (CDRL1) comprises an amino acid sequence that is at least 80 percent identical to the amino acid sequence $X_1$ASEDIYN$X_2$LA (SEQ ID NO: 79), wherein
$X_1$ is L or R; and
$X_2$ is N or G;
the second light chain CDR (CDRL2) comprises an amino acid sequence that is at least 80 percent identical to the amino acid sequence $X_1X_2X_3X_4LX_5X_6$ (SEQ ID NO: 80), wherein
$X_1$ is Y, N or H;
$X_2$ is A or T;
$X_3$ is S or N;
$X_4$ is T, S, N or R;
$X_5$ is Q or H; and
$X_6$ is D, Y, T or I; and
the third light chain CDR (CDRL3) comprises an amino acid sequence that is at least 80 percent identical to the amino acid sequence $X_1QX_2X_3X_4X_5X_6X_7T$ (SEQ ID NO: 81), wherein
$X_1$ is L or Q,
$X_2$ is D, Y or E,
$X_3$ is S or Y,
$X_4$ is E or D,
$X_5$ is Y or F,
$X_6$ is P or L, and
$X_7$ is F, Y, N, W, L or P.

C2. A first anti-TLR9 agent that binds Toll-like Receptor 9 (TLR9) under laboratory or physiological conditions, wherein the first agent binds to, or is capable of binding to, the same epitope as a second anti-TLR9 agent, which second agent comprises at least one immunoglobulin heavy chain variable domain and at least one immunoglobulin light chain variable domain, wherein:
a) each immunoglobulin heavy chain variable domain of the second agent comprises first, second, and third heavy chain complementarity determining regions (CDRs), wherein
the first heavy chain CDR (CDRH1) comprises an amino acid sequence that is at least 80 percent identical to the amino acid sequence NX$_1$X$_2$MX$_3$ (SEQ ID NO: 76), wherein
$X_1$ is Y or F,
$X_2$ is G or E, and
$X_3$ is N, H or T;
the second heavy chain CDR (CDRH2) comprises an amino acid sequence that is at least 80 percent identical to the amino acid sequence SISSX$_1$X$_2$SYIX$_3$YX$_4$X$_5$X$_6$VKG (SEQ ID NO: 77), wherein
$X_1$ is S or T,
$X_2$ is S or R,
$X_3$ is Y or S,
$X_4$ is A or V,
$X_5$ is D or E, and
$X_6$ is T or S; and
the third heavy chain CDR (CDRH3) comprises an amino acid sequence that is at least 80 percent identical to the amino acid sequence $X_1X_2X_3X_4X_5X_6X_7X_8X_9X_{10}$ (SEQ ID NO: 78), wherein
$X_1$ is Y, A, Q, F, S, H or R,
$X_2$ is T, D, P, W, G or S,
$X_3$ is L, I, M, V or T,
$X_4$ is G, T, A, D or Y,
$X_5$ is I, T, G or V,
$X_6$ is T, A, P, Y, G or D,
$X_7$ is no amino acid, A, G or P,
$X_8$ is I, P, F or L,
$X_9$ is D, H, E or A, and
$X_{10}$ is Y or H; and
b) each immunoglobulin light chain variable domain of the second agent comprises first, second, and third light chain CDRs, wherein
the first light chain CDR (CDRL1) comprises an amino acid sequence that is at least 80 percent identical to the amino acid sequence $X_1$ASEDIYN$X_2$LA (SEQ ID NO: 79), wherein
$X_1$ is L or R; and
$X_2$ is N or G;
the second light chain CDR (CDRL2) comprises an amino acid sequence that is at least 80 percent identical to the amino acid sequence $X_1X_2X_3X_4LX_5X_6$ (SEQ ID NO: 80), wherein
$X_1$ is Y, N or H;
$X_2$ is A or T;
$X_3$ is S or N;
$X_4$ is T, S, N or R;
$X_5$ is Q or H; and
$X_6$ is D, Y, T or I; and
the third light chain CDR (CDRL3) comprises an amino acid sequence that is at least 80 percent identical to the amino acid sequence $X_1QX_2X_3X_4X_5X_6X_7T$ (SEQ ID NO: 81), wherein
$X_1$ is L or Q,
$X_2$ is D, Y or E,
$X_3$ is S or Y,
$X_4$ is E or D,
$X_5$ is Y or F,
$X_6$ is P or L, and
$X_7$ is F, Y, N, W, L or P.

C3. The first anti-TLR9 agent of embodiment C1 or C2, wherein the CDRH1 of the second anti-TLR9 agent comprises an amino acid sequence that is at least 90 percent identical to the amino acid sequence of SEQ ID NO: 76.

C4. The first anti-TLR9 agent of embodiment C1 or C2, wherein the CDRH1 of the second anti-TLR9 agent comprises an amino acid sequence that is at least 95 percent identical to the amino acid sequence of SEQ ID NO: 76.

C5. The first anti-TLR9 agent of embodiment C1 or C2, wherein the CDRH1 of the second anti-TLR9 agent comprises an amino acid sequence that is 100 percent identical to the amino acid sequence of SEQ ID NO: 76.

C6. The first anti-TLR9 agent of any one of embodiments C1 to C5, wherein the CDRH2 of the second anti-TLR9 agent comprises an amino acid sequence that is at least 90 percent identical to the amino acid sequence of SEQ ID NO: 77.

C7. The first anti-TLR9 agent of any one of embodiments C1 to C5, wherein the CDRH2 of the second anti-TLR9 agent comprises an amino acid sequence that is at least 95 percent identical to the amino acid sequence of SEQ ID NO: 77.

C8. The first anti-TLR9 agent of any one of embodiments C1 to C5, wherein the CDRH2 of the second anti-TLR9 agent comprises an amino acid sequence that is 100 percent identical to the amino acid sequence of SEQ ID NO: 77.

C9. The first anti-TLR9 agent of any one of embodiments C1 to C8, wherein the CDRH3 of the second anti-TLR9 agent comprises an amino acid sequence that is at least 90 percent identical to the amino acid sequence of SEQ ID NO: 78.

C10. The first anti-TLR9 agent of any one of embodiments C1 to C8, wherein the CDRH3 of the second anti-TLR9 agent comprises an amino acid sequence that is at least 95 percent identical to the amino acid sequence of SEQ ID NO: 78.

C11. The first anti-TLR9 agent of any one of embodiments C1 to C8, wherein the CDRH3 of the second anti-TLR9 agent comprises an amino acid sequence that is 100 percent identical to the amino acid sequence of SEQ ID NO: 78.

C12. The first anti-TLR9 agent of any one of embodiments C1 to C11, wherein the CDRL1 of the second anti-TLR9 agent comprises an amino acid sequence that is at least 90 percent identical to the amino acid sequence of SEQ ID NO: 79.

C13. The first anti-TLR9 agent of any one of embodiments C1 to C11, wherein the CDRL1 of the second anti-TLR9 agent comprises an amino acid sequence that is at least 95 percent identical to the amino acid sequence of SEQ ID NO: 79.

C14. The first anti-TLR9 agent of any one of embodiments C1 to C11, wherein the CDRL1 of the second anti-TLR9 agent comprises an amino acid sequence that is 100 percent identical to the amino acid sequence of SEQ ID NO: 79.

C15. The first anti-TLR9 agent of any one of embodiments C1 to C14, wherein the CDRL2 of the second anti-TLR9 agent comprises an amino acid sequence that is at least 90 percent identical to the amino acid sequence of SEQ ID NO: 80.

C16. The first anti-TLR9 agent of any one of embodiments C1 to C14, wherein the CDRL2 of the second anti-TLR9 agent comprises an amino acid sequence that is at least 95 percent identical to the amino acid sequence of SEQ ID NO: 80.

C17. The first anti-TLR9 agent of any one of embodiments C1 to C14, wherein the CDRL2 of the second anti-TLR9 agent comprises an amino acid sequence that is 100 percent identical to the amino acid sequence of SEQ ID NO: 80.

C18. The first anti-TLR9 agent of any one of embodiments C1 to C17, wherein the CDRL3 of the second anti-TLR9 agent comprises an amino acid sequence that is at least 90 percent identical to the amino acid sequence of SEQ ID NO: 81.

C19. The first anti-TLR9 agent of any one of embodiments C1 to C17, wherein the CDRL3 of the second anti-TLR9 agent comprises an amino acid sequence that is at least 95 percent identical to the amino acid sequence of SEQ ID NO: 81.

C20. The first anti-TLR9 agent of any one of embodiments C1 to C17, wherein the CDRL3 of the second anti-TLR9 agent comprises an amino acid sequence that is 100 percent identical to the amino acid sequence of SEQ ID NO: 81.

C21. The first anti-TLR9 agent of any one of embodiments C1 to C20, wherein the CDRH1 of the second anti-TLR9 agent comprises an amino acid sequence chosen from NYGMN (SEQ ID NO: 1), NFGMN (SEQ ID NO: 2), NFGMH (SEQ ID NO: 73), NYEMN (SEQ ID NO: 74), and NYGMT (SEQ ID NO: 75).

C22. The first anti-TLR9 agent of any one of embodiments C1 to C21, wherein the CDRH2 of the second anti-TLR9 agent comprises an amino acid sequence chosen from SISSSSSYIYYADTVKG (SEQ ID NO: 3), SISSTSSYIYYADTVKG (SEQ ID NO: 4), SISSTSSYISYADTVKG (SEQ ID NO: 5), SISSTSSYIYYVDTVKG (SEQ ID NO: 6), SISSTSSYIYYADSVKG (SEQ ID NO: 7), and SISSTRSYIYYAETVKG (SEQ ID NO: 8).

C23. The first anti-TLR9 agent of any one of embodiments C1 to C22, wherein the CDRH3 of the second anti-TLR9 agent comprises an amino acid sequence chosen from YTLGIT-IDY (SEQ ID NO: 9), ADITIAAPHY (SEQ ID NO: 10), QDITTP-FDY (SEQ ID NO: 11), FTLGIT-LDY (SEQ ID NO: 12), SPMGITGFEY (SEQ ID NO: 13), HWVGGY-FDY (SEQ ID NO: 14), HTIGIT-FDY (SEQ ID NO: 15), YTLGIT-LDY (SEQ ID NO: 16), RGLAVGPFDY (SEQ ID NO: 17), QSITVP-FDY (SEQ ID NO: 18), QSTYGD-FDY (SEQ ID NO: 19), HTVDTP-FAH (SEQ ID NO: 20), and xTIGIT-FDY (SEQ ID NO: 21).

C24. The first anti-TLR9 agent of any one of embodiments C1 to C23, wherein the CDRL1 of the second anti-TLR9 agent comprises an amino acid sequence chosen from LASEDIYNNLA (SEQ ID NO: 22) and RASEDIYNGLA (SEQ ID NO: 23).

C25. The first anti-TLR9 agent of any one of embodiments C1 to C24, wherein the CDRL2 of the second anti-TLR9 agent comprises an amino acid sequence chosen from YASTLQD (SEQ ID NO: 24), YASSLQD (SEQ ID NO: 25), YASTLQY (SEQ ID NO: 26), NANSLHT (SEQ ID NO: 27), YTSNLQD (SEQ ID NO: 28), NANTLHI (SEQ ID NO: 29), and HASRLQD (SEQ ID NO: 30).

C26. The first anti-TLR9 agent of any one of embodiments C1 to C25, wherein the CDRL3 of the second anti-TLR9 agent comprises an amino acid sequence chosen from LQDSEYPFT (SEQ ID NO: 31), LQDSEFPYT (SEQ ID NO: 32), LQDSEFPNT (SEQ ID NO: 33), LQDSEYPWT (SEQ ID NO: 34), LQDSEYPYT (SEQ ID NO: 35), QQYYDYLPT (SEQ ID NO: 36), LQESEYPWT (SEQ ID NO: 37), LQDSEYPLT (SEQ ID NO: 38) and QQYSDYPWT (SEQ ID NO: 39).

C27. The first anti-TLR9 agent of any one of embodiments C1 to C26, wherein the second anti-TLR9 agent comprises two immunoglobulin heavy chain variable domains and two immunoglobulin light chain variable domains.

C28. The first anti-TLR9 agent of embodiment C27, wherein the two immunoglobulin heavy chain variable domains each comprise a set of CDRH1, CDRH2 and CDRH3 amino acid sequences.

C29. The first anti-TLR9 agent of embodiment C27 or C28, wherein the two immunoglobulin light chain variable domains each comprise a set of CDRL1, CDRL2 and CDRL3 amino acid sequences.

C30. The first anti-TLR9 agent of any one of embodiments C1 to C29, wherein each immunoglobulin heavy chain variable domain of the second anti-TLR9 agent comprises a set of CDRH1, CDRH2 and CDRH3 amino acid sequences and each immunoglobulin light chain variable domain of the second anti-TLR9 agent comprises a set of CDRL1, CDRL2 and CDRL3 amino acid sequences chosen from sets 1-16:

C37. The first anti-TLR9 agent of any one of embodiments C1 to C35, wherein the first agent and/or second agent is a derivative of a humanized antibody that binds TLR9.

C38. The first anti-TLR9 agent of any one of embodiments C1 to C37, comprising a detectable marker or label.

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 1 | NYGMN (1) | SISSSSSYIYYADTVKG (3) | YTLGIT-IDY (9) | LASEDIYNNLA (22) | YASTLQD (24) | LQDSEYPFT (31) |
| 2 | NFGMN (2) | SISSTSSYIYYADTVKG (4) | ADITIAAPHY (10) | LASEDIYNNLA (22) | YASSLQD (25) | LQDSEFPYT (32) |
| 3 | NFGMN (2) | SISSTSSYIYYADTVKG (4) | ADITIAAPHY (10) | LASEDIYNNLA (22) | YASSLQD (25) | LQDSEFPYT (32) |
| 4 | NFGMH (2) | SISSTSSYISYADTVKG (5) | QDITTP-FDY (11) | LASEDIYNNLA (22) | YASTLQY (26) | LQDSEFPNT (33) |
| 5 | NFGMN (2) | SISSTSSYIYYADTVKG (4) | ADITIAAPHY (10) | LASEDIYNNLA (22) | YASSLQD (25) | LQDSEFPYT (32) |
| 6 | NYGMN (1) | SISSTSSYIYYADTVKG (4) | FTLGIT-LDY (12) | LASEDIYNNLA (22) | YASSLQD (25) | LQDSEYPWT (34) |
| 7 | NYGMN (1) | SISSSSSYIYYADTVKG (3) | SPMGITGFEY (13) | LASEDIYNNLA (22) | YASSLQD (25) | LQDSEYPYT (35) |
| 8 | NYGMN (1) | SISSSSSYIYYADTVKG (3) | HWVGGY-FDY (14) | RASEDIYNGLA (23) | NANSLHT (27) | QQYYDYLPT (36) |
| 9 | NFGMN (2) | SISSTSSYIYYADTVKG (4) | HTIGIT-FDY (15) | LASEDIYNNLA (22) | YASSLQD (25) | LQDSEYPWT (34) |
| 10 | NYGMN (1) | SISSSSSYIYYADTVKG (3) | YTLGIT-LDY (16) | LASEDIYNNLA (22) | YASSLQD (25) | LQESEYPWT (37) |
| 11 | NYEMN (1) | SISSTSSYIYYADTVKG (4) | RGLAVGPFDY (17) | LASEDIYNNLA (22) | YASSLQD (25) | LQDSEYPLT (38) |
| 12 | NYGMT (1) | SISSTSSYIYYVDTVKG (6) | QSITVP-FDY (18) | LASEDIYNNLA (22) | YTSNLQD (28) | LQDSEYPFT (31) |
| 13 | NYGMN (1) | SISSTSSYIYYADSVKG (7) | QSTYGD-FDY (19) | RASEDIYNGLA (23) | NANTLHI (29) | QQYSDYPWT (39) |
| 14 | NYEMN (1) | SISSTSSYIYYADTVKG (4) | RGLAVGPFDY (17) | LASEDIYNNLA (22) | YASSLQD (25) | LQDSEYPLT (38) |
| 15 | NYGMN (1) | SISSTRSYIYYAETVKG (8) | HTVDTP-FAH (20) | LASEDIYNNLA (22) | HASRLQD (30) | LQDSEYPWT (34) |
| 16 | NYGMN (1) | SISSTSSYIYYADTVKG (4) | xTIGIT-FDY (21) | LASEDIYNNLA (22) | YASSLQD (25) | LQDSEYPWT (34) |

C31. The first anti-TLR9 agent of embodiment C30, wherein all CDR sequences are from the same set.

C32. The first anti-TLR9 agent of any one of embodiments C1 to C31, wherein the first agent and/or second agent is isolated.

C33. The first anti-TLR9 agent of any one of embodiments C1 to C32, wherein the first agent and/or second agent is non-naturally occurring.

C34. The first anti-TLR9 agent of any one of embodiments C1 to C33, wherein the first agent and/or second agent is an antibody, or antigen-binding fragment thereof.

C35. The first anti-TLR9 agent of any one of embodiments C1 to C33, wherein the first agent and/or second agent is an antibody, or derivative thereof.

C36. The first anti-TLR9 agent of any one of embodiments C1 to C35, wherein the first agent and/or second agent is a humanized antibody, or an antigen binding fragment thereof.

C39. The first anti-TLR9 agent of any one of embodiments C1 to C38, wherein the first agent is conjugated to a detectable marker or label.

C40. The first anti-TLR9 agent of any one of embodiments C1 to C39, wherein the first agent is non-diffusively immobilized on a solid support.

C41. A diagnostic reagent comprising the first anti-TLR9 agent of any one of embodiments C1 to C40.

C42. A kit comprising the first anti-TLR9 agent of any one of embodiments C1 to C40 or the diagnostic reagent of embodiment C41.

C43. A diagnostic kit configured to detect Toll-like Receptor 9 (TLR9) in a biological sample, wherein the kit comprises the first anti-TLR9 agent of any one of embodiments C1 to C40 or the diagnostic reagent of embodiment C41.

C44. An isolated nucleic acid molecule comprising a nucleotide sequence that encodes an immunoglobulin heavy chain variable domain of the first anti-TLR9 agent of any one of embodiments C1 to C40.

C45. An isolated nucleic acid molecule comprising a nucleotide sequence that encodes an immunoglobulin light chain variable domain of the first anti-TLR9 agent of any one of embodiments C1 to C40.

C46. A recombinant expression vector comprising a first expression cassette and a second expression cassette, wherein the first expression cassette comprises a promoter and a nucleic acid molecule comprising a nucleotide sequence that encodes an immunoglobulin heavy chain variable domain of the first anti-TLR9 agent of any one of embodiments C1 to C40, and the second expression cassette comprises a promoter and a nucleic acid molecule comprising a nucleotide sequence that encodes an immunoglobulin light chain variable domain of the first anti-TLR9 agent of any one of embodiments C1 to C40.

C47. A recombinant host cell transfected with the recombinant expression vector of embodiment C46.

C48. A method of detecting TLR9, comprising contacting a sample known or suspected to contain TLR9 with the first anti-TLR9 agent of any one of embodiments C1 to C40, and, if the sample contains TLR9, detecting TLR9:anti-TLR9 complexes.

D1. An anti-TLR9 agent for detecting TLR9 in a heterogeneous population of immune cells, wherein TLR9 is detected at a significant level in plasmacytoid dendritic cells and/or B cells in the population, and TLR9 is not significantly detected in other immune cells in the population.

D2. The anti-TLR9 agent of embodiment D1, wherein the anti-TLR9 agent comprises at least one immunoglobulin heavy chain variable domain and at least one immunoglobulin light chain variable domain, wherein:
  i) each immunoglobulin heavy chain variable domain of the anti-TLR9 agent comprises first, second, and third heavy chain complementarity determining regions (CDRs); and
  ii) each immunoglobulin light chain variable domain of the anti-TLR9 agent comprises first, second, and third light chain CDRs.

D3. The anti-TLR9 agent of embodiment D2, wherein the first heavy chain CDR (CDRH1) comprises an amino acid sequence that is at least 80 percent identical to the amino acid sequence $NX_1X_2MX_3$ (SEQ ID NO: 76), wherein
  $X_1$ is Y or F,
  $X_2$ is G or E, and
  $X_3$ is N, H or T.

D4. The anti-TLR9 agent of embodiment D2 or D3, wherein the second heavy chain CDR (CDRH2) comprises an amino acid sequence that is at least 80 percent identical to the amino acid sequence $SISSX_1X_2SYIX_3YX_4X_5X_6VKG$ (SEQ ID NO: 77), wherein
  $X_1$ is S or T,
  $X_2$ is S or R,
  $X_3$ is Y or S,
  $X_4$ is A or V,
  $X_5$ is D or E, and
  $X_6$ is T or S.

D5. The anti-TLR9 agent of embodiment D2, D3 or D4, wherein the third heavy chain CDR (CDRH3) comprises an amino acid sequence that is at least 80 percent identical to the amino acid sequence $X_1X_2X_3X_4X_5X_6X_7X_8X_9X_{10}$ (SEQ ID NO: 78), wherein
  $X_1$ is Y, A, Q, F, S, H or R,
  $X_2$ is T, D, P, W, G or S,
  $X_3$ is L, I, M, V or T,
  $X_4$ is G, T, A, D or Y,
  $X_5$ is I, T, G or V,
  $X_6$ is T, A, P, Y, G or D,
  $X_7$ is no amino acid, A, G or P,
  $X_8$ is I, P, F or L,
  $X_9$ is D, H, E or A, and
  $X_{10}$ is Y or H.

D6. The anti-TLR9 agent of any one of embodiments D2 to D5, wherein the first light chain CDR (CDRL1) comprises an amino acid sequence that is at least 80 percent identical to the amino acid sequence $X_1ASEDIYNX_2LA$ (SEQ ID NO: 79), wherein
  $X_1$ is L or R; and
  $X_2$ is N or G.

D7. The anti-TLR9 agent of any one of embodiments D2 to D6, wherein the second light chain CDR (CDRL2) comprises an amino acid sequence that is at least 80 percent identical to the amino acid sequence $X_1X_2X_3X_4LX_5X_6$ (SEQ ID NO: 80), wherein
  $X_1$ is Y, N or H,
  $X_2$ is A or T,
  $X_3$ is S or N,
  $X_4$ is T, S, N or R,
  $X_5$ is Q or H, and
  $X_6$ is D, Y, T or I.

D8. The anti-TLR9 agent of any one of embodiments D2 to D7, wherein the third light chain CDR (CDRL3) comprises an amino acid sequence that is at least 80 percent identical to the amino acid sequence $X_1QX_2X_3X_4X_5X_6X_7T$ (SEQ ID NO: 81), wherein
  $X_1$ is L or Q,
  $X_2$ is D, Y or E,
  $X_3$ is S or Y,
  $X_4$ is E or D,
  $X_5$ is Y or F,
  $X_6$ is P or L, and
  $X_7$ is F, Y, N, W, L or P.

D9. The anti-TLR9 agent of any one of embodiments D2 to D8, wherein the CDRH1 comprises an amino acid sequence that is at least 90 percent identical to the amino acid sequence of SEQ ID NO: 76.

D10. The anti-TLR9 agent of any one of embodiments D2 to D8, wherein the CDRH1 comprises an amino acid sequence that is at least 95 percent identical to the amino acid sequence of SEQ ID NO: 76.

D11. The anti-TLR9 agent of any one of embodiments D2 to D8, wherein the CDRH1 comprises an amino acid sequence that is 100 percent identical to the amino acid sequence of SEQ ID NO: 76.

D12. The anti-TLR9 agent of any one of embodiments D2 to D11, wherein the CDRH2 comprises an amino acid sequence that is at least 90 percent identical to the amino acid sequence of SEQ ID NO: 77.

D13. The anti-TLR9 agent of any one of embodiments D2 to D11, wherein the CDRH2 comprises an amino acid sequence that is at least 95 percent identical to the amino acid sequence of SEQ ID NO: 77.

D14. The anti-TLR9 agent of any one of embodiments D2 to D11, wherein the CDRH2 comprises an amino acid sequence that is 100 percent identical to the amino acid sequence of SEQ ID NO: 77.

D15. The anti-TLR9 agent of any one of embodiments D2 to D14, wherein the CDRH3 comprises an amino acid sequence that is at least 90 percent identical to the amino acid sequence of SEQ ID NO: 78.

D16. The anti-TLR9 agent of any one of embodiments D2 to D14, wherein the CDRH3 comprises an amino acid sequence that is at least 95 percent identical to the amino acid sequence of SEQ ID NO: 78.

D17. The anti-TLR9 agent of any one of embodiments D2 to D14, wherein the CDRH3 comprises an amino acid sequence that is 100 percent identical to the amino acid sequence of SEQ ID NO: 78.

D18. The anti-TLR9 agent of any one of embodiments D2 to D17, wherein the CDRL1 comprises an amino acid sequence that is at least 90 percent identical to the amino acid sequence of SEQ ID NO: 79.

D19. The anti-TLR9 agent of any one of embodiments D2 to D17, wherein the CDRL1 comprises an amino acid sequence that is at least 95 percent identical to the amino acid sequence of SEQ ID NO: 79.

D20. The anti-TLR9 agent of any one of embodiments D2 to D17, wherein the CDRL1 comprises an amino acid sequence that is 100 percent identical to the amino acid sequence of SEQ ID NO: 79.

D21. The anti-TLR9 agent of any one of embodiments D2 to D20, wherein the CDRL2 comprises an amino acid sequence that is at least 90 percent identical to the amino acid sequence of SEQ ID NO: 80.

D22. The anti-TLR9 agent of any one of embodiments D2 to D20, wherein the CDRL2 comprises an amino acid sequence that is at least 95 percent identical to the amino acid sequence of SEQ ID NO: 80.

D23. The anti-TLR9 agent of any one of embodiments D2 to D20, wherein the CDRL2 comprises an amino acid sequence that is 100 percent identical to the amino acid sequence of SEQ ID NO: 80.

D24. The anti-TLR9 agent of any one of embodiments D2 to D23, wherein the CDRL3 comprises an amino acid sequence that is at least 90 percent identical to the amino acid sequence of SEQ ID NO: 81.

D25. The anti-TLR9 agent of any one of embodiments D2 to D23, wherein the CDRL3 comprises an amino acid sequence that is at least 95 percent identical to the amino acid sequence of SEQ ID NO: 81.

D26. The anti-TLR9 agent of any one of embodiments D2 to D23, wherein the CDRL3 comprises an amino acid sequence that is 100 percent identical to the amino acid sequence of SEQ ID NO: 81.

D27. The anti-TLR9 agent of any one of embodiments D2 to D26, wherein the CDRH1 comprises an amino acid sequence chosen from NYGMN (SEQ ID NO: 1), NFGMN (SEQ ID NO: 2), NFGMH (SEQ ID NO: 73), NYEMN (SEQ ID NO: 74), and NYGMT (SEQ ID NO: 75).

D28. The anti-TLR9 agent of any one of embodiments D2 to D27, wherein the CDRH2 comprises an amino acid sequence chosen from SISSSSSYIYYADTVKG (SEQ ID NO: 3), SISSTSSYIYYADTVKG (SEQ ID NO: 4), SISSTSSYISYADTVKG (SEQ ID NO: 5), SISSTSSYIYYVDTVKG (SEQ ID NO: 6), SISSTSSYIYYADSVKG (SEQ ID NO: 7), and SISSTRSYIYYAETVKG (SEQ ID NO: 8).

D29. The anti-TLR9 agent of any one of embodiments D2 to D28, wherein the CDRH3 comprises an amino acid sequence chosen from YTLGIT-IDY (SEQ ID NO: 9), ADITIAAPHY (SEQ ID NO: 10), QDITTP-FDY (SEQ ID NO: 11), FTLGIT-LDY (SEQ ID NO: 12), SPMGITGFEY (SEQ ID NO: 13), HWVGGY-FDY (SEQ ID NO: 14), HTIGIT-FDY (SEQ ID NO: 15), YTLGIT-LDY (SEQ ID NO: 16), RGLAVGPFDY (SEQ ID NO: 17), QSITVP-FDY (SEQ ID NO: 18), QSTYGD-FDY (SEQ ID NO: 19), HTVDTP-FAH (SEQ ID NO: 20), and xTIGIT-FDY (SEQ ID NO: 21).

D30. The anti-TLR9 agent of any one of embodiments D2 to D29, wherein the CDRL1 comprises an amino acid sequence chosen from LASEDIYNNLA (SEQ ID NO: 22) and RASEDIYNGLA (SEQ ID NO: 23).

D31. The anti-TLR9 agent of any one of embodiments D2 to D30, wherein the CDRL2 comprises an amino acid sequence chosen from YASTLQD (SEQ ID NO: 24), YASSLQD (SEQ ID NO: 25), YASTLQY (SEQ ID NO: 26), NANSLHT (SEQ ID NO: 27), YTSNLQD (SEQ ID NO: 28), NANTLHI (SEQ ID NO: 29), and HASRLQD (SEQ ID NO: 30).

D32. The anti-TLR9 agent of any one of embodiments D2 to D31, wherein the CDRL3 comprises an amino acid sequence chosen from LQDSEYPFT (SEQ ID NO: 31), LQDSEFPYT (SEQ ID NO: 32), LQDSEFPNT (SEQ ID NO: 33), LQDSEYPWT (SEQ ID NO: 34), LQDSEYPYT (SEQ ID NO: 35), QQYYDYLPT (SEQ ID NO: 36), LQESEYPWT (SEQ ID NO: 37), LQDSEYPLT (SEQ ID NO: 38) and QQYSDYPWT (SEQ ID NO: 39).

D33. The anti-TLR9 agent of any one of embodiments D1 to D32, which comprises two immunoglobulin heavy chain variable domains and two immunoglobulin light chain variable domains.

D34. The anti-TLR9 agent of embodiment D33, wherein the two immunoglobulin heavy chain variable domains each comprise a set of CDRH1, CDRH2 and CDRH3 amino acid sequences.

D35. The anti-TLR9 agent of embodiment D33 or D34, wherein the two immunoglobulin light chain variable domains each comprise a set of CDRL1, CDRL2 and CDRL3 amino acid sequences.

D36. The anti-TLR9 agent of any one of embodiments D2 to D35, wherein each immunoglobulin heavy chain variable domain comprises a set of CDRH1, CDRH2 and CDRH3 amino acid sequences and each immunoglobulin light chain variable domain comprises a set of CDRL1, CDRL2 and CDRL3 amino acid sequences chosen from sets 1-16:

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 1 | NYGMN (1) | SISSSSSYIYYADTVKG (3) | YTLGIT-IDY (9) | LASEDIYNNLA (22) | YASTLQD (24) | LQDSEYPFT (31) |
| 2 | NFGMN (2) | SISSTSSYIYYADTVKG (4) | ADITIAAPHY (10) | LASEDIYNNLA (22) | YASSLQD (25) | LQDSEFPYT (32) |
| 3 | NFGMN (2) | SISSTSSYIYYADTVKG (4) | ADITIAAPHY (10) | LASEDIYNNLA (22) | YASSLQD (25) | LQDSEFPYT (32) |

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 4 | NFGMH (2) | SISSTSSYISYADTVKG (5) | QDITTP-FDY (11) | LASEDIYNNLA (22) | YASTLQY (26) | LQDSEFPNT (33) |
| 5 | NFGMN (2) | SISSTSSYIYYADTVKG (4) | ADITIAAPHY (10) | LASEDIYNNLA (22) | YASSLQD (25) | LQDSEFPYT (32) |
| 6 | NYGMN (1) | SISSTSSYIYYADTVKG (4) | FTLGIT-LDY (12) | LASEDIYNNLA (22) | YASSLQD (25) | LQDSEYPWT (34) |
| 7 | NYGMN (1) | SISSSSSYIYYADTVKG (3) | SPMGITGFEY (13) | LASEDIYNNLA (22) | YASSLQD (25) | LQDSEYPYT (35) |
| 8 | NYGMN (1) | SISSSSSYIYYADTVKG (3) | HWVGGY-FDY (14) | RASEDIYNGLA (23) | NANSLHT (27) | QQYYDYLPT (36) |
| 9 | NFGMN (2) | SISSTSSYIYYADTVKG (4) | HTIGIT-FDY (15) | LASEDIYNNLA (22) | YASSLQD (25) | LQDSEYPWT (34) |
| 10 | NYGMN (1) | SISSSSSYIYYADTVKG (3) | YTLGIT-LDY (16) | LASEDIYNNLA (22) | YASSLQD (25) | LQESEYPWT (37) |
| 11 | NYEMN (1) | SISSTSSYIYYADTVKG (4) | RGLAVGPFDY (17) | LASEDIYNNLA (22) | YASSLQD (25) | LQDSEYPLT (38) |
| 12 | NYGMT (1) | SISSTSSYIYYVDTVKG (6) | QSITVP-FDY (18) | LASEDIYNNLA (22) | YTSNLQD (28) | LQDSEYPFT (31) |
| 13 | NYGMN (1) | SISSTSSYIYYADSVKG (7) | QSTYGD-FDY (19) | RASEDIYNGLA (23) | NANTLHI (29) | QQYSDYPWT (39) |
| 14 | NYEMN (1) | SISSTSSYIYYADTVKG (4) | RGLAVGPFDY (17) | LASEDIYNNLA (22) | YASSLQD (25) | LQDSEYPLT (38) |
| 15 | NYGMN (1) | SISSTRSYIYYAETVKG (8) | HTVDTP-FAH (20) | LASEDIYNNLA (22) | HASRLQD (30) | LQDSEYPWT (34) |
| 16 | NYGMN (1) | SISSTSSYIYYADTVKG (4) | xTIGIT-FDY (21) | LASEDIYNNLA (22) | YASSLQD (25) | LQDSEYPWT (34) |

D37. The anti-TLR9 agent of embodiment D36, wherein all CDR sequences are from the same set.

D38. The anti-TLR9 agent of any one of embodiments D1 to D37, wherein TLR9 is detected at a significant level in plasmacytoid dendritic cells.

D39. The anti-TLR9 agent of embodiment D38, wherein TLR9 is detected in plasmacytoid dendritic cells using a flow cytometry assay.

D40. The anti-TLR9 agent of embodiment D39, wherein TLR9 is detected in plasmacytoid dendritic cells by surface staining.

D41. The anti-TLR9 agent of embodiment D40, wherein TLR9 is detected in plasmacytoid dendritic cells by surface staining with a signal to noise ratio of about 2 or greater.

D42. The anti-TLR9 agent of embodiment D40, wherein TLR9 is detected in plasmacytoid dendritic cells by surface staining with a signal to noise ratio of about 15 or greater.

D43. The anti-TLR9 agent of embodiment D39, wherein TLR9 is detected in plasmacytoid dendritic cells by intracellular staining.

D44. The anti-TLR9 agent of embodiment D43, wherein TLR9 is detected in plasmacytoid dendritic cells by intracellular staining with a signal to noise ratio of about 15 or greater.

D45. The anti-TLR9 agent of embodiment D43, wherein TLR9 is detected in plasmacytoid dendritic cells by intracellular staining with a signal to noise ratio of about 45 or greater.

D46. The anti-TLR9 agent of embodiment D43, wherein TLR9 is detected in plasmacytoid dendritic cells by intracellular staining with a signal to noise ratio of about 50 or greater.

D47. The anti-TLR9 agent of any one of embodiments D1 to D46, wherein TLR9 is detected at a significant level in B cells.

D48. The anti-TLR9 agent of embodiment D47, wherein TLR9 is detected in B cells using a flow cytometry assay.

D49. The anti-TLR9 agent of embodiment D48, wherein TLR9 is detected in B cells by surface staining.

D50. The anti-TLR9 agent of embodiment D49, wherein TLR9 is detected in B cells by surface staining with a signal to noise ratio of about 2 or greater.

D51. The anti-TLR9 agent of embodiment D49, wherein TLR9 is detected in B cells by surface staining with a signal to noise ratio of about 2.5 or greater.

D52. The anti-TLR9 agent of embodiment D48, wherein TLR9 is detected in B cells by intracellular staining.

D53. The anti-TLR9 agent of embodiment D52, wherein TLR9 is detected in B cells by intracellular staining with a signal to noise ratio of about 10 or greater.

D54. The anti-TLR9 agent of embodiment D52, wherein TLR9 is detected in B cells by intracellular staining with a signal to noise ratio of about 11 or greater.

D55. The anti-TLR9 agent of any one of embodiments D1 to D54, wherein TLR9 is not significantly detected in other immune cells in the population, wherein the other immune cells comprise one or more of CD3⁻CD19⁻ lymphocytes, CD3⁺CD19⁻ T cells, and monocytes.

D56. The anti-TLR9 agent of any one of embodiments D1 to D55, wherein the agent is isolated.

D57. The anti-TLR9 agent of any one of embodiments D1 to D56, wherein the agent is non-naturally occurring.

D58. The anti-TLR9 agent of any one of embodiments D1 to D57, wherein the agent is an antibody, or antigen-binding fragment thereof.

D59. The anti-TLR9 agent of any one of embodiments D1 to D57, wherein the agent is an antibody, or derivative thereof.

D60. The anti-TLR9 agent of any one of embodiments D1 to D59, wherein the agent is a humanized antibody, or an antigen binding fragment thereof.

D61. The anti-TLR9 agent of any one of embodiments D1 to D59, wherein the agent is a derivative of a humanized antibody that binds TLR9.

D62. The anti-TLR9 agent of any one of embodiments D1 to D61, wherein the agent is comprises a detectable marker or label.

D63. The anti-TLR9 agent of any one of embodiments D1 to D62, wherein the agent is conjugated to a detectable marker or label.

D64. The anti-TLR9 agent of any one of embodiments D1 to D63, wherein the agent is non-diffusively immobilized on a solid support.

D65. A diagnostic reagent comprising the anti-TLR9 agent of any one of embodiments D1 to D64.

D66. A kit comprising the anti-TLR9 agent of any one of embodiments D1 to D64 or the diagnostic reagent of embodiment D65.

D67. A diagnostic kit configured to detect Toll-like Receptor 9 (TLR9) in a biological sample, wherein the kit comprises the anti-TLR9 agent of any one of embodiments D1 to D64 or the diagnostic reagent of embodiment D65.

D68. An isolated nucleic acid molecule comprising a nucleotide sequence that encodes an immunoglobulin heavy chain variable domain of the anti-TLR9 agent of any one of embodiments D1 to D64.

D69. An isolated nucleic acid molecule comprising a nucleotide sequence that encodes an immunoglobulin light chain variable domain of the anti-TLR9 agent of any one of embodiments D1 to D64.

D70. A recombinant expression vector comprising a first expression cassette and a second expression cassette, wherein the first expression cassette comprises a promoter and a nucleic acid molecule comprising a nucleotide sequence that encodes an immunoglobulin heavy chain variable domain of the anti-TLR9 agent of any one of embodiments D1 to D64, and the second expression cassette comprises a promoter and a nucleic acid molecule comprising a nucleotide sequence that encodes an immunoglobulin light chain variable domain of the anti-TLR9 agent of any one of embodiments D1 to D64.

D71. A recombinant host cell transfected with the recombinant expression vector of embodiment D70.

D72. A method of detecting TLR9, comprising contacting a sample known or suspected to contain TLR9 with the anti-TLR9 agent of any one of embodiments D1 to D64, and, if the sample contains TLR9, detecting TLR9:anti-TLR9 complexes.

D73. A method of detecting TLR9 in a heterogeneous population of immune cells, comprising contacting the population with an anti-TLR9 agent of any one of embodiments D1 to D72, and, if the population contains cells expressing TLR9, detecting TLR9:anti-TLR9 complexes.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:
1. An anti-TLR9 agent that binds Toll-like Receptor 9 (TLR9) under laboratory or physiological conditions, wherein the agent comprises at least one immunoglobulin heavy chain variable domain and at least one immunoglobulin light chain variable domain, wherein:
  each immunoglobulin heavy chain variable domain comprises a set of CDRH1, CDRH2 and CDRH3 amino acid sequences and each immunoglobulin light chain variable domain comprises a set of CDRL1, CDRL2 and CDRL3 amino acid sequences selected from sets 1-16:

| set | CDRH1 (SEQ ID NO:) | CDRH2 (SEQ ID NO:) | CDRH3 (SEQ ID NO:) | CDRL1 (SEQ ID NO:) | CDRL2 (SEQ ID NO:) | CDRL3 (SEQ ID NO:) |
|---|---|---|---|---|---|---|
| 1 | NYGMN (1) | SISSSSSYIYYADTVKG (3) | YTLGIT-IDY (9) | LASEDIYNNLA (22) | YASTLQD (24) | LQDSEYPFT (31) |
| 2 | NFGMN (2) | SISSTSSYIYYADTVKG (4) | ADITIAAPHY (10) | LASEDIYNNLA (22) | YASSLQD (25) | LQDSEFPYT (32) |
| 3 | NFGMN (2) | SISSTSSYIYYADTVKG (4) | ADITIAAPHY (10) | LASEDIYNNLA (22) | YASSLQD (25) | LQDSEFPYT (32) |
| 4 | NFGMH (2) | SISSTSSYISYADTVKG (5) | QDITTP-FDY (11) | LASEDIYNNLA (22) | YASTLQY (26) | LQDSEFPNT (33) |
| 5 | NFGMN (2) | SISSTSSYIYYADTVKG (4) | ADITIAAPHY (10) | LASEDIYNNLA (22) | YASSLQD (25) | LQDSEFPYT (32) |
| 6 | NYGMN (1) | SISSTSSYIYYADTVKG (4) | FTLGIT-LDY (12) | LASEDIYNNLA (22) | YASSLQD (25) | LQDSEYPWT (34) |
| 7 | NYGMN (1) | SISSSSSYIYYADTVKG (3) | SPMGITGFEY (13) | LASEDIYNNLA (22) | YASSLQD (25) | LQDSEYPYT (35) |
| 8 | NYGMN (1) | SISSSSSYIYYADTVKG (3) | HWVGGY-FDY (14) | RASEDIYNGLA (23) | NANSLHT (27) | QQYYDYLPT (36) |
| 9 | NFGMN (2) | SISSTSSYIYYADTVKG (4) | HTIGIT-FDY (15) | LASEDIYNNLA (22) | YASSLQD (25) | LQDSEYPWT (34) |
| 10 | NYGMN (1) | SISSSSSYIYYADTVKG (3) | YTLGIT-LDY (16) | LASEDIYNNLA (22) | YASSLQD (25) | LQESEYPWT (37) |
| 11 | NYEMN (1) | SISSTSSYIYYADTVKG (4) | RGLAVGPFDY (17) | LASEDIYNNLA (22) | YASSLQD (25) | LQDSEYPLT (38) |
| 12 | NYGMT (1) | SISSTSSYIYYVDTVKG (6) | QSITVP-FDY (18) | LASEDIYNNLA (22) | YTSNLQD (28) | LQDSEYPFT (31) |
| 13 | NYGMN (1) | SISSTSSYIYYADSVKG (7) | QSTYGD-FDY (19) | RASEDIYNGLA (23) | NANTLHI (29) | QQYSDYPWT (39) |
| 14 | NYEMN (1) | SISSTSSYIYYADTVKG (4) | RGLAVGPFDY (17) | LASEDIYNNLA (22) | YASSLQD (25) | LQDSEYPLT (38) |
| 15 | NYGMN (1) | SISSTRSYIYYAETVKG (8) | HTVDTP-FAH (20) | LASEDIYNNLA (22) | HASRLQD (30) | LQDSEYPWT (34) |
| 16 | NYGMN (1) | SISSTSSYIYYADTVKG (4) | xTIGIT-FDY (21) | LASEDIYNNLA (22) | YASSLQD (25) | LQDSEYPWT (34) | and wherein all CDR sequences are from the same set.

2. The anti-TLR-9 agent of claim 1, wherein the agent comprises two immunoglobulin heavy chain variable domains and two immunoglobulin light chain variable domains.

3. The anti-TLR9 agent of claim 1, wherein the agent is one or more of: i) an antibody, or antigen-binding fragment thereof; ii) an antibody, or derivative thereof; iii) a humanized antibody, or an antigen binding fragment thereof; and iv) a derivative of a humanized antibody that binds TLR9.

4. The anti-TLR9 agent of claim 1, wherein the agent comprises or is conjugated to a detectable marker or label.

5. The anti-TLR9 agent of claim 1, wherein the agent is non-diffusively immobilized on a solid support.

* * * * *

SEQUENCE LISTING

<160> NUMBER OF SEQ ID NOS: 87

<210> SEQ ID NO 1

```
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 1

Asn Tyr Gly Met Asn
1               5

<210> SEQ ID NO 2
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 2

Asn Phe Gly Met Asn
1               5

<210> SEQ ID NO 3
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 3

Ser Ile Ser Ser Ser Ser Ser Tyr Ile Tyr Tyr Ala Asp Thr Val Lys
1               5                   10                  15

Gly

<210> SEQ ID NO 4
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 4

Ser Ile Ser Ser Thr Ser Ser Tyr Ile Tyr Tyr Ala Asp Thr Val Lys
1               5                   10                  15

Gly

<210> SEQ ID NO 5
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 5

Ser Ile Ser Ser Thr Ser Ser Tyr Ile Ser Tyr Ala Asp Thr Val Lys
1               5                   10                  15

Gly
```

<210> SEQ ID NO 6
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 6

Ser Ile Ser Ser Thr Ser Ser Tyr Ile Tyr Tyr Val Asp Thr Val Lys
1               5                   10                  15

Gly

<210> SEQ ID NO 7
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 7

Ser Ile Ser Ser Thr Ser Ser Tyr Ile Tyr Tyr Ala Asp Ser Val Lys
1               5                   10                  15

Gly

<210> SEQ ID NO 8
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 8

Ser Ile Ser Ser Thr Arg Ser Tyr Ile Tyr Tyr Ala Glu Thr Val Lys
1               5                   10                  15

Gly

<210> SEQ ID NO 9
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 9

Tyr Thr Leu Gly Ile Thr Ile Asp Tyr
1               5

<210> SEQ ID NO 10
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 10

Ala Asp Ile Thr Ile Ala Ala Pro His Tyr

<210> SEQ ID NO 11
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic peptide"

<400> SEQUENCE: 11

Gln Asp Ile Thr Thr Pro Phe Asp Tyr
1               5

<210> SEQ ID NO 12
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic peptide"

<400> SEQUENCE: 12

Phe Thr Leu Gly Ile Thr Leu Asp Tyr
1               5

<210> SEQ ID NO 13
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic peptide"

<400> SEQUENCE: 13

Ser Pro Met Gly Ile Thr Gly Phe Glu Tyr
1               5                   10

<210> SEQ ID NO 14
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic peptide"

<400> SEQUENCE: 14

His Trp Val Gly Gly Tyr Phe Asp Tyr
1               5

<210> SEQ ID NO 15
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic peptide"

<400> SEQUENCE: 15

His Thr Ile Gly Ile Thr Phe Asp Tyr
1               5

<210> SEQ ID NO 16

```
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 16

Tyr Thr Leu Gly Ile Thr Leu Asp Tyr
1               5

<210> SEQ ID NO 17
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 17

Arg Gly Leu Ala Val Gly Pro Phe Asp Tyr
1               5                   10

<210> SEQ ID NO 18
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 18

Gln Ser Ile Thr Val Pro Phe Asp Tyr
1               5

<210> SEQ ID NO 19
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 19

Gln Ser Thr Tyr Gly Asp Phe Asp Tyr
1               5

<210> SEQ ID NO 20
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 20

His Thr Val Asp Thr Pro Phe Ala His
1               5

<210> SEQ ID NO 21
<211> LENGTH: 9
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"
<220> FEATURE:
<221> NAME/KEY: MOD_RES
<222> LOCATION: (1)..(1)
<223> OTHER INFORMATION: Any amino acid

<400> SEQUENCE: 21

Xaa Thr Ile Gly Ile Thr Phe Asp Tyr
1               5

<210> SEQ ID NO 22
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 22

Leu Ala Ser Glu Asp Ile Tyr Asn Asn Leu Ala
1               5                   10

<210> SEQ ID NO 23
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Arg Ala Ser Glu Asp Ile Tyr Asn Gly Leu Ala
1               5                   10

<210> SEQ ID NO 24
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 24

Tyr Ala Ser Thr Leu Gln Asp
1               5

<210> SEQ ID NO 25
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 25

Tyr Ala Ser Ser Leu Gln Asp
1               5

<210> SEQ ID NO 26
<211> LENGTH: 7
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"

<400> SEQUENCE: 26

Tyr Ala Ser Thr Leu Gln Tyr
1               5

<210> SEQ ID NO 27
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 27

Asn Ala Asn Ser Leu His Thr
1               5

<210> SEQ ID NO 28
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 28

Tyr Thr Ser Asn Leu Gln Asp
1               5

<210> SEQ ID NO 29
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 29

Asn Ala Asn Thr Leu His Ile
1               5

<210> SEQ ID NO 30
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 30

His Ala Ser Arg Leu Gln Asp
1               5

<210> SEQ ID NO 31
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 31

Leu Gln Asp Ser Glu Tyr Pro Phe Thr
1               5

<210> SEQ ID NO 32
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 32

Leu Gln Asp Ser Glu Phe Pro Tyr Thr
1               5

<210> SEQ ID NO 33
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 33

Leu Gln Asp Ser Glu Phe Pro Asn Thr
1               5

<210> SEQ ID NO 34
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 34

Leu Gln Asp Ser Glu Tyr Pro Trp Thr
1               5

<210> SEQ ID NO 35
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 35

Leu Gln Asp Ser Glu Tyr Pro Tyr Thr
1               5

<210> SEQ ID NO 36
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 36

Gln Gln Tyr Tyr Asp Tyr Leu Pro Thr
1               5
```

```
<210> SEQ ID NO 37
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 37

Leu Gln Glu Ser Glu Tyr Pro Trp Thr
1               5

<210> SEQ ID NO 38
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 38

Leu Gln Asp Ser Glu Tyr Pro Leu Thr
1               5

<210> SEQ ID NO 39
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 39

Gln Gln Tyr Ser Asp Tyr Pro Trp Thr
1               5

<210> SEQ ID NO 40

<400> SEQUENCE: 40

000

<210> SEQ ID NO 41
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 41

Glu Val Gln Leu Glu Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
            20                  25                  30

Gly Met Asn Trp Ile Arg Gln Ala Pro Gly Lys Gly Leu Glu Trp Val
        35                  40                  45

Ala Ser Ile Ser Ser Ser Ser Tyr Ile Tyr Tyr Ala Asp Thr Val
    50                  55                  60

Lys Gly Arg Phe Thr Ile Ser Arg Glu Asn Ala Lys Asn Thr Leu Tyr
65                  70                  75                  80
```

Leu Gln Leu Thr Ser Leu Arg Ser Glu Asp Thr Ala Leu Tyr Tyr Cys
                85                  90                  95

Ala Arg Tyr Thr Leu Gly Ile Thr Ile Asp Tyr Trp Gly Gln Gly Val
            100                 105                 110

Met Val Thr Val Ser Ser
        115

<210> SEQ ID NO 42
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 42

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Asn Asn Phe
            20                  25                  30

Gly Met Asn Trp Ile Arg Gln Ala Pro Gly Lys Gly Leu Glu Trp Val
        35                  40                  45

Ala Ser Ile Ser Ser Thr Ser Ser Tyr Ile Tyr Tyr Ala Asp Thr Val
    50                  55                  60

Lys Gly Arg Phe Thr Ile Ser Arg Glu Asn Ala Lys Ser Thr Leu Tyr
65                  70                  75                  80

Leu Gln Met Thr Ser Leu Arg Ser Glu Asp Thr Ala Phe Tyr Tyr Cys
                85                  90                  95

Ala Arg Ala Asp Ile Thr Ile Ala Ala Pro His Tyr Trp Gly Gln Gly
            100                 105                 110

Val Met Val Thr Val Ser Ser
        115

<210> SEQ ID NO 43
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 43

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Asn Asn Phe
            20                  25                  30

Gly Met Asn Trp Ile Arg Gln Ala Pro Gly Lys Gly Leu Glu Trp Val
        35                  40                  45

Ala Ser Ile Ser Ser Thr Ser Ser Tyr Ile Tyr Tyr Ala Asp Thr Val
    50                  55                  60

Lys Gly Arg Phe Thr Ile Ser Arg Glu Asn Ala Lys Ser Thr Leu Tyr
65                  70                  75                  80

Leu Gln Met Thr Ser Leu Arg Ser Glu Asp Thr Ala Phe Tyr Tyr Cys
                85                  90                  95

Ala Arg Ala Asp Ile Thr Ile Ala Ala Pro His Tyr Trp Gly Gln Gly
            100                 105                 110

Val Met Val Thr Val Ser Ser
        115

<210> SEQ ID NO 44
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 44

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Phe
            20                  25                  30

Gly Met His Trp Ile Arg Gln Ala Pro Gly Lys Gly Leu Glu Trp Val
        35                  40                  45

Ala Ser Ile Ser Ser Thr Ser Ser Tyr Ile Ser Tyr Ala Asp Thr Val
    50                  55                  60

Lys Gly Arg Phe Thr Ile Ser Arg Glu Asn Ala Lys Asn Thr Leu Tyr
65                  70                  75                  80

Leu Gln Met Thr Ser Leu Arg Ser Glu Asp Thr Ala Leu Tyr Tyr Cys
                85                  90                  95

Ala Arg Gln Asp Ile Thr Thr Pro Phe Asp Tyr Trp Gly Gln Gly Val
            100                 105                 110

Met Val Thr Val Ser Ser
        115

<210> SEQ ID NO 45
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 45

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Asn Asn Phe
            20                  25                  30

Gly Met Asn Trp Ile Arg Gln Ala Pro Gly Lys Gly Leu Glu Trp Val
        35                  40                  45

Ala Ser Ile Ser Ser Thr Ser Ser Tyr Ile Tyr Tyr Ala Asp Thr Val
    50                  55                  60

Lys Gly Arg Phe Thr Ile Ser Arg Glu Asn Ala Lys Ser Thr Leu Tyr
65                  70                  75                  80

Leu Gln Met Thr Ser Leu Arg Ser Glu Asp Thr Ala Phe Tyr Tyr Cys
                85                  90                  95

Ala Arg Ala Asp Ile Thr Ile Ala Ala Pro His Tyr Trp Gly Gln Gly
            100                 105                 110

Val Met Val Thr Val Ser Ser
        115

<210> SEQ ID NO 46
<211> LENGTH: 118
<212> TYPE: PRT

<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 46

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
            20                  25                  30

Gly Met Asn Trp Ile Arg Gln Ala Pro Gly Lys Gly Leu Glu Trp Ile
        35                  40                  45

Ala Ser Ile Ser Ser Thr Ser Ser Tyr Ile Tyr Tyr Ala Asp Thr Val
    50                  55                  60

Lys Gly Arg Phe Thr Ile Ser Arg Asp Asn Ala Lys Asn Thr Leu Tyr
65                  70                  75                  80

Leu Gln Met Thr Ser Leu Arg Ser Glu Asp Thr Ala Leu Tyr Tyr Cys
                85                  90                  95

Ala Arg Phe Thr Leu Gly Ile Thr Leu Asp Tyr Trp Gly Gln Gly Val
            100                 105                 110

Met Val Thr Val Ser Ser
        115

<210> SEQ ID NO 47
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 47

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
            20                  25                  30

Gly Met Asn Trp Ile Arg Gln Ala Pro Gly Lys Gly Leu Glu Trp Val
        35                  40                  45

Ala Ser Ile Ser Ser Ser Ser Tyr Ile Tyr Tyr Ala Asp Thr Val
    50                  55                  60

Lys Gly Arg Phe Thr Ile Ser Arg Asp Lys Ala Lys Asn Thr Leu Tyr
65                  70                  75                  80

Leu Gln Met Thr Ser Leu Arg Ser Glu Asp Thr Ala Leu Tyr Tyr Cys
                85                  90                  95

Ala Arg Ser Pro Met Gly Ile Thr Gly Phe Glu Tyr Trp Gly Gln Gly
            100                 105                 110

Thr Leu Val Thr Val Ser Ser
        115

<210> SEQ ID NO 48
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 48

-continued

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
            20                  25                  30

Gly Met Asn Trp Ile Arg Gln Ala Pro Gly Lys Gly Leu Glu Trp Val
        35                  40                  45

Ala Ser Ile Ser Ser Ser Ser Tyr Ile Tyr Tyr Ala Asp Thr Val
    50                  55                  60

Lys Gly Arg Phe Thr Ile Ser Arg Asp Asn Ala Lys Asn Thr Leu Tyr
65                  70                  75                  80

Leu Gln Met Thr Ser Leu Arg Ser Glu Asp Thr Ala Leu Tyr Tyr Cys
            85                  90                  95

Ala Arg His Trp Val Gly Gly Tyr Phe Asp Tyr Trp Gly Gln Gly Val
            100                 105                 110

Met Val Thr Val Ser Ser
        115

<210> SEQ ID NO 49
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 49

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Phe
            20                  25                  30

Gly Met Asn Trp Ile Arg Gln Ala Pro Gly Lys Gly Leu Glu Trp Val
        35                  40                  45

Ala Ser Ile Ser Ser Thr Ser Ser Tyr Ile Tyr Tyr Ala Asp Thr Val
    50                  55                  60

Lys Gly Arg Phe Thr Ile Ser Arg Asp Asn Ala Lys Asn Thr Leu Tyr
65                  70                  75                  80

Leu Gln Met Thr Ser Leu Arg Ser Glu Asp Thr Ala Leu Tyr Tyr Cys
            85                  90                  95

Ala Arg His Thr Ile Gly Ile Thr Phe Asp Tyr Trp Gly Gln Gly Val
            100                 105                 110

Met Val Thr Val Ser Ser
        115

<210> SEQ ID NO 50
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 50

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
            20                  25                  30

Gly Met Asn Trp Ile Arg Gln Ala Pro Gly Lys Gly Leu Glu Trp Phe
                35                  40                  45

Ala Ser Ile Ser Ser Ser Ser Tyr Ile Tyr Tyr Ala Asp Thr Val
 50                  55                  60

Lys Gly Arg Phe Thr Ile Ser Arg Asp Asn Ala Lys Asn Thr Leu Tyr
 65                  70                  75                  80

Leu Gln Met Thr Ser Leu Arg Ser Glu Asp Thr Ala Leu Tyr Tyr Cys
                85                  90                  95

Ala Arg Tyr Thr Leu Gly Ile Thr Leu Asp Tyr Trp Gly Gln Gly Val
                100                 105                 110

Thr Val Thr Val Ser Ser
            115

<210> SEQ ID NO 51
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 51

Glu Val Gln Leu Val Glu Ser Gly Gly Gly Leu Val Gln Pro Gly Arg
 1               5                  10                  15

Ser Leu Lys Leu Ser Cys Leu Ala Ser Gly Phe Thr Phe Ser Asn Tyr
                20                  25                  30

Glu Met Asn Trp Ile Arg Gln Ala Pro Gly Lys Gly Leu Glu Trp Val
                35                  40                  45

Ala Ser Ile Ser Ser Thr Ser Ser Tyr Ile Tyr Tyr Ala Asp Thr Val
 50                  55                  60

Lys Gly Arg Phe Thr Ile Ser Arg Asp Asn Ala Lys Asn Thr Leu Tyr
 65                  70                  75                  80

Leu Gln Met Thr Ser Leu Arg Ser Glu Asp Thr Ala Leu Tyr Tyr Cys
                85                  90                  95

Ala Gly Arg Gly Leu Ala Val Gly Pro Phe Asp Tyr Trp Gly Gln Gly
                100                 105                 110

Val Met Val Thr Val Ser Ser
            115

<210> SEQ ID NO 52
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 52

Glu Val Gln Leu Val Glu Ser Gly Gly Gly Leu Val Gln Pro Gly Arg
 1               5                  10                  15

Ser Leu Lys Leu Ser Cys Leu Ala Ser Gly Phe Thr Phe Thr Asn Tyr
                20                  25                  30

Gly Met Thr Trp Ile Arg Gln Ala Pro Gly Lys Gly Leu Glu Trp Val
                35                  40                  45

Ala Ser Ile Ser Ser Thr Ser Ser Tyr Ile Tyr Tyr Val Asp Thr Val
 50                  55                  60

Lys Gly Arg Phe Thr Ile Ser Arg Glu Asn Ala Lys Asn Thr Leu Tyr

```
                65                  70                  75                  80
Leu Gln Met Thr Ser Leu Arg Ser Glu Asp Thr Ala Leu Tyr Phe Cys
                    85                  90                  95

Ala Arg Gln Ser Ile Thr Val Pro Phe Asp Tyr Trp Gly Gln Gly Val
                100                 105                 110

Met Val Thr Leu Ser Ser
            115

<210> SEQ ID NO 53
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 53

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
                20                  25                  30

Gly Met Asn Trp Ile Arg Gln Ala Pro Gly Lys Gly Leu Glu Trp Val
            35                  40                  45

Ala Ser Ile Ser Ser Thr Ser Tyr Ile Tyr Tyr Ala Asp Ser Val
    50                  55                  60

Lys Gly Arg Phe Thr Ile Ser Arg Glu Asn Ala Lys Asn Thr Leu Tyr
65                  70                  75                  80

Leu Gln Met Thr Ser Leu Lys Ser Glu Asp Thr Ala Leu Tyr Tyr Cys
                    85                  90                  95

Ala Ser Gln Ser Thr Tyr Gly Asp Phe Asp Tyr Trp Gly Gln Gly Val
                100                 105                 110

Met Val Thr Val Ser Ser
            115

<210> SEQ ID NO 54
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 54

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Ile Phe Ser Asn Tyr
                20                  25                  30

Glu Met Asn Trp Ile Arg Gln Ala Pro Gly Lys Gly Leu Glu Trp Val
            35                  40                  45

Ala Ser Ile Ser Ser Thr Ser Tyr Ile Tyr Tyr Ala Asp Thr Val
    50                  55                  60

Lys Gly Arg Phe Thr Ile Ser Arg Asp Asn Ala Lys Asn Thr Leu Tyr
65                  70                  75                  80

Val Gln Met Thr Ser Leu Arg Ser Glu Asp Thr Ala Leu Tyr Tyr Cys
                    85                  90                  95

Ala Gly Arg Gly Leu Ala Val Gly Pro Phe Asp Tyr Trp Gly Gln Gly
                100                 105                 110
```

Val Met Val Thr Val Ser Ser
        115

<210> SEQ ID NO 55
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 55

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
            20                  25                  30

Gly Met Asn Trp Ile Arg Gln Ala Pro Gly Lys Gly Leu Glu Trp Val
        35                  40                  45

Ala Ser Ile Ser Ser Thr Arg Ser Tyr Ile Tyr Tyr Ala Glu Thr Val
    50                  55                  60

Lys Gly Arg Phe Thr Ile Ser Arg Asp Asn Ala Lys Asn Thr Leu Tyr
65                  70                  75                  80

Leu Gln Met Thr Ser Leu Arg Ser Glu Asp Thr Ala Leu Tyr Tyr Cys
                85                  90                  95

Ala Arg His Thr Val Asp Thr Pro Phe Ala His Trp Gly Gln Gly Thr
            100                 105                 110

Leu Val Thr Val Ser Ser
        115

<210> SEQ ID NO 56
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
<220> FEATURE:
<221> NAME/KEY: MOD_RES
<222> LOCATION: (99)..(99)
<223> OTHER INFORMATION: Any amino acid

<400> SEQUENCE: 56

Glu Val Gln Leu Val Glu Ser Gly Gly Gly Leu Val Gln Pro Gly Arg
1               5                   10                  15

Ser Leu Lys Leu Ser Cys Leu Ala Ser Gly Phe Thr Phe Ser Asn Tyr
            20                  25                  30

Gly Met Asn Trp Ile Arg Gln Ala Pro Gly Lys Gly Leu Glu Trp Val
        35                  40                  45

Ala Ser Ile Ser Ser Thr Ser Ser Tyr Ile Tyr Tyr Ala Asp Thr Val
    50                  55                  60

Lys Gly Arg Phe Thr Ile Ser Arg Asp Asn Ala Lys Asn Thr Leu Tyr
65                  70                  75                  80

Leu Gln Met Thr Ser Leu Arg Ser Glu Asp Thr Ala Leu Tyr Tyr Cys
                85                  90                  95

Ala Arg Xaa Thr Ile Gly Ile Thr Phe Asp Tyr Trp Gly Gln Gly Val
            100                 105                 110

Met Val Thr Val Ser Ser
        115

<210> SEQ ID NO 57
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 57

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Val Leu Ile
        35                  40                  45

Tyr Tyr Ala Ser Thr Leu Gln Asp Gly Val Pro Ser Arg Phe Ser Gly
    50                  55                  60

Ser Gly Ser Gly Thr Gln Tyr Ser Leu Lys Ile Lys Ser Leu Glu Ser
65                  70                  75                  80

Glu Asp Ala Ala Thr Tyr Phe Cys Leu Gln Asp Ser Glu Tyr Pro Phe
                85                  90                  95

Thr Phe Gly Ser Gly Thr Lys Leu Glu Ile Ile
            100                 105

<210> SEQ ID NO 58
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 58

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr Gln Tyr Ser Leu Lys Ile Asn Ser Leu Glu Ser
65                  70                  75                  80

Glu Asp Ala Ala Thr Tyr Phe Cys Leu Gln Asp Ser Glu Phe Pro Tyr
                85                  90                  95

Thr Phe Gly Ala Gly Ser Lys Leu Glu Leu Lys
            100                 105

<210> SEQ ID NO 59
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 59

```
Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Arg Pro Gly Lys Ser Pro Gln Leu Leu Ile
        35                  40                  45

Tyr Tyr Ala Ser Thr Leu Gln Tyr Gly Val Pro Ser Arg Phe Ser Gly
    50                  55                  60

Ser Gly Ser Gly Thr His Tyr Ser Leu Lys Ile Asn Ser Leu Glu Ser
65                  70                  75                  80

Glu Asp Ala Ala Thr Tyr Phe Cys Leu Gln Asp Ser Glu Phe Pro Asn
                85                  90                  95

Thr Phe Gly Ala Gly Thr Lys Leu Glu Leu Lys
            100                 105
```

<210> SEQ ID NO 60
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 60

```
Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr Gln Tyr Ser Leu Lys Ile Asn Ser Leu Glu Ser
65                  70                  75                  80

Glu Asp Ala Ala Thr Tyr Phe Cys Leu Gln Asp Ser Glu Phe Pro Tyr
                85                  90                  95

Thr Phe Gly Ala Gly Ser Lys Leu Glu Leu Lys
            100                 105
```

<210> SEQ ID NO 61
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 61

```
Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr Gln Tyr Ser Leu Lys Met Asn Ser Leu Glu Ser
```

65                 70                 75                 80

Glu Asp Ala Ala Thr Tyr Phe Cys Leu Gln Asp Ser Glu Tyr Pro Trp
                85                  90                  95

Thr Phe Gly Gly Gly Thr Lys Leu Glu Leu Lys
            100                 105

<210> SEQ ID NO 62
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 62

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
                20                  25                  30

Leu Ala Trp Tyr Gln Gln Lys Pro Gly Lys Ser Pro Gln Leu Leu Ile
            35                  40                  45

Tyr Tyr Ala Ser Ser Leu Gln Asp Gly Val Pro Ser Arg Phe Ser Gly
        50                  55                  60

Ser Gly Ser Gly Thr Gln Tyr Ser Leu Lys Ile Asn Ser Leu Glu Ser
65                  70                  75                  80

Glu Asp Ala Ala Thr Tyr Phe Cys Leu Gln Asp Ser Glu Tyr Pro Tyr
                85                  90                  95

Thr Phe Gly Gly Gly Thr Lys Leu Glu Leu Lys
            100                 105

<210> SEQ ID NO 63
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 63

Asp Ile Gln Met Thr Gln Ser Pro Ala Ser Leu Ser Ala Ser Leu Gly
1               5                   10                  15

Glu Thr Val Thr Ile Glu Cys Arg Ala Ser Glu Asp Ile Tyr Asn Gly
                20                  25                  30

Leu Ala Trp Tyr Gln Gln Lys Pro Gly Lys Ser Pro Gln Leu Leu Ile
            35                  40                  45

Tyr Asn Ala Asn Ser Leu His Thr Gly Val Pro Ser Arg Phe Ser Gly
        50                  55                  60

Ser Gly Ser Gly Thr Gln Tyr Ser Leu Lys Ile Asn Ser Leu Gln Ser
65                  70                  75                  80

Glu Asp Val Ala Ser Tyr Phe Cys Gln Gln Tyr Tyr Asp Tyr Leu Pro
                85                  90                  95

Thr Phe Gly Gly Gly Thr Lys Leu Glu Leu Lys
            100                 105

<210> SEQ ID NO 64
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 64

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr Gln Tyr Ser Leu Lys Ile Asn Ser Leu Glu Ser
65                  70                  75                  80

Glu Asp Ala Ala Thr Tyr Phe Cys Leu Gln Asp Ser Glu Tyr Pro Trp
                85                  90                  95

Thr Phe Gly Gly Gly Thr Lys Leu Glu Leu Lys
                100                 105

<210> SEQ ID NO 65
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 65

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Leu Leu Ile
        35                  40                  45

Tyr Tyr Ala Ser Ser Leu Gln Asp Gly Val Pro Ser Arg Phe Thr Gly
    50                  55                  60

Ser Gly Ser Gly Thr Gln Tyr Ser Leu Lys Ile Asn Ser Leu Glu Ser
65                  70                  75                  80

Glu Asp Ala Ala Thr Tyr Phe Cys Leu Gln Glu Ser Glu Tyr Pro Trp
                85                  90                  95

Thr Phe Gly Gly Gly Thr Lys Leu Glu Leu Lys
                100                 105

<210> SEQ ID NO 66
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 66

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

```
Leu Ala Trp Tyr Gln Gln Lys Pro Gly Lys Ser Pro Gln Leu Leu Ile
            35                  40                  45

Tyr Tyr Ala Ser Ser Leu Gln Asp Gly Val Pro Ser Arg Phe Ser Gly
 50                      55                  60

Ser Gly Ser Gly Thr His Tyr Ser Leu Lys Ile Asn Ser Leu Glu Ser
 65              70                  75                      80

Glu Asp Ala Ala Thr Tyr Phe Cys Leu Gln Asp Ser Glu Tyr Pro Leu
                 85                  90                  95

Thr Phe Gly Ser Gly Thr Lys Leu Glu Ile Lys
            100                 105
```

<210> SEQ ID NO 67
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 67

```
Asp Ile Gln Met Thr Gln Ser Pro Ala Ser Leu Ser Ala Ser Leu Gly
 1               5                  10                  15

Glu Thr Val Ser Ile Glu Cys Leu Ala Ser Glu Asp Ile Tyr Asn Asn
                 20                  25                  30

Leu Ala Trp Tyr Gln Gln Lys Pro Gly Lys Ser Pro Gln Leu Leu Ile
            35                  40                  45

Tyr Tyr Thr Ser Asn Leu Gln Asp Gly Val Pro Ser Arg Phe Ser Gly
 50                      55                  60

Ser Gly Ser Gly Thr Gln Tyr Ser Leu Lys Ile Asn Ser Leu Glu Ser
 65              70                  75                      80

Glu Asp Ala Ala Thr Tyr Phe Cys Leu Gln Asp Ser Glu Tyr Pro Phe
                 85                  90                  95

Thr Phe Gly Ala Gly Thr Lys Leu Glu Leu Lys
            100                 105
```

<210> SEQ ID NO 68
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 68

```
Asp Ile Gln Met Thr Gln Ser Pro Ala Ser Leu Ser Ala Ser Leu Gly
 1               5                  10                  15

Glu Thr Val Thr Ile Glu Cys Arg Ala Ser Glu Asp Ile Tyr Asn Gly
                 20                  25                  30

Leu Ala Trp Tyr Gln Gln Lys Pro Gly Lys Ser Pro Gln Leu Leu Ile
            35                  40                  45

Tyr Asn Ala Asn Thr Leu His Ile Gly Val Pro Ser Arg Phe Ser Gly
 50                      55                  60

Ser Gly Ser Gly Thr Gln Tyr Ser Leu Arg Ile Asn Ser Leu Gln Ser
 65              70                  75                      80

Glu Asp Val Ala Ser Tyr Phe Cys Gln Gln Tyr Ser Asp Tyr Pro Trp
                 85                  90                  95

Thr Phe Gly Gly Gly Thr Lys Leu Glu Leu Lys
```

<210> SEQ ID NO 69
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 69

Asp Ile Gln Met Thr Gln Ser Pro Ala Ser Leu Ser Ala Ser Arg Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr His Tyr Ser Leu Lys Ile Asn Ser Leu Glu Ser
65                  70                  75                  80

Glu Asp Ala Ala Thr Tyr Phe Cys Leu Gln Asp Ser Glu Tyr Pro Leu
                85                  90                  95

Thr Phe Gly Ser Gly Thr Lys Leu Glu Ile Lys
            100                 105

<210> SEQ ID NO 70
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 70

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Gln Lys Pro Gly Lys Ser Pro Gln Leu Leu Met
        35                  40                  45

Tyr His Ala Ser Arg Leu Gln Asp Gly Val Pro Ser Arg Phe Ser Gly
    50                  55                  60

Ser Gly Ser Gly Thr Gln Tyr Ser Leu Lys Ile Asn Ser Leu Glu Ser
65                  70                  75                  80

Asp Asp Ala Ala Thr Tyr Phe Cys Leu Gln Asp Ser Glu Tyr Pro Trp
                85                  90                  95

Thr Phe Gly Gly Gly Thr Lys Leu Glu Leu Thr
            100                 105

<210> SEQ ID NO 71
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 71

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asn Asn
            20                  25                  30

Leu Ala Trp Tyr Gln Lys Pro Gly Lys Ser Pro Gln Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr Gln Tyr Ser Leu Lys Ile Asn Ser Leu Glu Ser
65                  70                  75                  80

Glu Asp Ala Ala Thr Tyr Phe Cys Leu Gln Asp Ser Glu Tyr Pro Trp
                85                  90                  95

Thr Phe Gly Gly Gly Thr Lys Leu Glu Leu Lys
            100                 105

<210> SEQ ID NO 72
<211> LENGTH: 1032
<212> TYPE: PRT
<213> ORGANISM: Homo sapiens

<400> SEQUENCE: 72

Met Gly Phe Cys Arg Ser Ala Leu His Pro Leu Ser Leu Leu Val Gln
1               5                   10                  15

Ala Ile Met Leu Ala Met Thr Leu Ala Leu Gly Thr Leu Pro Ala Phe
            20                  25                  30

Leu Pro Cys Glu Leu Gln Pro His Gly Leu Val Asn Cys Asn Trp Leu
        35                  40                  45

Phe Leu Lys Ser Val Pro His Phe Ser Met Ala Ala Pro Arg Gly Asn
    50                  55                  60

Val Thr Ser Leu Ser Leu Ser Ser Asn Arg Ile His His Leu His Asp
65                  70                  75                  80

Ser Asp Phe Ala His Leu Pro Ser Leu Arg His Leu Asn Leu Lys Trp
                85                  90                  95

Asn Cys Pro Pro Val Gly Leu Ser Pro Met His Phe Pro Cys His Met
            100                 105                 110

Thr Ile Glu Pro Ser Thr Phe Leu Ala Val Pro Thr Leu Glu Glu Leu
        115                 120                 125

Asn Leu Ser Tyr Asn Asn Ile Met Thr Val Pro Ala Leu Pro Lys Ser
    130                 135                 140

Leu Ile Ser Leu Ser Leu Ser His Thr Asn Ile Leu Met Leu Asp Ser
145                 150                 155                 160

Ala Ser Leu Ala Gly Leu His Ala Leu Arg Phe Leu Phe Met Asp Gly
                165                 170                 175

Asn Cys Tyr Tyr Lys Asn Pro Cys Arg Gln Ala Leu Glu Val Ala Pro
            180                 185                 190

Gly Ala Leu Leu Gly Leu Gly Asn Leu Thr His Leu Ser Leu Lys Tyr
        195                 200                 205

Asn Asn Leu Thr Val Val Pro Arg Asn Leu Pro Ser Ser Leu Glu Tyr
    210                 215                 220

Leu Leu Leu Ser Tyr Asn Arg Ile Val Lys Leu Ala Pro Glu Asp Leu
225                 230                 235                 240

Ala Asn Leu Thr Ala Leu Arg Val Leu Asp Val Gly Gly Asn Cys Arg
                245                 250                 255

Arg Cys Asp His Ala Pro Asn Pro Cys Met Glu Cys Pro Arg His Phe

```
                260                 265                 270
Pro Gln Leu His Pro Asp Thr Phe Ser His Leu Ser Arg Leu Glu Gly
        275                 280                 285
Leu Val Leu Lys Asp Ser Ser Leu Ser Trp Leu Asn Ala Ser Trp Phe
        290                 295                 300
Arg Gly Leu Gly Asn Leu Arg Val Leu Asp Leu Ser Glu Asn Phe Leu
305                 310                 315                 320
Tyr Lys Cys Ile Thr Lys Thr Lys Ala Phe Gln Gly Leu Thr Gln Leu
                325                 330                 335
Arg Lys Leu Asn Leu Ser Phe Asn Tyr Gln Lys Arg Val Ser Phe Ala
                340                 345                 350
His Leu Ser Leu Ala Pro Ser Phe Gly Ser Leu Val Ala Leu Lys Glu
                355                 360                 365
Leu Asp Met His Gly Ile Phe Phe Arg Ser Leu Asp Glu Thr Thr Leu
        370                 375                 380
Arg Pro Leu Ala Arg Leu Pro Met Leu Gln Thr Leu Arg Leu Gln Met
385                 390                 395                 400
Asn Phe Ile Asn Gln Ala Gln Leu Gly Ile Phe Arg Ala Phe Pro Gly
                405                 410                 415
Leu Arg Tyr Val Asp Leu Ser Asp Asn Arg Ile Ser Gly Ala Ser Glu
                420                 425                 430
Leu Thr Ala Thr Met Gly Glu Ala Asp Gly Gly Glu Lys Val Trp Leu
                435                 440                 445
Gln Pro Gly Asp Leu Ala Pro Ala Pro Val Asp Thr Pro Ser Ser Glu
        450                 455                 460
Asp Phe Arg Pro Asn Cys Ser Thr Leu Asn Phe Thr Leu Asp Leu Ser
465                 470                 475                 480
Arg Asn Asn Leu Val Thr Val Gln Pro Glu Met Phe Ala Gln Leu Ser
                485                 490                 495
His Leu Gln Cys Leu Arg Leu Ser His Asn Cys Ile Ser Gln Ala Val
                500                 505                 510
Asn Gly Ser Gln Phe Leu Pro Leu Thr Gly Leu Gln Val Leu Asp Leu
                515                 520                 525
Ser His Asn Lys Leu Asp Leu Tyr His Glu His Ser Phe Thr Glu Leu
                530                 535                 540
Pro Arg Leu Glu Ala Leu Asp Leu Ser Tyr Asn Ser Gln Pro Phe Gly
545                 550                 555                 560
Met Gln Gly Val Gly His Asn Phe Ser Phe Val Ala His Leu Arg Thr
                565                 570                 575
Leu Arg His Leu Ser Leu Ala His Asn Asn Ile His Ser Gln Val Ser
                580                 585                 590
Gln Gln Leu Cys Ser Thr Ser Leu Arg Ala Leu Asp Phe Ser Gly Asn
                595                 600                 605
Ala Leu Gly His Met Trp Ala Glu Gly Asp Leu Tyr Leu His Phe Phe
                610                 615                 620
Gln Gly Leu Ser Gly Leu Ile Trp Leu Asp Leu Ser Gln Asn Arg Leu
625                 630                 635                 640
His Thr Leu Leu Pro Gln Thr Leu Arg Asn Leu Pro Lys Ser Leu Gln
                645                 650                 655
Val Leu Arg Leu Arg Asp Asn Tyr Leu Ala Phe Phe Lys Trp Trp Ser
                660                 665                 670
Leu His Phe Leu Pro Lys Leu Glu Val Leu Asp Leu Ala Gly Asn Gln
                675                 680                 685
```

-continued

```
Leu Lys Ala Leu Thr Asn Gly Ser Leu Pro Ala Gly Thr Arg Leu Arg
    690                 695                 700

Arg Leu Asp Val Ser Cys Asn Ser Ile Ser Phe Val Ala Pro Gly Phe
705                 710                 715                 720

Phe Ser Lys Ala Lys Glu Leu Arg Glu Leu Asn Leu Ser Ala Asn Ala
                725                 730                 735

Leu Lys Thr Val Asp His Ser Trp Phe Gly Pro Leu Ala Ser Ala Leu
            740                 745                 750

Gln Ile Leu Asp Val Ser Ala Asn Pro Leu His Cys Ala Cys Gly Ala
        755                 760                 765

Ala Phe Met Asp Phe Leu Leu Glu Val Gln Ala Ala Val Pro Gly Leu
    770                 775                 780

Pro Ser Arg Val Lys Cys Gly Ser Pro Gly Gln Leu Gln Gly Leu Ser
785                 790                 795                 800

Ile Phe Ala Gln Asp Leu Arg Leu Cys Leu Asp Glu Ala Leu Ser Trp
                805                 810                 815

Asp Cys Phe Ala Leu Ser Leu Leu Ala Val Ala Leu Gly Leu Gly Val
            820                 825                 830

Pro Met Leu His His Leu Cys Gly Trp Asp Leu Trp Tyr Cys Phe His
        835                 840                 845

Leu Cys Leu Ala Trp Leu Pro Trp Arg Gly Arg Gln Ser Gly Arg Asp
    850                 855                 860

Glu Asp Ala Leu Pro Tyr Asp Ala Phe Val Val Phe Asp Lys Thr Gln
865                 870                 875                 880

Ser Ala Val Ala Asp Trp Val Tyr Asn Glu Leu Arg Gly Gln Leu Glu
                885                 890                 895

Glu Cys Arg Gly Arg Trp Ala Leu Arg Leu Cys Leu Glu Glu Arg Asp
            900                 905                 910

Trp Leu Pro Gly Lys Thr Leu Phe Glu Asn Leu Trp Ala Ser Val Tyr
        915                 920                 925

Gly Ser Arg Lys Thr Leu Phe Val Leu Ala His Thr Asp Arg Val Ser
    930                 935                 940

Gly Leu Leu Arg Ala Ser Phe Leu Leu Ala Gln Gln Arg Leu Leu Glu
945                 950                 955                 960

Asp Arg Lys Asp Val Val Val Leu Val Ile Leu Ser Pro Asp Gly Arg
                965                 970                 975

Arg Ser Arg Tyr Val Arg Leu Arg Gln Arg Leu Cys Arg Gln Ser Val
            980                 985                 990

Leu Leu Trp Pro His Gln Pro Ser  Gly Gln Arg Ser Phe  Trp Ala Gln
        995                 1000                1005

Leu Gly Met Ala Leu Thr Arg  Asp Asn His His Phe  Tyr Asn Arg
        1010                1015                1020

Asn Phe Cys Gln Gly Pro Thr  Ala Glu
        1025                1030

<210> SEQ ID NO 73
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73
```

```
Asn Phe Gly Met His
1               5

<210> SEQ ID NO 74
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74

Asn Tyr Glu Met Asn
1               5

<210> SEQ ID NO 75
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 75

Asn Tyr Gly Met Thr
1               5

<210> SEQ ID NO 76
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (2)..(2)
<223> OTHER INFORMATION: /replace="Phe"
<220> FEATURE:
<221> NAME/KEY: VARIANT
<222> LOCATION: (3)..(3)
<223> OTHER INFORMATION: /replace="Glu"
<220> FEATURE:
<221> NAME/KEY: VARIANT
<222> LOCATION: (5)..(5)
<223> OTHER INFORMATION: /replace="His" or "Thr"
<220> FEATURE:
<221> NAME/KEY: SITE
<222> LOCATION: (1)..(5)
<223> OTHER INFORMATION: /note="Variant residues given in the sequence
      have no preference with respect to those in the annotations
      for variant positions"

<400> SEQUENCE: 76

Asn Tyr Gly Met Asn
1               5

<210> SEQ ID NO 77
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (5)..(5)
<223> OTHER INFORMATION: /replace="Thr"
```

```
<220> FEATURE:
<221> NAME/KEY: VARIANT
<222> LOCATION: (6)..(6)
<223> OTHER INFORMATION: /replace="Arg"
<220> FEATURE:
<221> NAME/KEY: VARIANT
<222> LOCATION: (10)..(10)
<223> OTHER INFORMATION: /replace="Ser"
<220> FEATURE:
<221> NAME/KEY: VARIANT
<222> LOCATION: (12)..(12)
<223> OTHER INFORMATION: /replace="Val"
<220> FEATURE:
<221> NAME/KEY: VARIANT
<222> LOCATION: (13)..(13)
<223> OTHER INFORMATION: /replace="Glu"
<220> FEATURE:
<221> NAME/KEY: VARIANT
<222> LOCATION: (14)..(14)
<223> OTHER INFORMATION: /replace="Ser"
<220> FEATURE:
<221> NAME/KEY: SITE
<222> LOCATION: (1)..(17)
<223> OTHER INFORMATION: /note="Variant residues given in the sequence
      have no preference with respect to those in the annotations
      for variant positions"

<400> SEQUENCE: 77

Ser Ile Ser Ser Ser Ser Ser Tyr Ile Tyr Tyr Ala Asp Thr Val Lys
1               5                   10                  15

Gly

<210> SEQ ID NO 78
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (1)..(1)
<223> OTHER INFORMATION: /replace=""Ala" or "Gln" or "Phe" or "Ser" or
      "His" or "Arg"
<220> FEATURE:
<221> NAME/KEY: VARIANT
<222> LOCATION: (2)..(2)
<223> OTHER INFORMATION: /replace="Asp" or "Pro" or "Trp" or "Gly" or
      "Ser"
<220> FEATURE:
<221> NAME/KEY: VARIANT
<222> LOCATION: (3)..(3)
<223> OTHER INFORMATION: /replace="Ile" or "Met" or "Val" or "Thr"
<220> FEATURE:
<221> NAME/KEY: VARIANT
<222> LOCATION: (4)..(4)
<223> OTHER INFORMATION: /replace="Thr" or "Ala" or "Asp" or "Tyr"
<220> FEATURE:
<221> NAME/KEY: VARIANT
<222> LOCATION: (5)..(5)
<223> OTHER INFORMATION: /replace="Thr" or "Gly" or "Val"
<220> FEATURE:
<221> NAME/KEY: VARIANT
<222> LOCATION: (6)..(6)
<223> OTHER INFORMATION: /replace="Ala" or "Pro" or "Tyr" or "Gly" or
      "Asp"
<220> FEATURE:
<221> NAME/KEY: VARIANT
<222> LOCATION: (7)..(7)
<223> OTHER INFORMATION: /replace="Gly" or "Pro" or " "
<220> FEATURE:
<221> NAME/KEY: VARIANT
<222> LOCATION: (8)..(8)
<223> OTHER INFORMATION: /replace="Pro" or "Phe" or "Leu"
<220> FEATURE:
```

```
<221> NAME/KEY: VARIANT
<222> LOCATION: (9)..(9)
<223> OTHER INFORMATION: /replace="His" or "Glu" or "Ala"
<220> FEATURE:
<221> NAME/KEY: VARIANT
<222> LOCATION: (10)..(10)
<223> OTHER INFORMATION: /replace="His"
<220> FEATURE:
<221> NAME/KEY: SITE
<222> LOCATION: (1)..(10)
<223> OTHER INFORMATION: /note="Variant residues given in the sequence
      have no preference with respect to those in the annotations
      for variant positions"

<400> SEQUENCE: 78

Tyr Thr Leu Gly Ile Thr Ala Ile Asp Tyr
1               5                   10

<210> SEQ ID NO 79
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (1)..(1)
<223> OTHER INFORMATION: /replace="Arg"
<220> FEATURE:
<221> NAME/KEY: VARIANT
<222> LOCATION: (9)..(9)
<223> OTHER INFORMATION: /replace="Gly"
<220> FEATURE:
<221> NAME/KEY: SITE
<222> LOCATION: (1)..(11)
<223> OTHER INFORMATION: /note="Variant residues given in the sequence
      have no preference with respect to those in the annotations
      for variant positions"

<400> SEQUENCE: 79

Leu Ala Ser Glu Asp Ile Tyr Asn Asn Leu Ala
1               5                   10

<210> SEQ ID NO 80
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (1)..(1)
<223> OTHER INFORMATION: /replace="Asn" or "His"
<220> FEATURE:
<221> NAME/KEY: VARIANT
<222> LOCATION: (2)..(2)
<223> OTHER INFORMATION: /replace="Thr"
<220> FEATURE:
<221> NAME/KEY: VARIANT
<222> LOCATION: (3)..(3)
<223> OTHER INFORMATION: /replace="Asn"
<220> FEATURE:
<221> NAME/KEY: VARIANT
<222> LOCATION: (4)..(4)
<223> OTHER INFORMATION: /replace="Ser" or "Asn" or "Arg"
<220> FEATURE:
<221> NAME/KEY: VARIANT
<222> LOCATION: (6)..(6)
<223> OTHER INFORMATION: /replace="His"
<220> FEATURE:
<221> NAME/KEY: VARIANT
```

```
<222> LOCATION: (7)..(7)
<223> OTHER INFORMATION: /replace="Tyr" or "Thr" or "Ile"
<220> FEATURE:
<221> NAME/KEY: SITE
<222> LOCATION: (1)..(7)
<223> OTHER INFORMATION: /note="Variant residues given in the sequence
      have no preference with respect to those in the annotations
      for variant positions"

<400> SEQUENCE: 80

Tyr Ala Ser Thr Leu Gln Asp
1               5

<210> SEQ ID NO 81
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (1)..(1)
<223> OTHER INFORMATION: /replace="Gln"
<220> FEATURE:
<221> NAME/KEY: VARIANT
<222> LOCATION: (3)..(3)
<223> OTHER INFORMATION: /replace="Tyr" or "Glu"
<220> FEATURE:
<221> NAME/KEY: VARIANT
<222> LOCATION: (4)..(4)
<223> OTHER INFORMATION: /replace="Tyr"
<220> FEATURE:
<221> NAME/KEY: VARIANT
<222> LOCATION: (5)..(5)
<223> OTHER INFORMATION: /replace="Asp"
<220> FEATURE:
<221> NAME/KEY: VARIANT
<222> LOCATION: (6)..(6)
<223> OTHER INFORMATION: /replace="Phe"
<220> FEATURE:
<221> NAME/KEY: VARIANT
<222> LOCATION: (7)..(7)
<223> OTHER INFORMATION: /replace="Leu"
<220> FEATURE:
<221> NAME/KEY: VARIANT
<222> LOCATION: (8)..(8)
<223> OTHER INFORMATION: /replace="Tyr" or "Asn" or "Trp" or "Leu" or
      "Pro"
<220> FEATURE:
<221> NAME/KEY: SITE
<222> LOCATION: (1)..(9)
<223> OTHER INFORMATION: /note="Variant residues given in the sequence
      have no preference with respect to those in the annotations
      for variant positions"

<400> SEQUENCE: 81

Leu Gln Asp Ser Glu Tyr Pro Phe Thr
1               5

<210> SEQ ID NO 82
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 82

Asp Tyr Tyr Met Thr
1               5
```

```
<210> SEQ ID NO 83
<211> LENGTH: 19
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 83

Phe Ile Arg Asn Lys Ala Asn Gly Tyr Thr Thr Glu Tyr Ser Ala Ser
1               5                   10                  15

Val Lys Gly

<210> SEQ ID NO 84
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 84

Tyr Leu Gln Thr Gly Asn Phe Asp Tyr
1               5

<210> SEQ ID NO 85
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 85

Arg Ala Ser Gln Asp Ile Ser Asn Phe Leu Asn
1               5                   10

<210> SEQ ID NO 86
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 86

Phe Thr Ser Arg Leu His Ser
1               5

<210> SEQ ID NO 87
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 87

Gln Gln Gly Tyr Thr Val Pro Pro Thr
1               5
```